(12) United States Patent
Kim et al.

(10) Patent No.: US 8,655,414 B2
(45) Date of Patent: Feb. 18, 2014

(54) MOBILE TERMINAL AND DISPLAY CONTROLLING METHOD THEREOF

(75) Inventors: Jong Hwan Kim, Suwon-si (KR); Bong Soo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/824,090

(22) Filed: Jun. 25, 2010

(65) Prior Publication Data

US 2011/0039603 A1 Feb. 17, 2011

(30) Foreign Application Priority Data

Aug. 17, 2009 (KR) .......................... 10-2009-0075657
Sep. 10, 2009 (KR) .......................... 10-2009-0085473

(51) Int. Cl.
*H04B 1/38* (2006.01)

(52) U.S. Cl.
USPC ........... 455/566; 455/571; 455/572; 455/573; 455/574; 455/575.1

(58) Field of Classification Search
USPC ....................................................... 455/566
See application file for complete search history.

(56) References Cited

U.S. PATENT DOCUMENTS

| | | | |
|---|---|---|---|
| 2003/0041206 A1 | 2/2003 | Dickie | |
| 2003/0160767 A1 | 8/2003 | Wong et al. | |
| 2005/0253773 A1* | 11/2005 | Sekiguchi | 345/1.1 |
| 2006/0202925 A1* | 9/2006 | Manning et al. | 345/87 |
| 2007/0063982 A1* | 3/2007 | Tran | 345/173 |
| 2007/0075915 A1* | 4/2007 | Cheon et al. | 345/1.1 |
| 2007/0195007 A1* | 8/2007 | Bear et al. | 345/1.1 |
| 2008/0048986 A1 | 2/2008 | Khoo | |
| 2008/0094025 A1* | 4/2008 | Rosenblatt et al. | 320/101 |
| 2008/0169784 A1* | 7/2008 | Chung et al. | 320/101 |
| 2009/0023473 A1* | 1/2009 | Sawayama et al. | 455/556.1 |
| 2009/0027306 A1* | 1/2009 | Kawabe | 345/3.1 |
| 2009/0082067 A1 | 3/2009 | Song | |
| 2009/0189829 A1* | 7/2009 | Hiramatsu et al. | 345/1.3 |

FOREIGN PATENT DOCUMENTS

| | | |
|---|---|---|
| CN | 101393367 A | 3/2009 |
| WO | WO 2008/012727 A1 | 1/2008 |

* cited by examiner

*Primary Examiner* — Suhail Khan
(74) *Attorney, Agent, or Firm* — Birch, Stewart, Kolasch & Birch, LLP

(57) ABSTRACT

A mobile terminal including a display unit; a first power source configured to supply a first power; a first control unit configured to control operations of the mobile terminal; and an attaching mechanism configured to receive a detachable e-paper kit including e-paper, a second power source configured to supply a second power, and a second control unit configured to control operations of the e-paper kit. Further, when the e-paper kit is attached to the mobile terminal via the attaching mechanism, the first control unit is configured to control the display unit to display first information via the first power supplied by the first power source, and the second control unit of the e-paper kit is configured to control the e-paper to display second information via the second power supplied by the second power source.

20 Claims, 84 Drawing Sheets

(a)

(b)

(a)　　　　　　　　　　　(b)

(a)    (b)

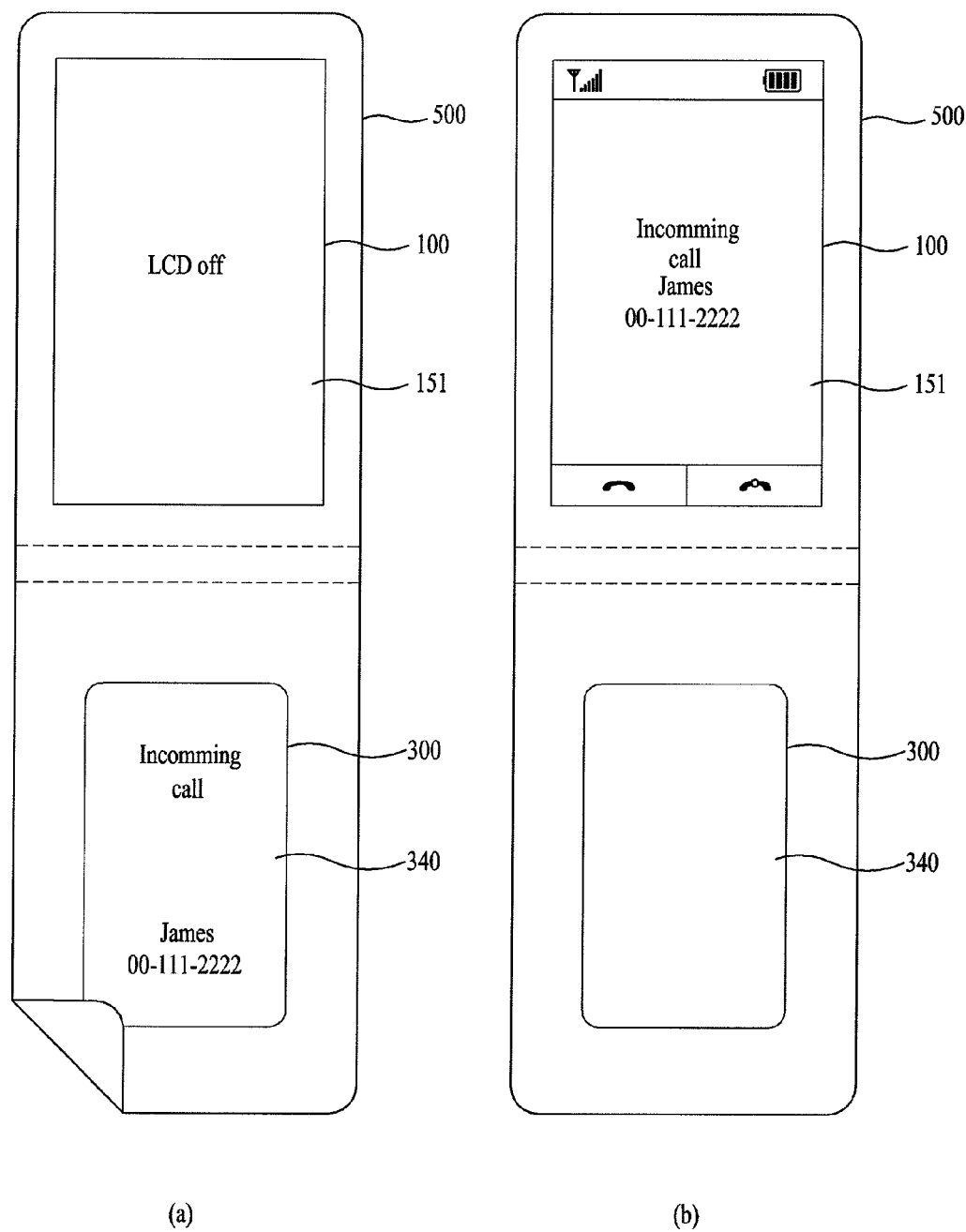

(a)        (b)

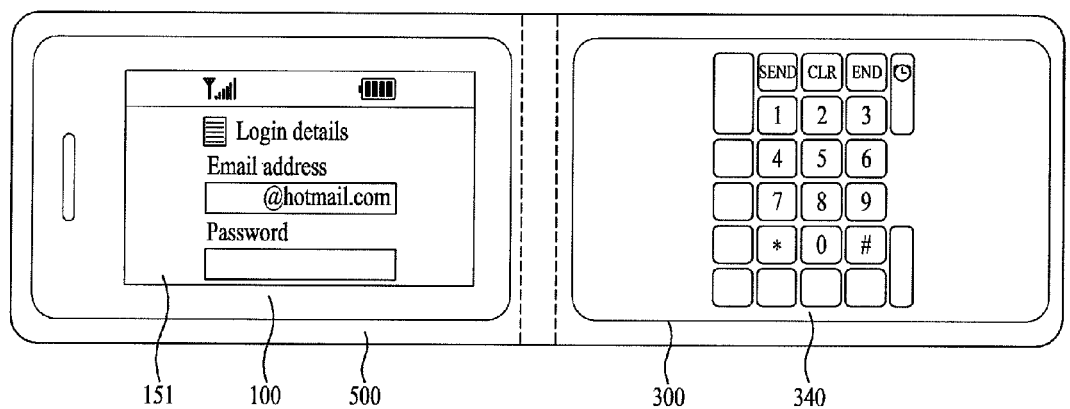

(a)   (b)

(a)  (b)

(a)    (b)

(a)                      (b)

(a)                    (b)

(a)          (b)

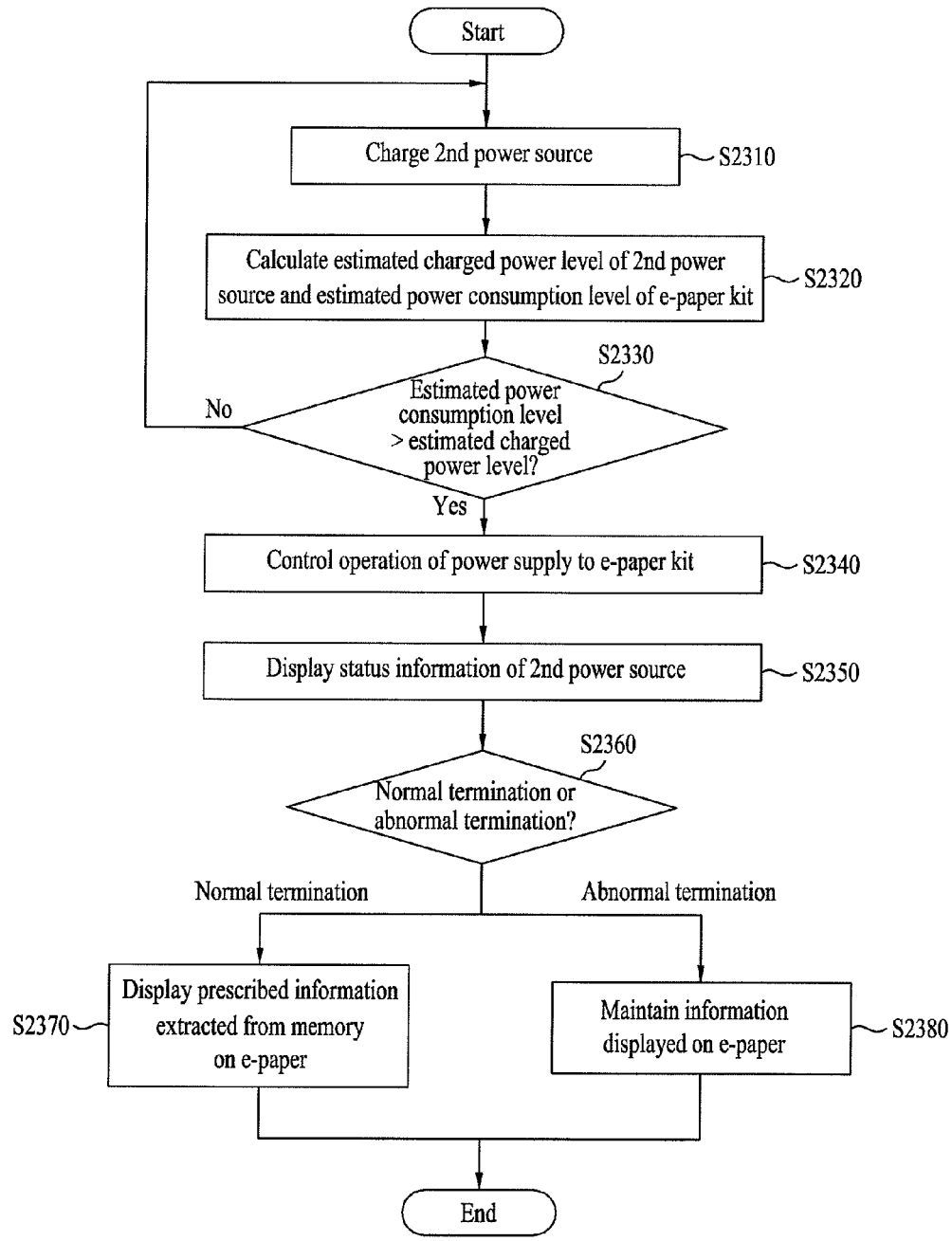

FIG. 24A
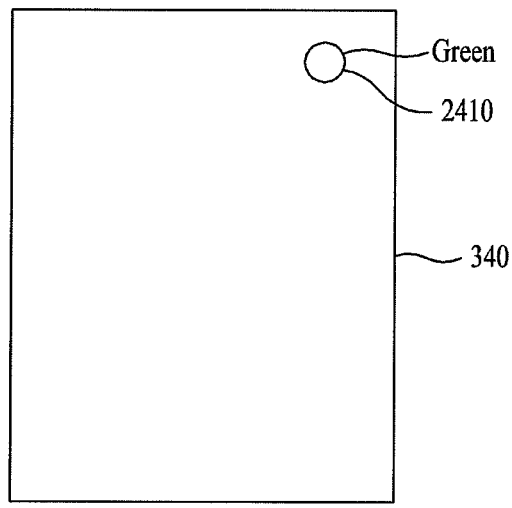
(a)
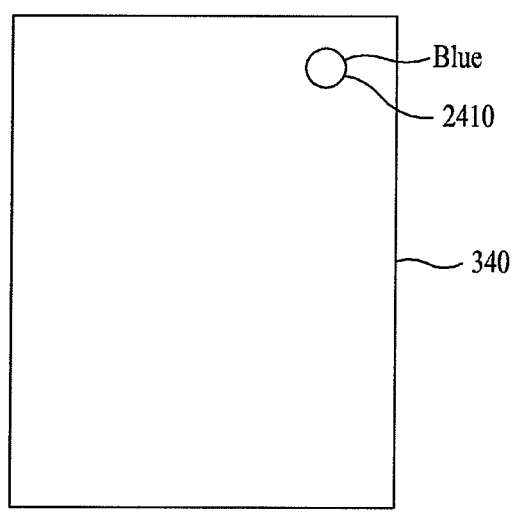
(b)

FIG. 24B
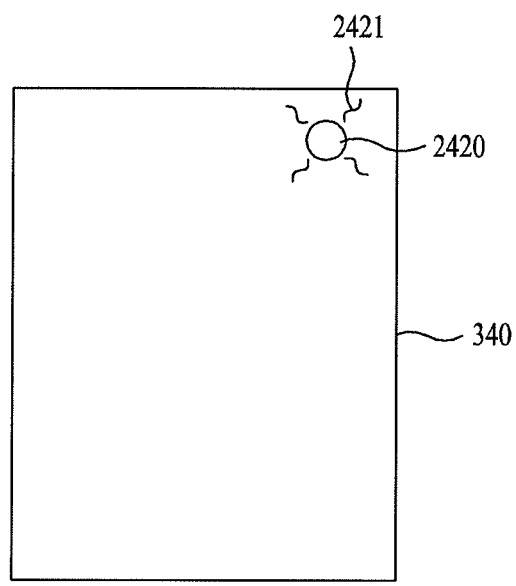
(a)
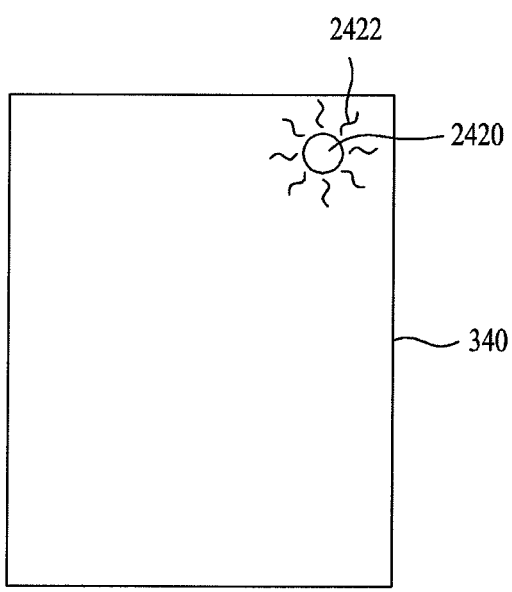
(b)

FIG. 24C
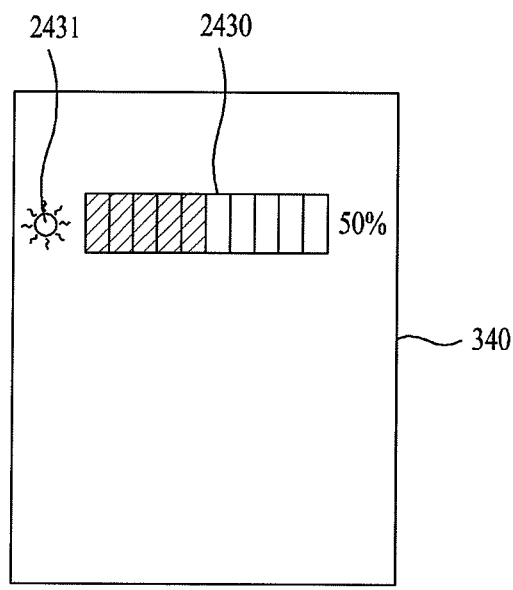
(a)
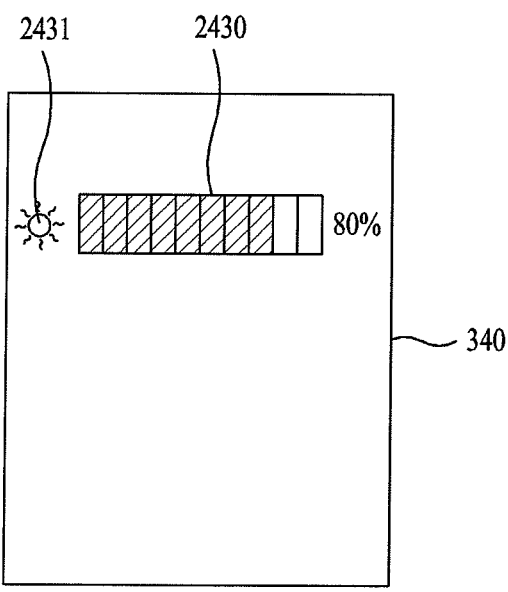
(b)

FIG. 24D
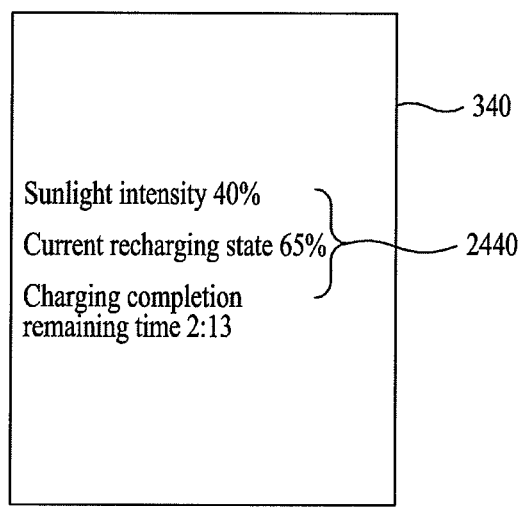
(a)
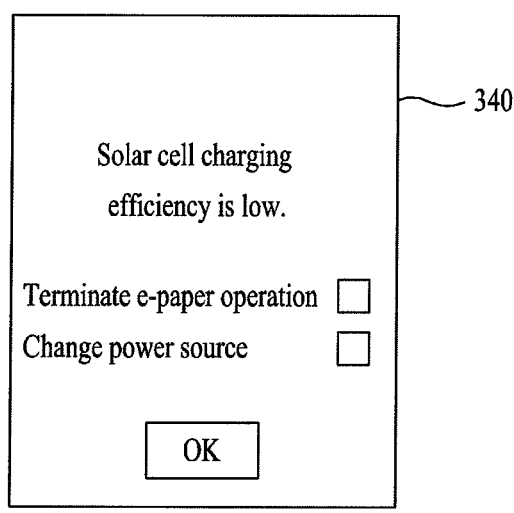
(b)

Power supply source of e-paper is changed into main power source — 340

Solar cell is maintained as power supply source of e-paper — 340

FIG. 31B
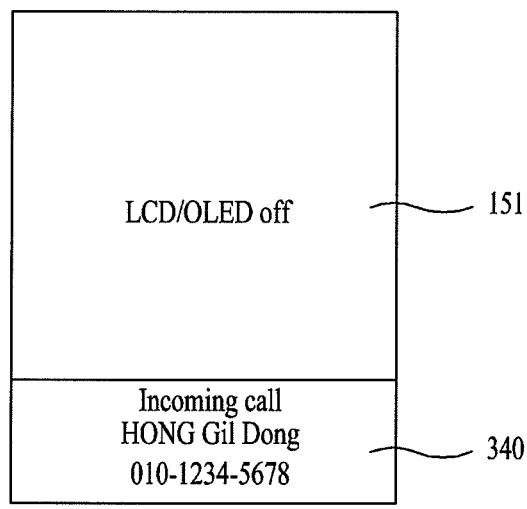
(a)
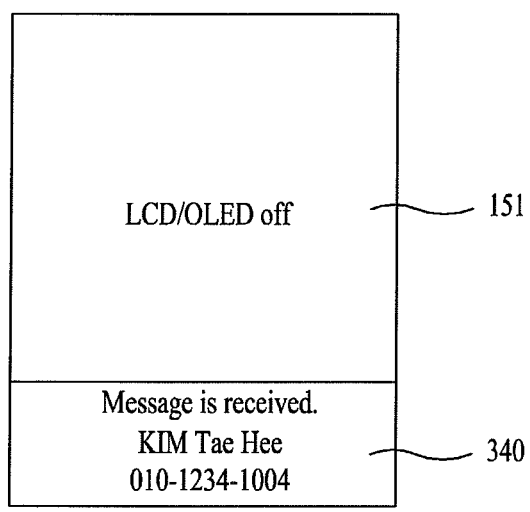
(b)

MOBILE TERMINAL AND DISPLAY CONTROLLING METHOD THEREOF

Pursuant to 35 U.S.C. §119(a), this application claims the benefit of earlier filing date and right of priority to Korean Application Nos. 10-2009-0075657, filed on Aug. 17, 2009 and 10-2009-0085473 filed on Sep. 10, 2009, the contents of which are hereby incorporated by reference herein in their entirety.

BACKGROUND OF THE INVENTION

1. Field of the Invention

The present invention relates to a mobile terminal, and more particularly, to a mobile terminal and display controlling method thereof. Although the present invention is suitable for a wide scope of applications, it is particularly suitable for connecting an e-paper kit to the mobile terminal.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

SUMMARY OF THE INVENTION

Accordingly, the present invention is directed to a mobile terminal and display controlling method thereof that substantially obviate one or more problems due to limitations and disadvantages of the related art.

An object of the present invention is to provide a mobile terminal and display controlling method thereof, by which an electronic paper kit including an electronic paper and a power supply means for supplying power to the electronic paper is detachably attached to the mobile terminal.

Another object of the present invention is to provide a mobile terminal and display controlling method thereof, by which an electronic paper is used as a display means of the mobile terminal or an independent display means if an electronic paper kit is attached to the mobile terminal.

A further object of the present invention is to provide a mobile terminal and display controlling method thereof, by which an operation of supplying power to an electronic paper can be efficiently performed in a manner of separately designating a power supply source to the electronic paper if the mobile terminal includes a plurality of power sources.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a power supply unit including a first power source for supplying a power required for an operation of at least one of the mobile terminal and an e-paper kit, a display unit performing a display operation by being supplied with the power from the first power source, a control unit controlling operations of the power supply unit and the display unit, and an e-paper kit connected to the mobile terminal to perform a display operation, wherein the e-paper kit includes the e-paper, a second power source supplying a power required for an operation of the e-paper kit and a control means for controlling the operation of the e-paper kit.

In another aspect of the present invention, a method of controlling a display of a mobile terminal having a display unit includes the steps of connecting the mobile terminal to an e-paper kit, if the mobile terminal is connected to the e-paper kit, controlling a display operation using at least one of an e-paper included in the e-paper kit and the display unit, and displaying prescribed information using at least one of the e-paper and the display unit according to a result of the controlling step, wherein the e-paper kit includes the e-paper, a second power source supplying a power required for an operation of the e-paper kit and a control means for controlling the operation of the e-paper kit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 14A to 14C are diagrams of screen configurations for performing a display operation using an electronic paper in inactive mode of a display unit according to the present invention;

FIGS. 15A to 15C are diagrams of screen configurations for controlling a display operation in accordance with rotation of an external case provided with a mobile terminal and an electronic paper kit according to the present invention;

FIG. 23 is a second flowchart for a method of controlling a display of a mobile terminal according to one embodiment of the present invention;

FIGS. 24A to 24D are diagrams for screen configurations for displaying power status information of a solar cell in progress of a battery charging on an electronic paper according to the present invention;

FIG. 31A and FIG. 31B are diagrams of screen configurations for determining whether to activate an electronic paper in accordance with intensity of illumination according to the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
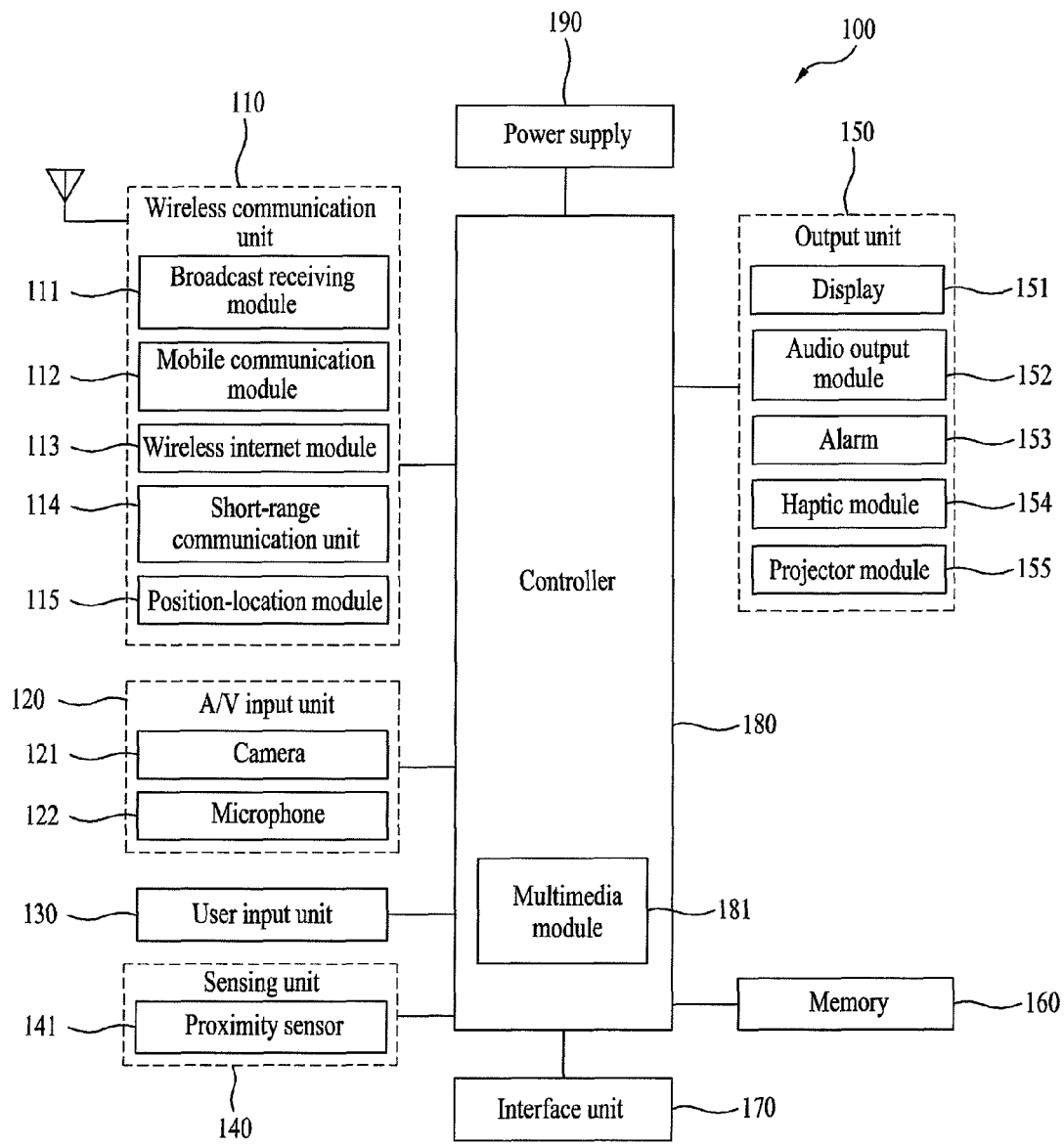
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
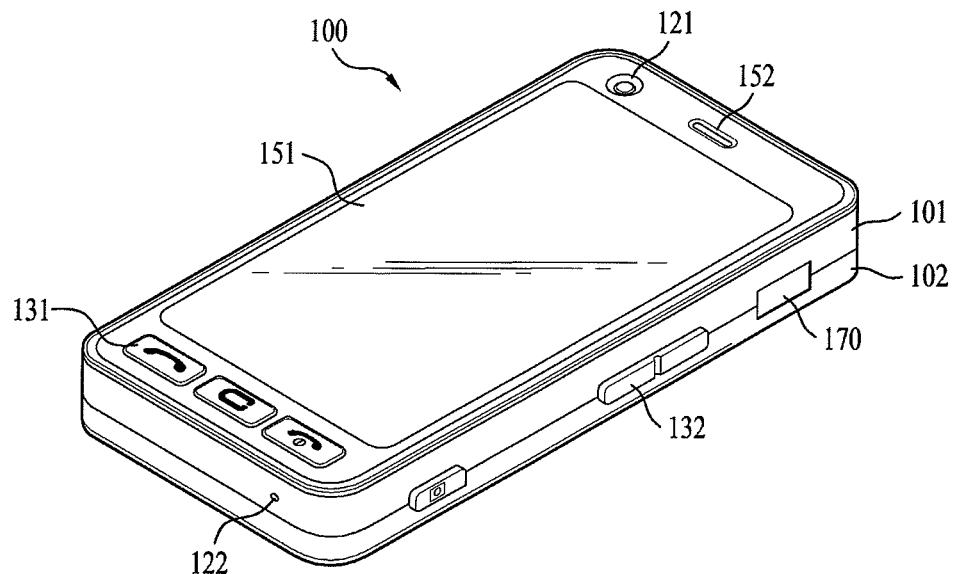
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display unit 151, an audio output unit 152, a camera 121, user input units 130/131 and 132, a microphone 122, an interface 180 and the like can be provided to the terminal body, and more particularly, to the front case 101.

The display unit 151 occupies most of a main face of the front case 101. The audio output unit 151 and the camera 121 are provided to an area adjacent to one of both end portions of the display unit 151, while the user input unit 131 and the microphone 122 are provided to another area adjacent to the other end portion of the display unit 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display unit 151 or the like can be inputted to the second manipulating unit 132.

Figure 2B:
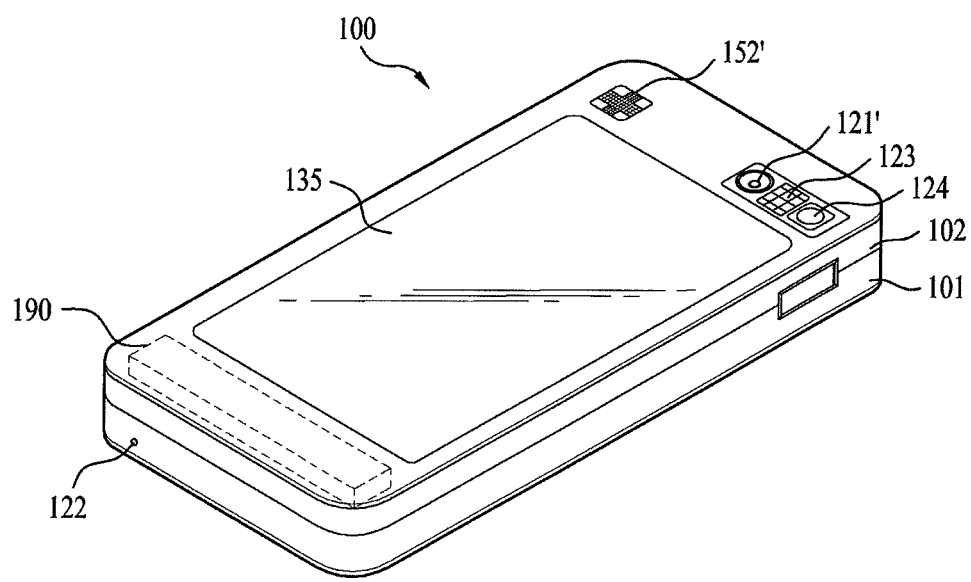
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display unit 151. In this case, if the display unit 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display unit 151 of the front case 101. The touchpad 135 can be provided in rear of the display unit 151 in parallel. The touchpad 135 can have a size equal to or smaller than that of the display unit 151.

Assume that a mobile terminal mentioned in this disclosure includes at least one of the components shown in FIG. 1.

Moreover, an e-paper kit mentioned in this disclosure can include an e-paper, a second power source configured to supply power required for driving the e-paper kit, and a control means for controlling operations of the e-paper kit. The e-paper kit is connected to the mobile terminal 100 and is then able to work as a display means of the mobile terminal 100 or an independent display means. For instance, the second power source can include a solar cell or battery.

The solar cell mentioned in this disclosure forms a layered structure with an e-paper and is provided to a front side or backside of the e-paper. Alternatively, the solar cell can be provided to a prescribed portion of an e-paper kit instead of the front or backside of the e-paper.

For instance, if a solar cell is provided to a front side of an e-paper, it can be provided as a transparent type to secure readability of the e-paper. Of course, if information is displayable on a backside of an e-paper, when a solar cell is provided to the backside of the e-paper, the solar cell can be provided as a transparent type. Moreover, it is apparent that a solar cell of a non-transparent type can be provided.

A solar cell essentially includes a light concentrating means for receiving sunlight and is able to selectively include a storage means for storing electric energy (or power) converted from solar energy. For instance, if the storage means is included, the electric energy converted from the solar energy is stored separate from power of a basic terminal power source. If the storage means is not included, the electric energy converted from the solar energy can be stored in a storage space for the power of the basic terminal power source together. Specifically, if the storage space is included, an e-paper kit is operable as an independent terminal separate from the mobile terminal 100. And, the e-paper kit is able to supply power to another terminal (i.e., the mobile terminal 100 or the like) if necessary.

In the following description, a structure of a mobile terminal having an e-paper kit connected thereto and a structure of the e-paper kit are explained with reference to FIG. 3A and FIG. 3B.

Figure 3A:
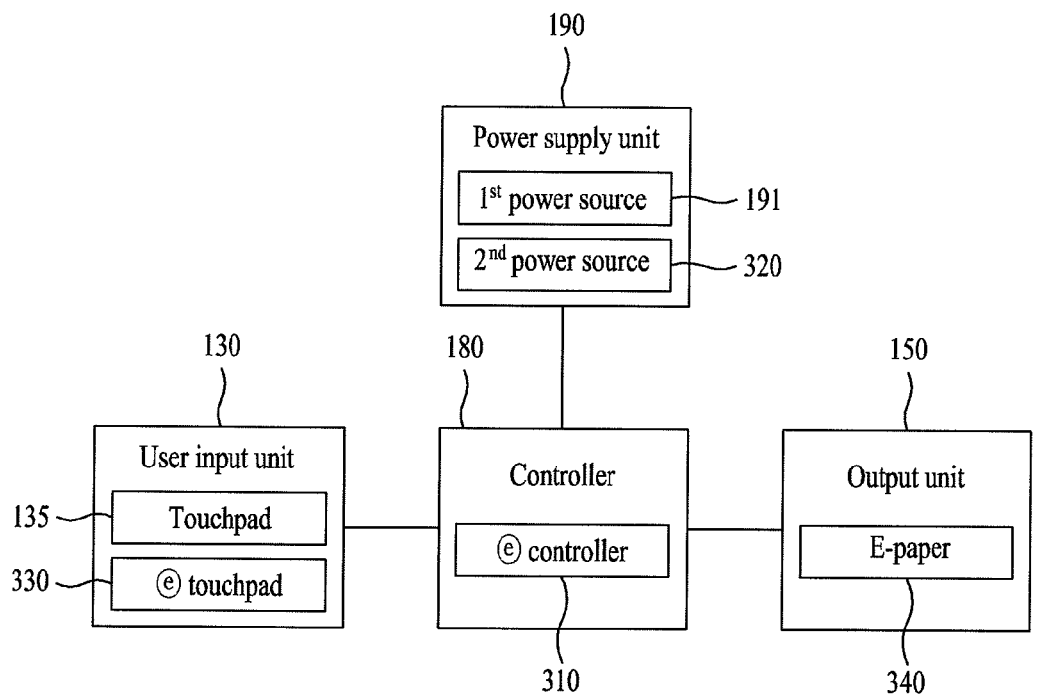
FIG. 3A and FIG. 3B are block diagrams of an electronic paper kit according to one embodiment of the present invention.

Referring to FIG. 3A, if the mobile terminal 100 is connected to an e-paper kit 300, the mobile terminal 100 is able to include components of the e-paper kit 300 as parts of the terminal configuration.

For instance, the mobile terminal 100 can include an (e) controller 310 configured as a component of the controller 180 to control overall operations of the e-paper kit, a second power source 320 configured as a component of the power supply unit 190 to supply power required for an operation of the e-paper kit, an (e) touchpad 330 attached to a topside of an e-paper and configured as a component of the user input unit 130 to receive a user touch action for information displayed on the e-paper, and the e-paper 340 configured as a component of the output unit 150.

Figure 3B:
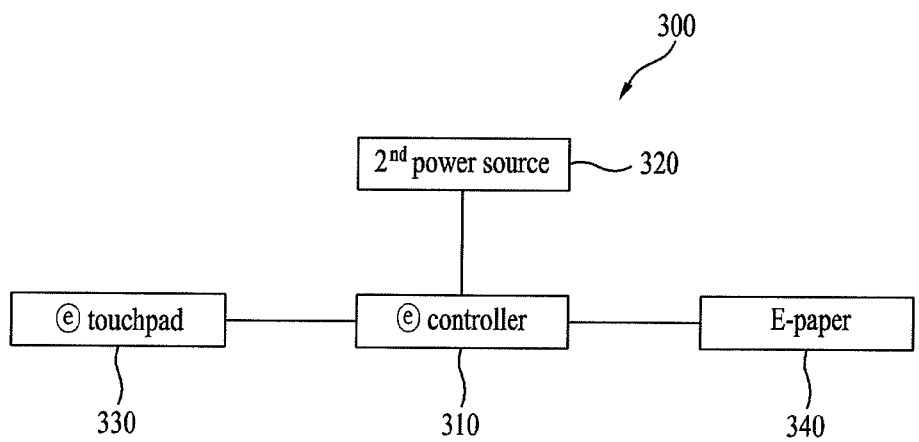

Referring to FIG. 3B, the e-paper kit 300 can include the (e) controller 310, the second power source 320, the (e) touchpad 330 and the e-paper 340, irrespective of the connection to the mobile terminal 100.

The e-paper kit 300 can be operated separate from the mobile terminal 100 according to inter-reaction of the components shown in FIG. 3B. Of course, the e-paper kit 300 is able to operate the e-paper 340 as a display means of the mobile terminal 100 irrespective of a presence or non-presence of attachment to the mobile terminal 100.

Moreover, the e-paper kit 300 can be supplied with power required for operating the e-paper kit 300 from the first power source 191 in some cases. For instance, the e-paper kit 300 can be supplied with the power if a remaining power level of the second power source 320 is equal to or smaller than a predetermined reference.

In the following description, a configuration of an e-paper kit is explained with reference to the accompanying drawings. FIGS. 4A to 4D are diagrams for configurations of an electronic paper kit according to one embodiment of the present invention.

Figure 4A:
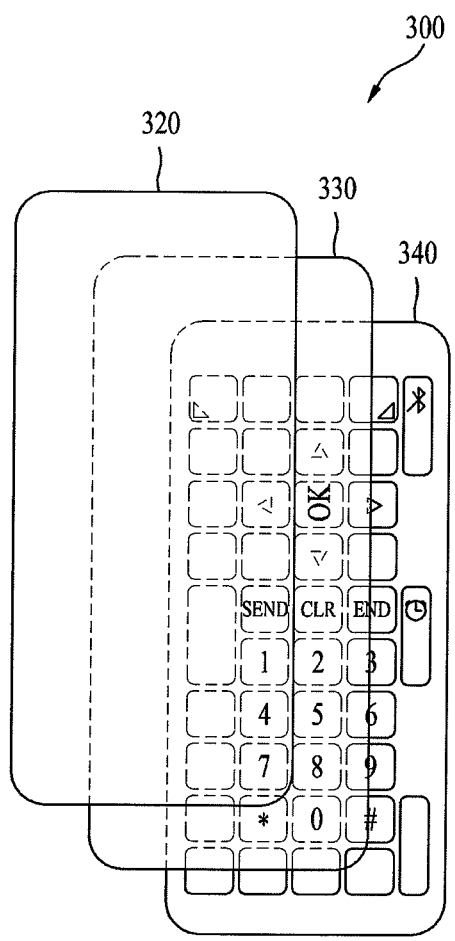
FIGS. 4A to 4D are diagrams for configurations of an electronic paper kit according to one embodiment of the present invention.

Referring to FIG. 4A, an e-paper kit 300 includes a solar cell 320 of a transparent type, an (e) touchpad 330 under the solar cell 320, and an e-paper 340 under the (e) touchpad 330. And, the respective components 320, 330 and 340 can construct a layered structure. Optionally, the e-paper 340 can be provided over the (e) touchpad 330.

Figure 4B:
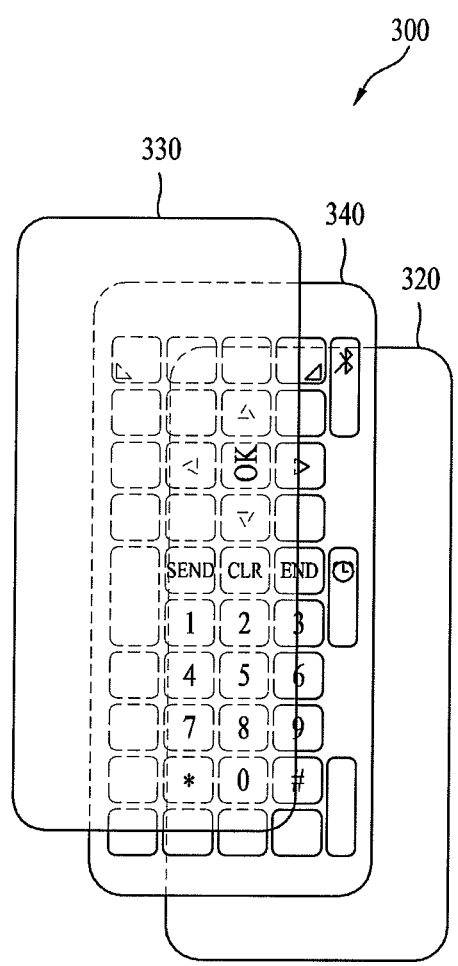

Referring to FIG. 4B, an e-paper kit 300 can be configured to form a layered structure in order of an (e) touchpad 330, an e-paper 340 and a solar cell 320 from topside. Optionally, the e-paper 340 can be provided over the (e) touchpad 330. In this case, it is not necessary for the solar cell 320 has a transparent type. While information is not displayed on the e-paper (e.g., incident sunlight is available), sunlight is incident via a face opposing the e-paper. Alternatively, sunlight is incident via a face opposite to a face opposing the e-paper 340 irrespective of a presence or non-presence of the information displayed on the e-paper.

Figure 4C:
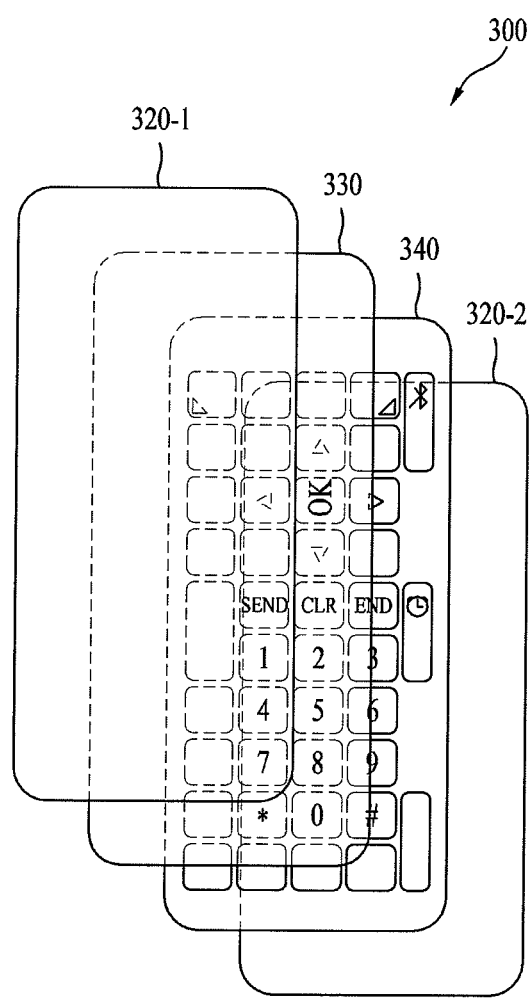

Referring to FIG. 4C, an e-paper kit 300 can include a light concentrating means 320-1 of a transparent type, an (e) touchpad 330, an e-paper 340 under the (e) touchpad 330, and a storage means 320-2 under the e-paper 340. In this case, the light concentrating means 320-1 can have a transparent type to secure readability of the e-paper. And, the power converted from solar energy attributed t the sunlight condensed by the light concentrating means 320-1 can be stored in the storage means 320-2.

Figure 4D:
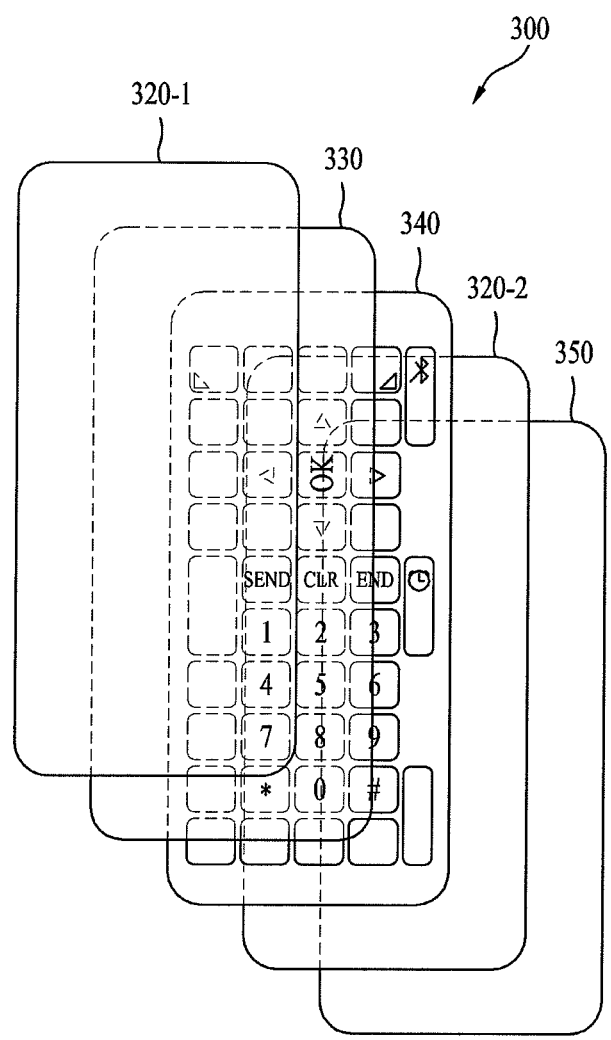

Referring to FIG. 4D, an e-paper kit 300 can include a light emitting device (e.g., LED) 350 under the storage means 320-2 by maintaining the structure shown in FIG. 4C. In this case, the light emitting device is provided to support backlighting of the e-paper. If so, the light emitting device can be arranged beneath the e-paper to enhance the backlighting effect.

Besides, it is a matter of course that the e-paper kit 300 can include its components in various ways as well as the above-described configurations or structures. For instance, a solar cell 320 can have a transparent or non-transparent type. An e-paper kit 300 can be supplied with power from the first power source 191 as well as the solar cell 320 if necessary.

In the following description, the configuration of a mobile terminal provided with an e-paper kit is explained with reference to the accompanying drawings. FIGS. 5A to 5F are diagrams of configurations of a mobile terminal provided with an electronic paper kit. For clarity and convenience of description, assume that an e-paper kit has the configuration shown in FIG. 4A.

Figure 5A:
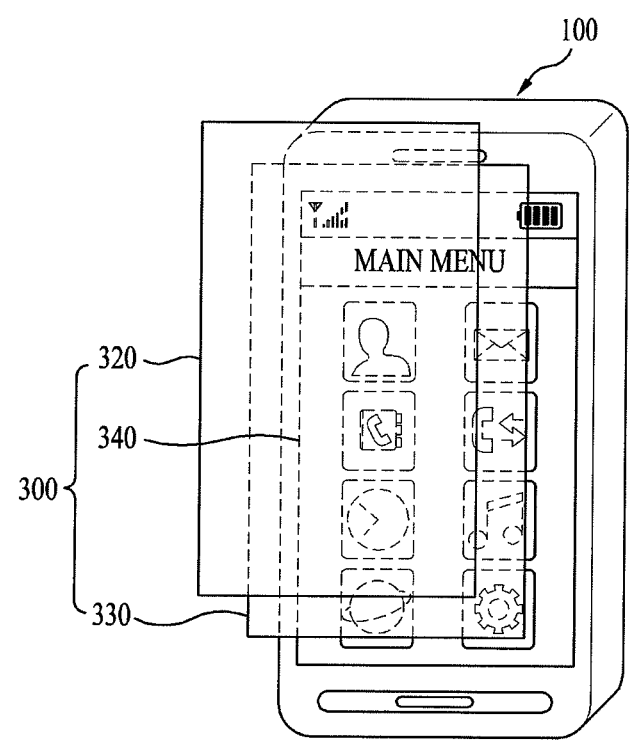
FIGS. 5A to 5F are diagrams of configurations for connecting an electronic paper kit and a mobile terminal together using an external case according to one embodiment of the present invention.

Referring to FIG. 5A, the mobile terminal 100 of a bar type can include an e-paper kit 300 provided to its front side. In this case, a display unit 151 or an e-paper 340 is selectively usable as a display means. And, the e-paper 340 can be arranged on the front side entirely or in part. Alternatively, the e-paper kit 300 can be provided to a backside of the mobile terminal 100. In this case, the mobile terminal 100 is able to use the display unit 151 provided to the front side or the e-paper 340 provided to the backside as a display means simultaneously or selectively.

Figure 5B:
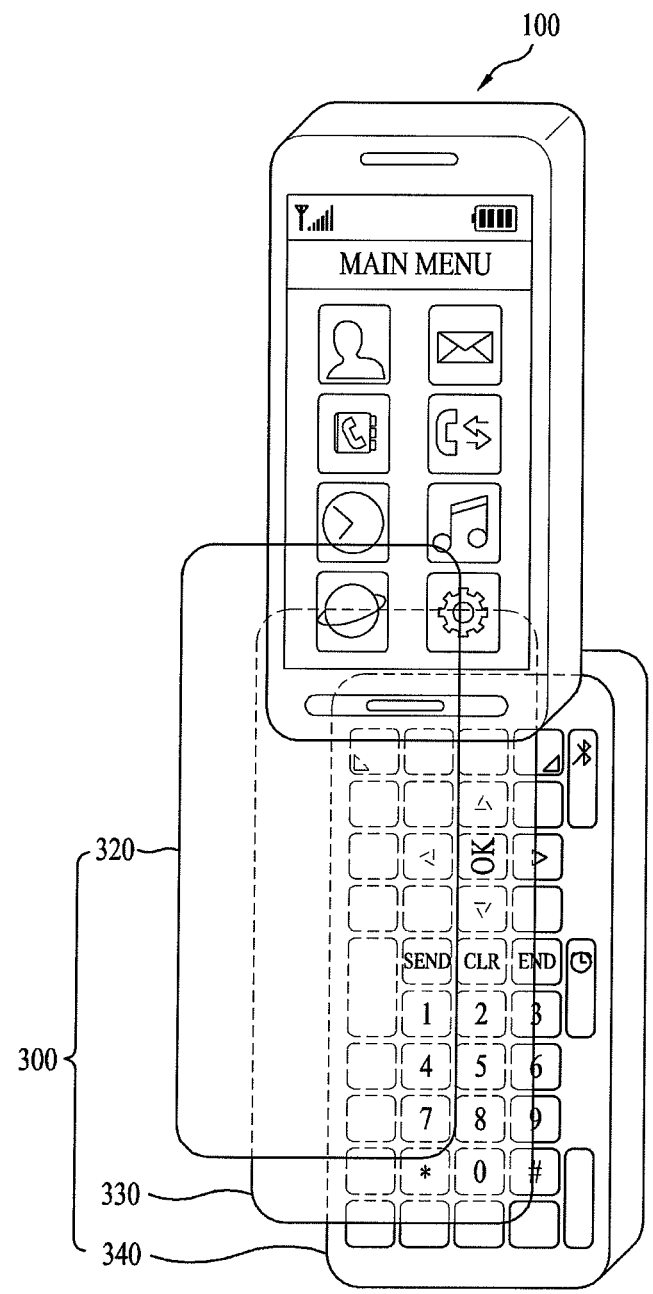

Referring to FIG. 5B, an e-paper kit 300 can be provided to a front side (or a backside) of a top or bottom slider of the mobile terminal 100 of a slide type. In case that the e-paper kit 300 is provided to the front side of the bottom slider, the mobile terminal 100 displays a virtual keypad on an e-paper 340 to receive a keypad manipulation action from a user or divides the bottom slider into a plurality of regions to arrange a keypad and the e-paper kit 300 in first and second regions, respectively. In case that the e-paper kit 300 is provided to the front side of the top slider, it is similar to the former e-paper kit provided to the front side of the mobile terminal 100 shown in FIG. 5A.

Figure 5C:
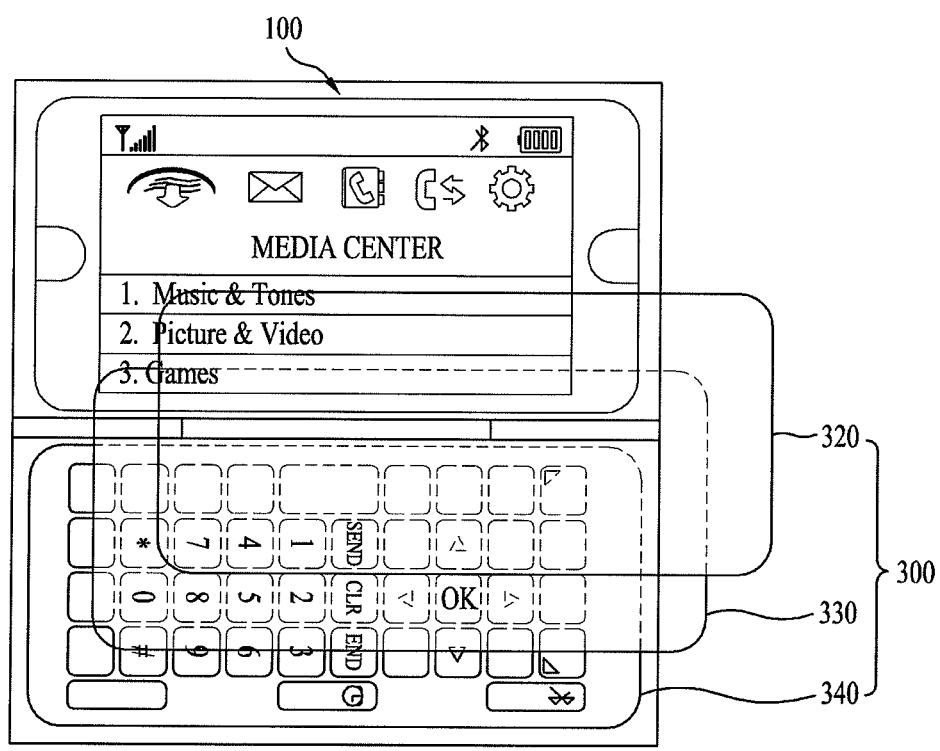

Referring to FIG. 5C, an e-paper kit 300 can be provided to a front side (or a backside) of a top or bottom folder of the mobile terminal 100 of a folder type. In case that the e-paper kit 300 is provided to the front side of the bottom folder, the mobile terminal 100 displays a virtual keypad on an e-paper 340 to receive a keypad manipulation action from a user or divides the bottom folder into a plurality of regions to arrange a keypad and the e-paper kit 300 in first and second regions, respectively. In case that the e-paper kit 300 is provided to the front side of the top folder, it is similar to the former e-paper kit provided to the front side of the mobile terminal 100 shown in FIG. 5A.

Figure 5D:
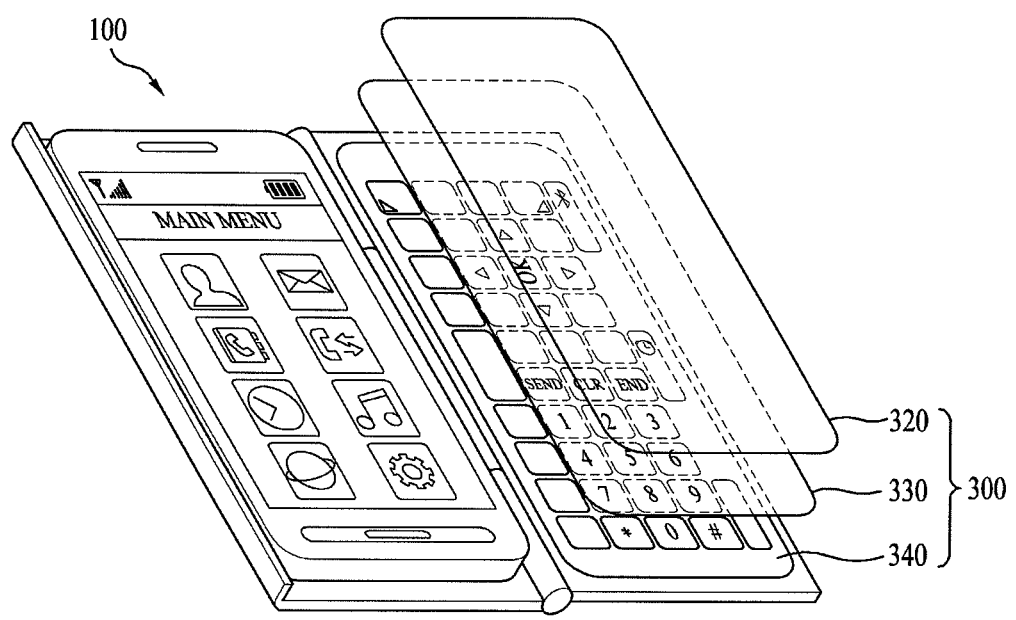

Referring to FIG. 5D, the mobile terminal 100 and an e-paper kit 300 can be separately and detachably attached to one external case. For instance, the mobile terminal 100 is attached to one inner face of the external case, while the e-paper kit 300 is attached to another inner face of the external case.

Figure 5E:
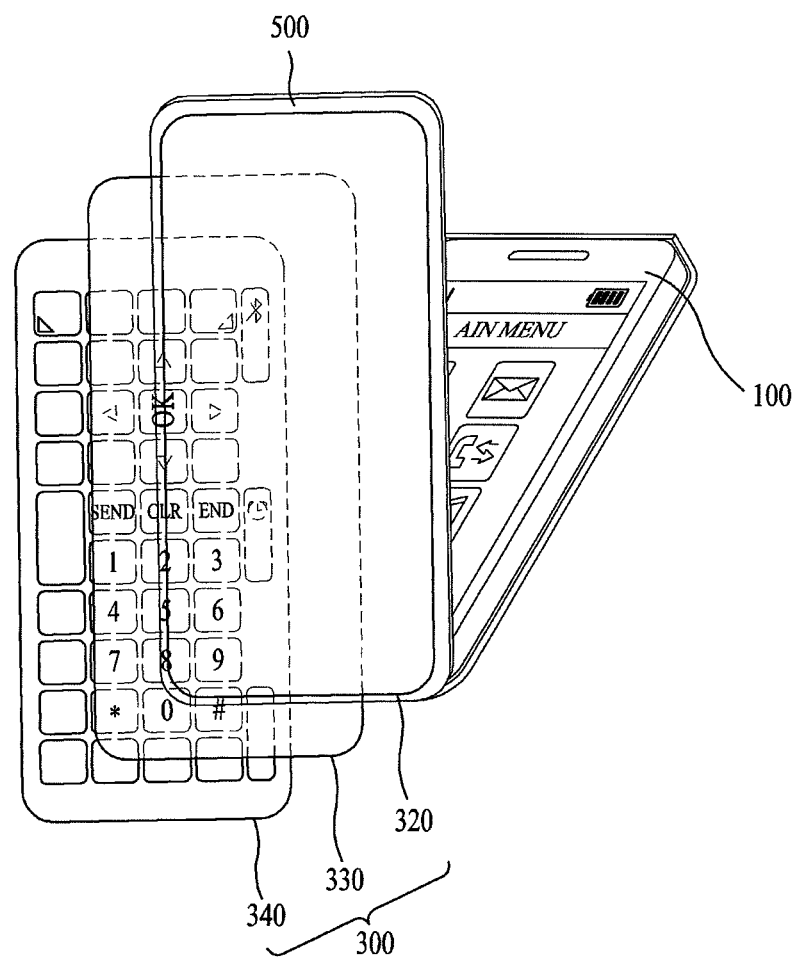
Figure 5F:
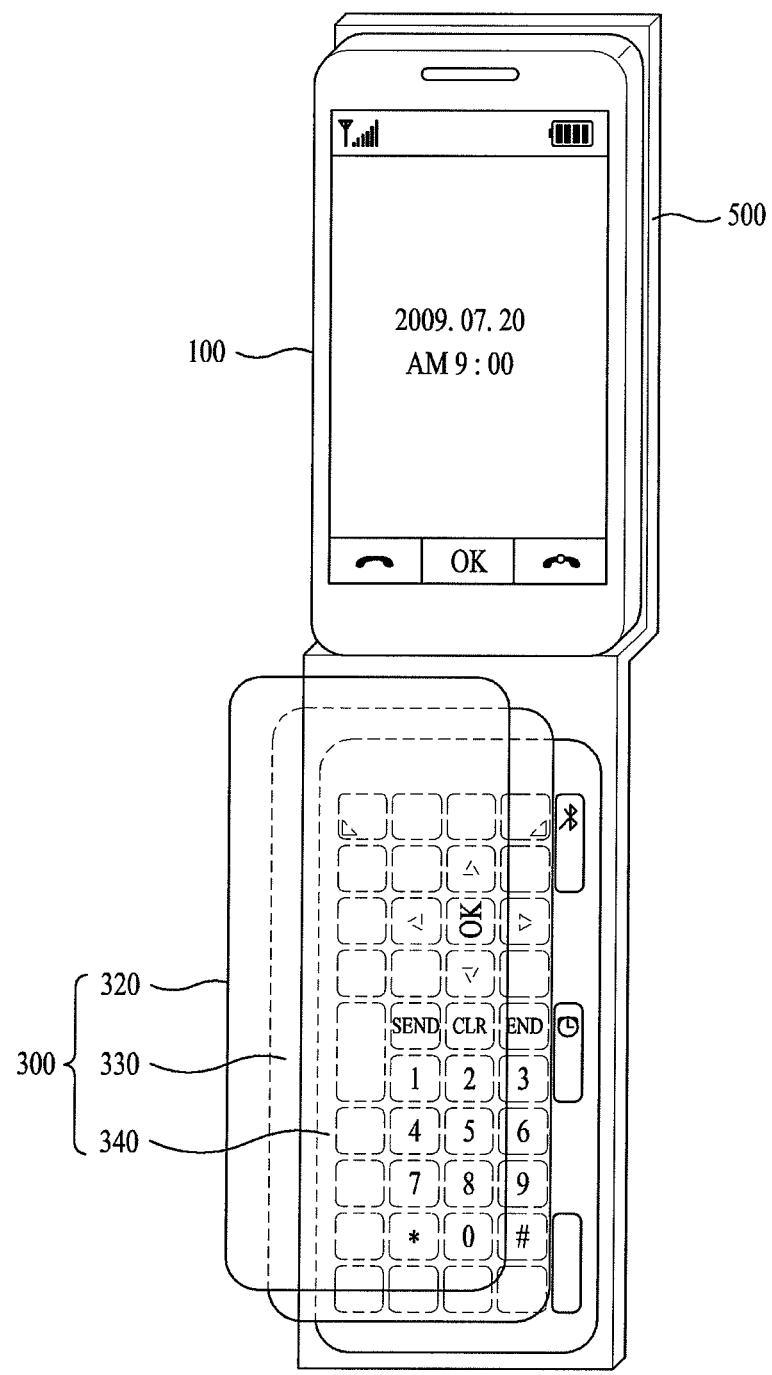

Referring to FIG. 5E and FIG. 5F, the mobile terminal 100 and an e-paper kit 300 can be separately and detachably attached to an external case 500 of a pouch type. For instance, in case that the external case 500 of a folder type is provided, the mobile terminal 100 is provided to an inner face of a top folder of the external case 500, while the e-paper kit 300 is provided to an outer face of a bottom folder of the external case 500. For another instance, in case that the external case 500 of a folder type is provided, the mobile terminal 100 is provided to an inner face of a top folder of the external case 500, while the e-paper kit 300 is provided to an inner face of a bottom folder of the external case 500.

Of course, the e-paper kit 300 can be provided in a manner of being fixed to the external case 500 instead of being detachably attached to the external case 500. Alternatively, the e-paper kit 300 can be connected to the mobile terminal 100 in various ways as well as the above described ways.

In the following description, a display controlling method of a mobile terminal is explained in detail with reference to the accompanying drawings.

Figure 6:
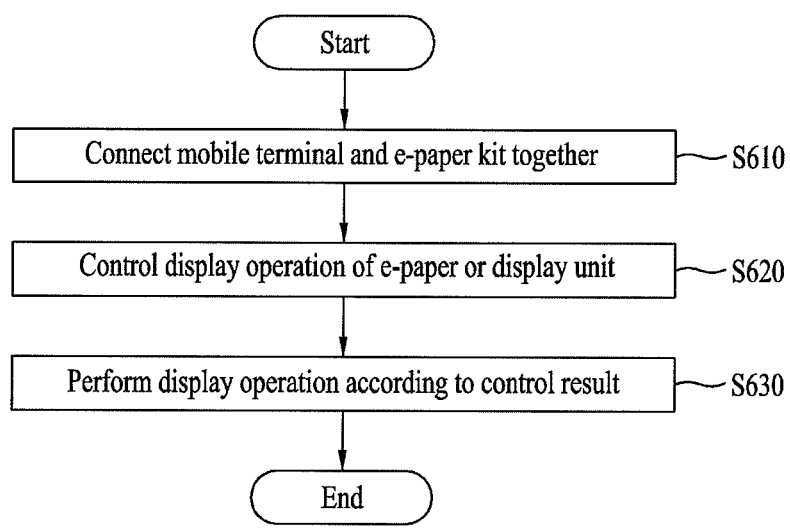
FIG. 6 is a first flowchart for a method of controlling a display of a mobile terminal according to one embodiment of the present invention.

FIG. 6 is a first flowchart for a method of controlling a display of a mobile terminal according to one embodiment of the present invention.

Referring to FIG. 6, the mobile terminal 100 is connected to the e-paper kit 300 [S610].

In particular, the e-paper kit 300 is detachably attached to the external case 500 and the mobile terminal 100 can be attached to the external case 500. Therefore, in case that the mobile terminal 100 is attached to the external case 500 provided with the e-paper kit 300, the mobile terminal 100 and the e-paper kit 300 can be regarded as connected to each other. For instance, the external case 500 of a pouch type can be provided.

The connection between the mobile terminal 100 and the e-paper kit 300 can include a connection using a connecting means (e.g., USB), a direct connection in a manner of connecting the e-paper kit 300 to a prescribed portion of the mobile terminal 100, or the like.

Under the control of the controller 180, in case that the e-paper kit 300 is connected to the mobile terminal 100, the mobile terminal 100 controls a display operation of at least one of the e-paper 340 provided to the e-paper kit 300 and the display unit 151 [S620].

Under the control of the controller 180, the mobile terminal 100 displays information using at least one of the e-paper 340 and the display unit 151 to correspond to the control result in the controlling step S620 [S630].

For instance, under the control of the controller 180, if the e-paper kit 300 is connected to the mobile terminal 100, the mobile terminal 100 is able to activate each of the display unit 151 and the e-paper 340 as a display means of the mobile terminal 100.

In particular, the display unit 151 is operated as a main display means and the e-paper 340 is operated as a sub-display means.

Meanwhile, even if the e-paper kit 300 is connected to the mobile terminal 100, it is able to control the e-paper 340 to perform a display function independent from the mobile terminal 100 under the control of the control means 310. Alternatively, even if the e-paper kit 300 is disconnected from the mobile terminal 100, the e-paper kit 300 is able to operate the e-paper 340 as a display means of the mobile terminal 100 under the control of the control means (or the ⓔ controller) 310.

Regarding this, the following description is made with reference to the accompanying drawings.

Figure 7:
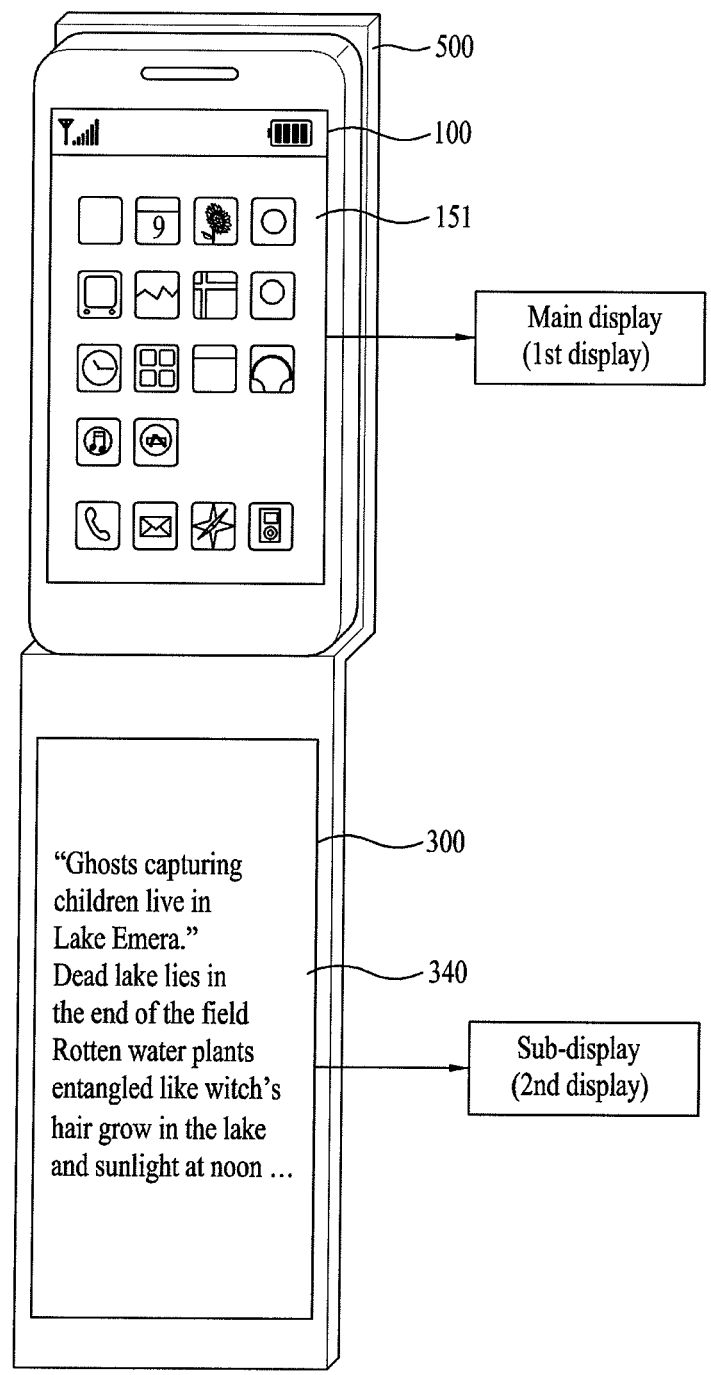
FIGS. 7 to 10C are diagrams of screen configurations for operating an electronic paper as a display means of a mobile terminal according to the present invention.

Referring to FIG. 7, the mobile terminal 100 operates the display unit 151 as a first display means (or a main display means) and also operates the e-paper 340 as a second display means (or a sub-display means).

For instance, the display unit 151 displays a list of menu items corresponding to functions operable by the mobile terminal 100, respectively. The e-paper 340 is able to display e-book contents if an e-book function is currently executed.

Figure 8A:
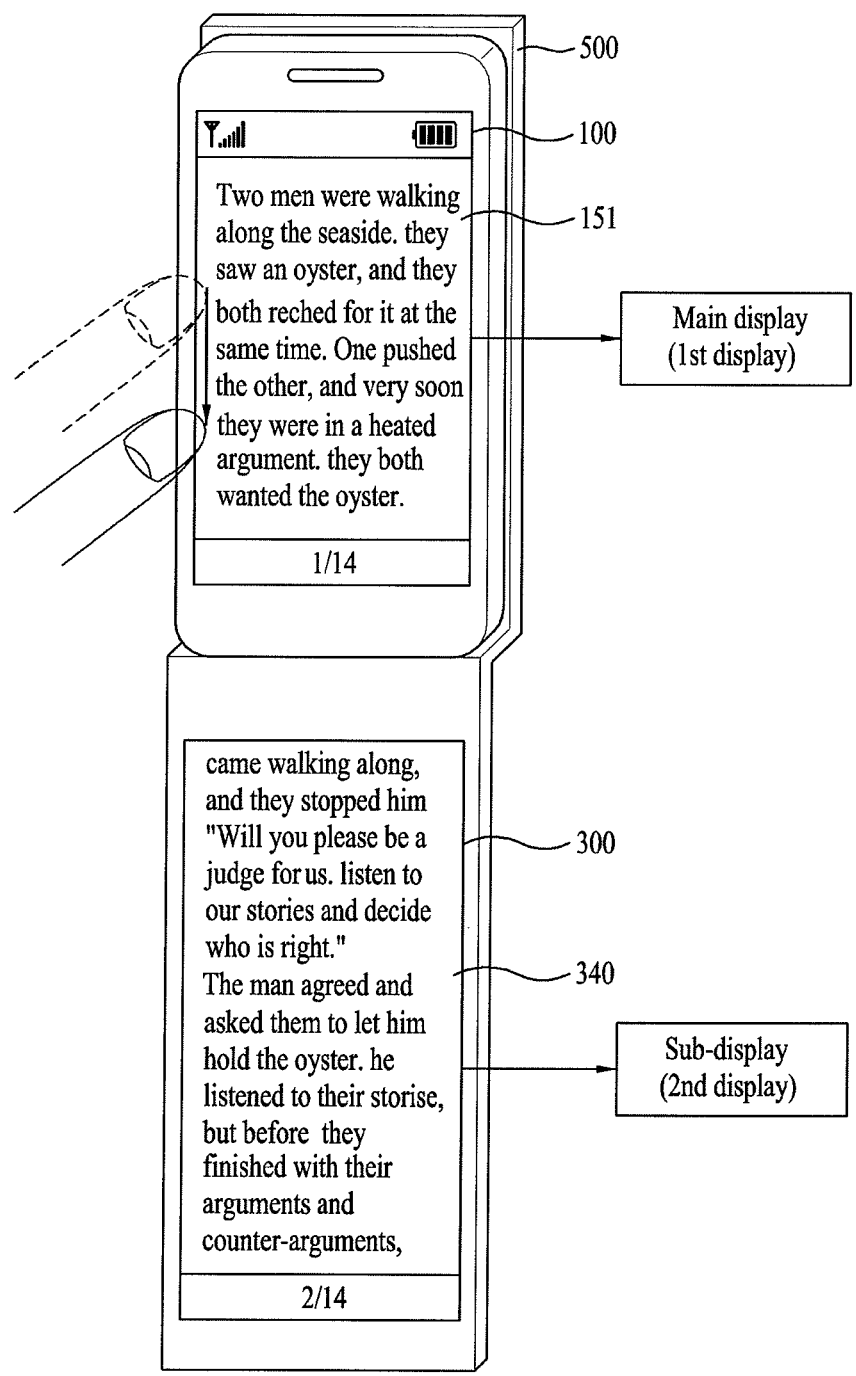
Figure 8B:
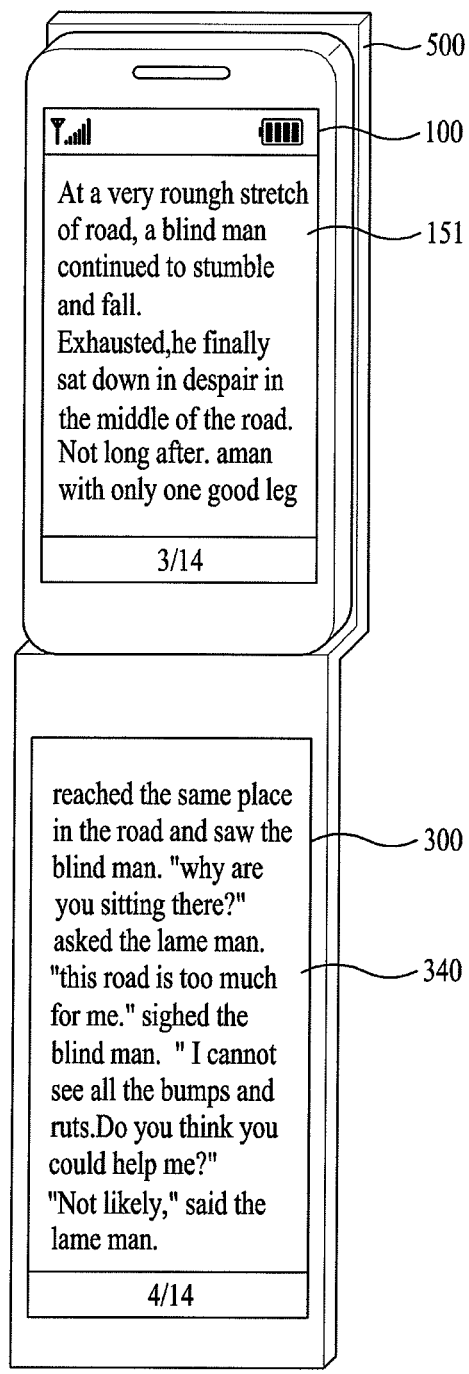

Referring to FIG. 8A and FIG. 8B, as the e-book function is executed, the mobile terminal 100 is able to display first and second pages on the display unit 151 and the e-paper 340, respectively [FIG. 8A].

If a touch & drag in a predetermined distance is inputted in a lower direction to the display unit 151 in FIG. 8A, the mobile terminal 100 performs a page-turning action to display third and fourth pages on the display unit 151 and the e-paper 340, respectively [FIG. 8B].

In doing so, the number of pages turned over may vary according to the touch & drag distance. Namely, the longer the touch & drag distance becomes, the greater the number of flipped pages can increase.

Meanwhile, if a touch & drag in a predetermined distance is inputted in left/right direction to the display unit 151 in FIG. 8A, the mobile terminal 100 performs a book switching action to enter a book in previous order (i.e., in case of touch & drag in left direction) or in next order (i.e., in case of touch & drag in right direction) and is then able to display specific pages of the entered book on the display unit 151 and the e-paper 340, respectively [not shown in the drawing].

Figure 9A:
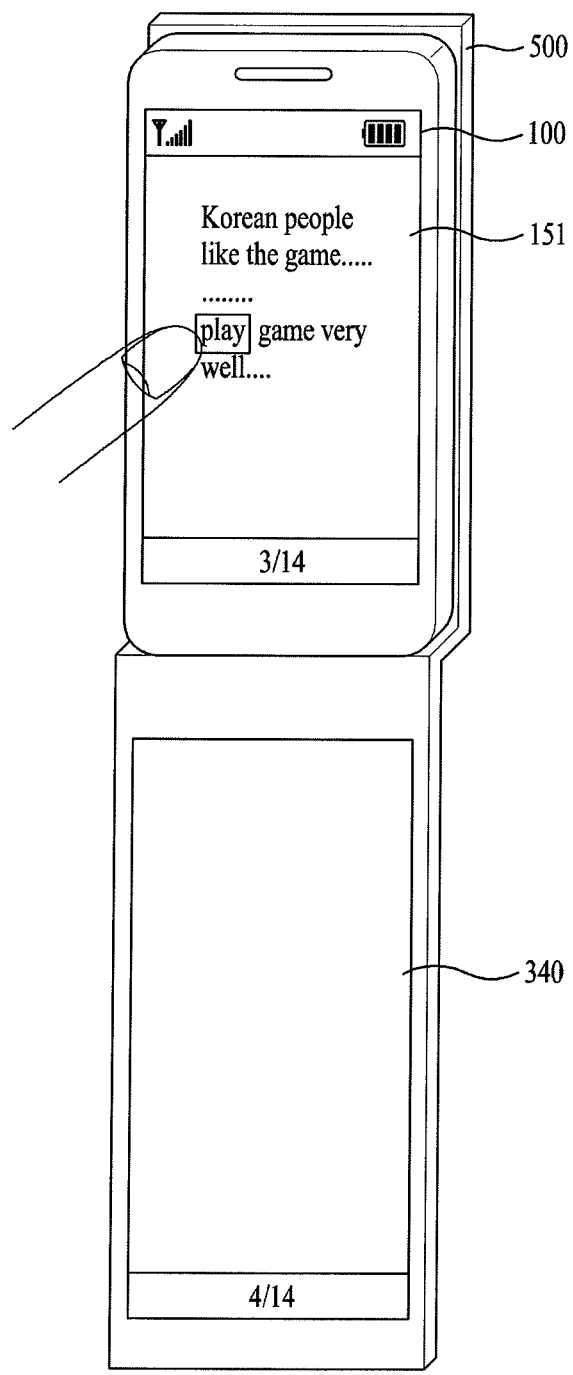
Figure 9B:
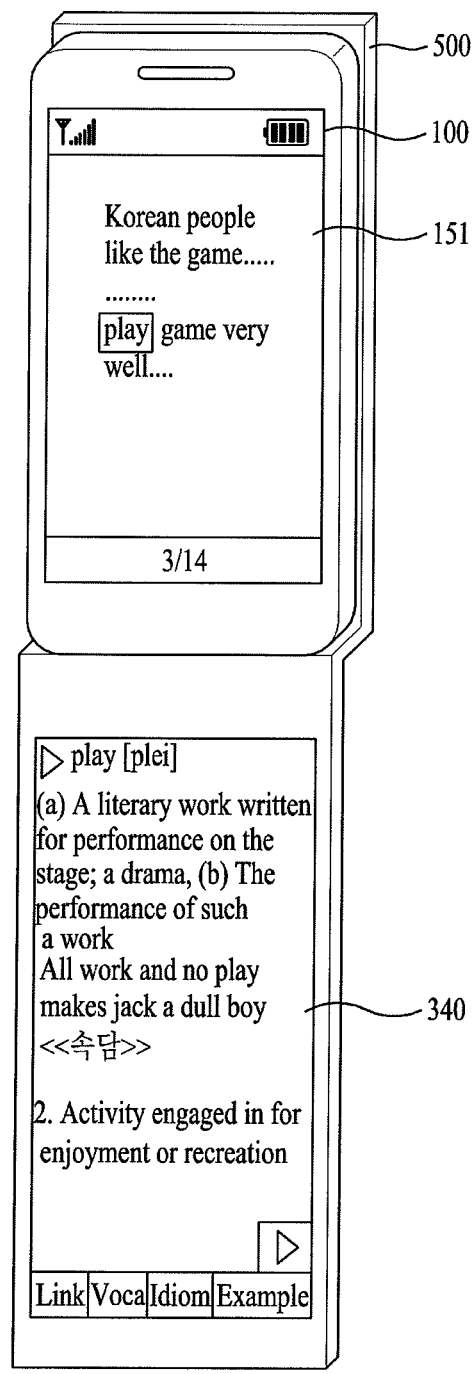

Referring to FIG. 9A and FIG. 9B, the mobile terminal 100 displays a specific page of an e-book on the display unit 151 according to an execution of an e-book function and is then able to receive a selection of a specific word (e.g., 'play') included in the specific page from a user [FIG. 9A].

Subsequently, the mobile terminal 100 is able to display a description of the specific word selected in FIG. 9A on the e-paper 340 [FIG. 9B].

Figure 10A:
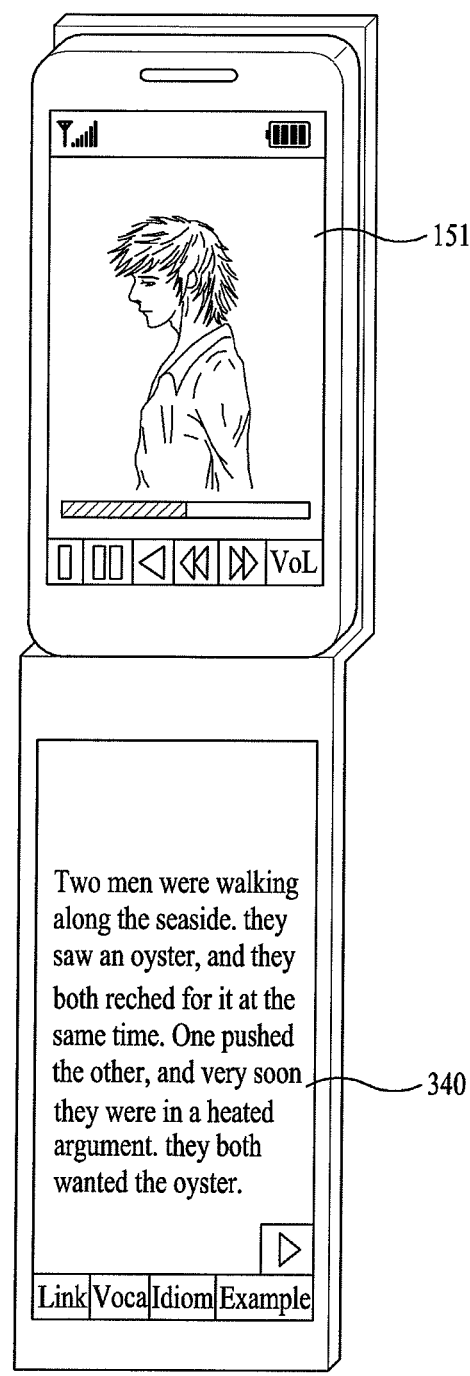
Figure 10B:
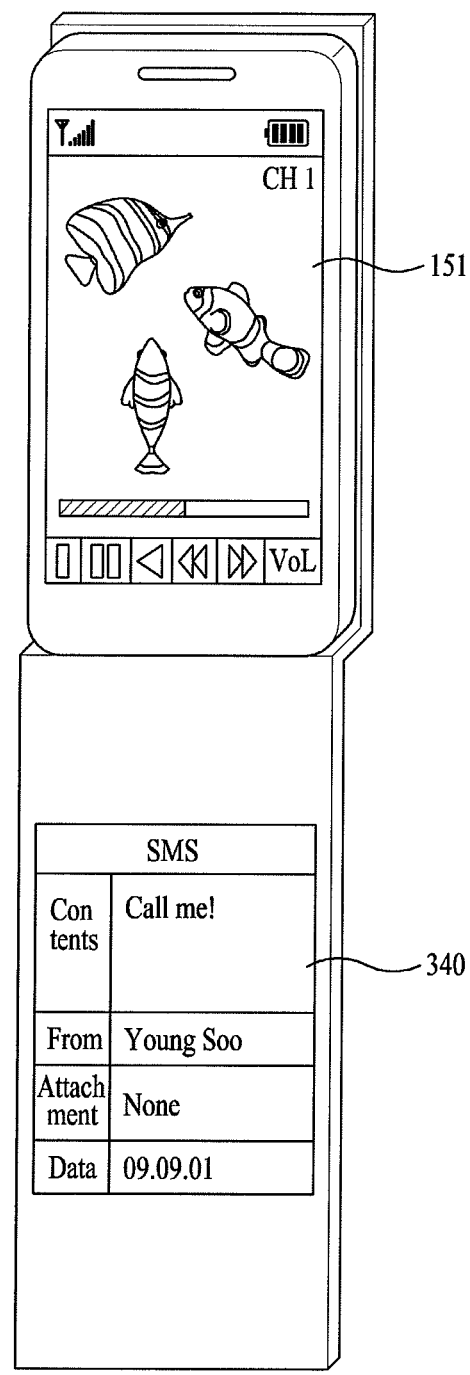
Figure 10C:
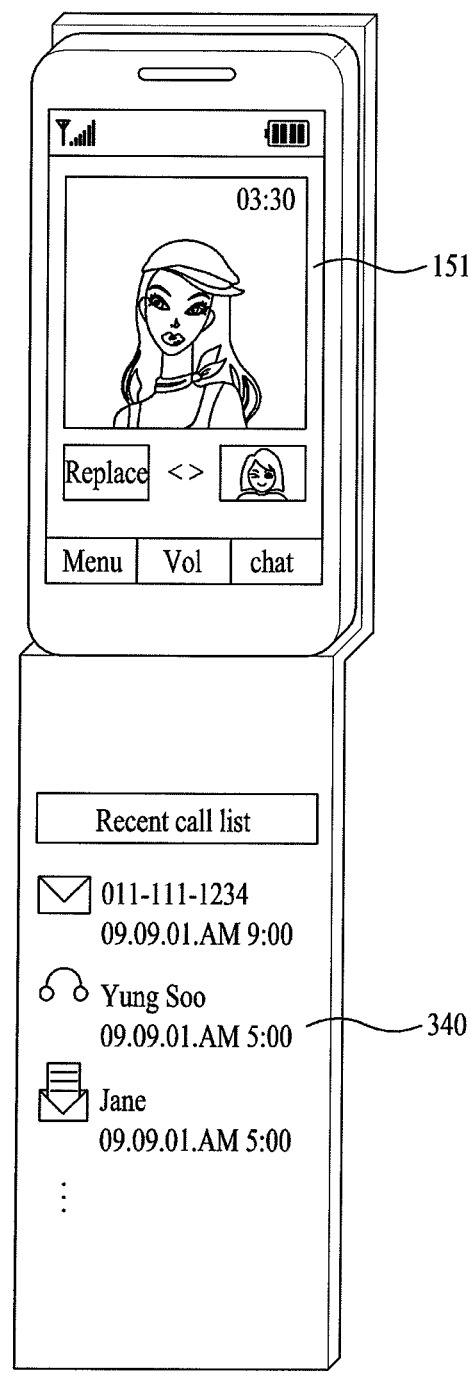

Referring to FIGS. 10A to 10C, the mobile terminal 100 is able to display a dynamic picture on the display unit 151 while displaying a static picture on the e-paper 340. Due to the properties of the e-paper 340, if the picture switching is performed over a predetermined count, it is unable to perform a display function any further. Therefore, a static picture having no picture switching is preferably displayed on the e-paper 340.

For instance, in case of performing a first function having a function executed picture set to a dynamic picture and a second function having a function executed picture set to a static picture (i.e., in case of multitasking), the mobile terminal 100 is able to display the function executed pictures of the first and second functions on the display unit 151 and the e-book 340, respectively.

For instance, the function having the function executed picture set to the dynamic picture can include one of a video play function (cf. FIG. 10A), a broadcast signal output function (cf. FIG. 10B), a video call function (cf. FIG. 10C) and the like. For another instance, the function having the function executed picture set to the static picture can include one of an e-book function (cf. FIG. 10A), a received message check function (cf. FIG. 10B), a call list check function (cf. FIG. 10C) and the like.

Referring now to FIG. 6, in the controlling step S620, the mobile terminal 100 is able to control a display operation of at least one of the e-paper 340 and the display unit 151 according to the closing or opening of the external case 500.

Regarding this, the following description is made in detail with reference to the accompanying drawings.

Figure 11A:
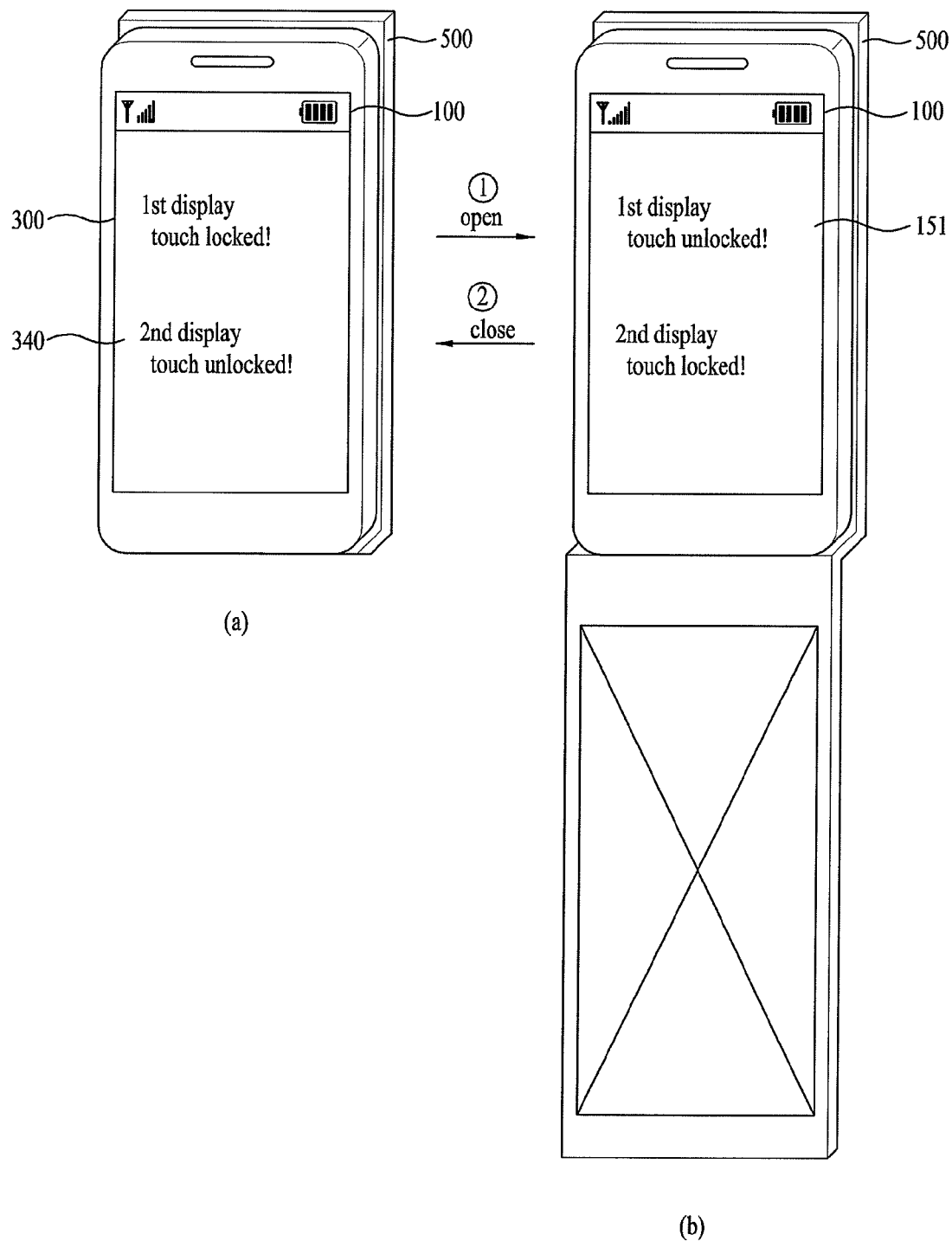
FIGS. 11A to 11E are diagrams of screen configurations for controlling a display operation in accordance with opening or closing of an external case according to the present invention.

FIG. 11A is a diagram for setting whether to lock a touch function of the display unit 151 or the e-paper 340 according to the closing or opening of the external case 500.

For clarity and convenience of the following description, assume that the e-paper kit 300 is attached to an outer face of the external case 500. And, assume that the mobile terminal 100 is attached to an inner face of the external case 500. Moreover, assume that each of the display unit 151 and the e-paper kit 300 includes a touchpad or a touchscreen.

First of all, if the external case 500 switches to an open configuration (b) from a closed configuration (a) [①], the mobile terminal 100 releases a touch function locked state of a first display unit (or the display unit 151) and is able to set a touch function locked state of a second display unit (or the e-paper 340).

Secondly, if the external case 500 switches from an open configuration (b) to a closed configuration (a) [②], the mobile terminal 100 sets a touch function locked state of a first display unit (or the display unit 151) and is able to release a touch function locked state of a second display unit (or the e-paper 340).

Meanwhile, if both of the mobile terminal 100 and the e-paper kit 300 are attached to the inner face of the external case 500, when the external case 500 switches to the open configuration from the closed configuration, the mobile terminal 100 releases the touch function locked states of the first and second display units 151 and 340. If the external case 500 switches from the open configuration to the closed configuration, the mobile terminal 100 is able to set the touch function locked states of the first and second display units 151 and 340 [not shown in the drawing].

Figure 11B:
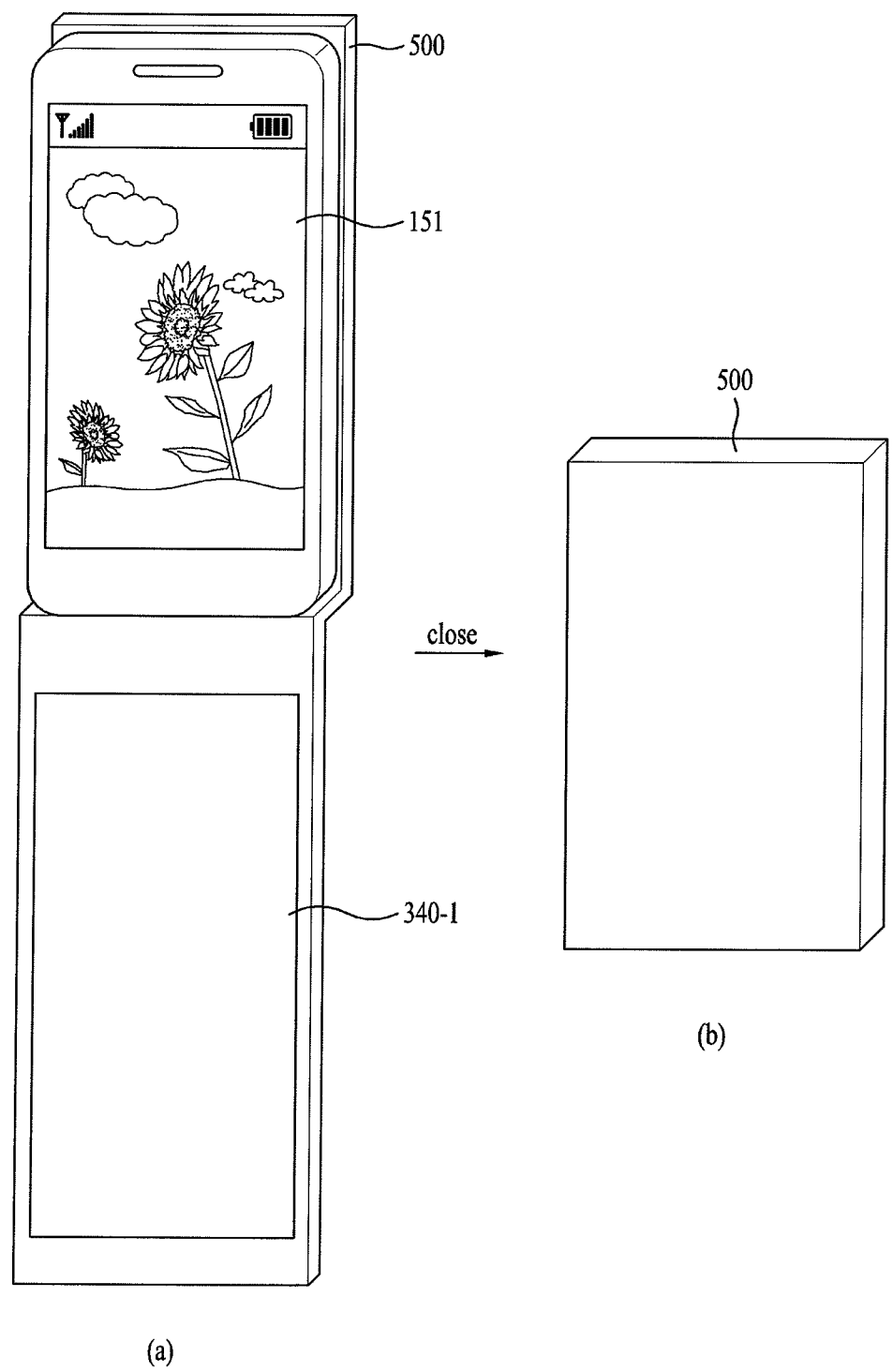

FIG. 11B and FIG. 11 are diagrams of screen configurations for changing a background picture displayed on the display unit 151 in accordance with opening or closing of an external case.

Referring to FIG. 11B, the mobile terminal 100 is able to display a first background picture via the display unit 151 in an open configuration of the external case 500.

Figure 11C:
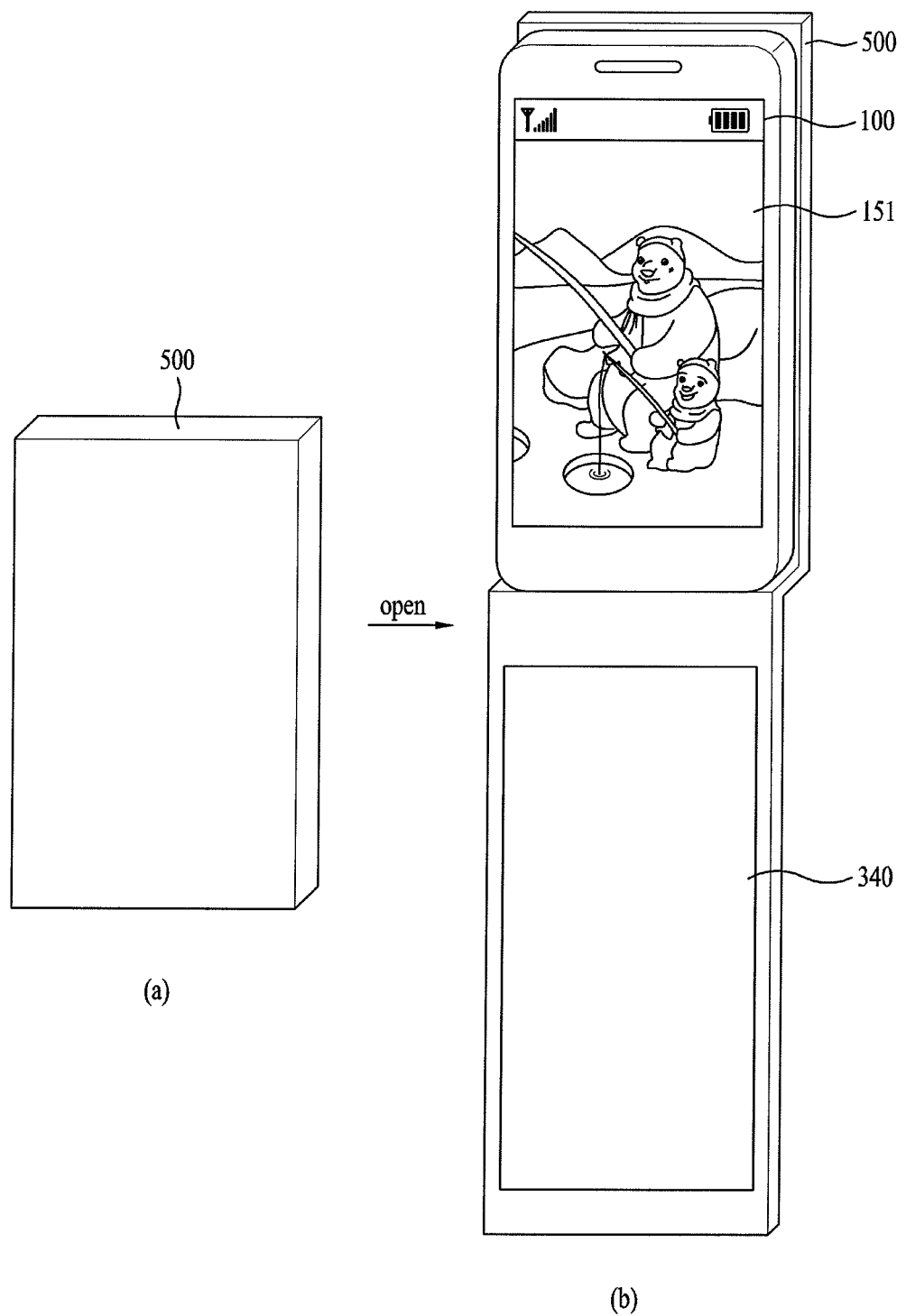

Referring to FIG. 11C, the mobile terminal 100 is able to display a second background picture via the display unit 151 if the external case 500 switches to the open configuration from the closed configuration (a) in FIG. 11B, in an open configuration of the external case 500.

Moreover, the mobile terminal 100 is able to display a third background picture via the display unit 151 if the external case 500 is re-opened by switching to the open configuration from the closed configuration shown in FIG. 11C.

Besides, while the first background picture is displayed, if the external case 500 is closed [cf. FIG. 11B], the mobile terminal 100 is able to perform a background picture switching function only if the external case 500 is opened within or after predetermined duration.

Figure 11D:
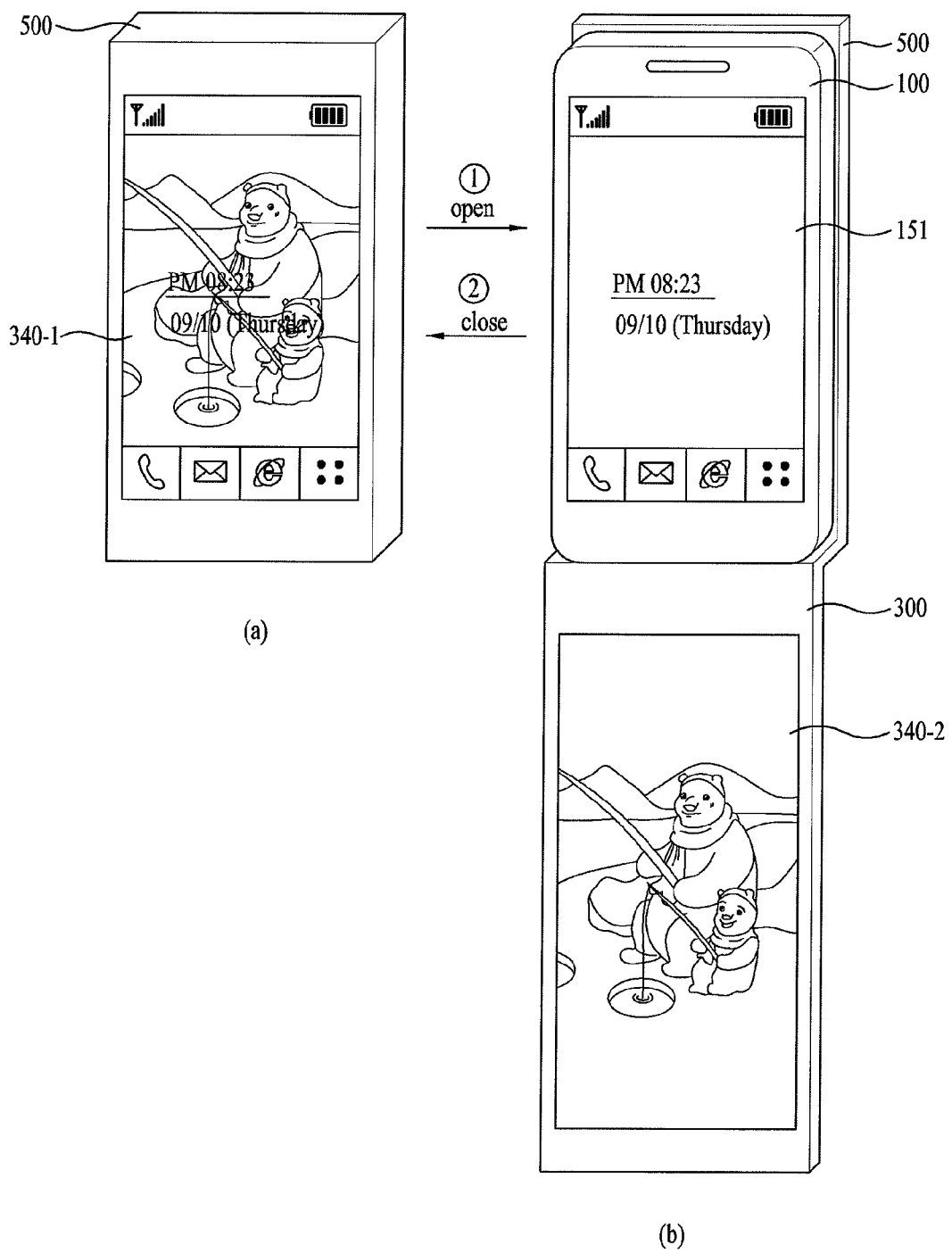

FIG. 11D is a diagram for performing a division display of a background image in accordance with opening or closing of the external case.

For clarity and convenience of the following description, assume that a background picture is divided into an image part (cf. reference number 340-2 shown in (b) of FIG. 11D) and an information part (cf. reference number 151 shown in (b) of FIG. 11D). And, assume that a first e-paper 340-1 and a second e-paper 340-2 are provided to outer and inner faces of an external case 500, respectively.

Referring to FIG. 11D, the mobile terminal 100 displays a background picture via the first e-paper 340-1 in a closed configuration of the external case 500 [(a)]. If the external case 500 switches to an open configuration, the mobile terminal 100 displays an information part of the background picture via the display unit 151 and also displays an image part of the background picture via the second e-paper 340-2 [(b)].

Of course, in (b) of FIG. 11D, the image part of the background picture is displayed via the display unit 151 and the information part of the background picture can be displayed via the second e-paper 340-2.

Figure 11E:
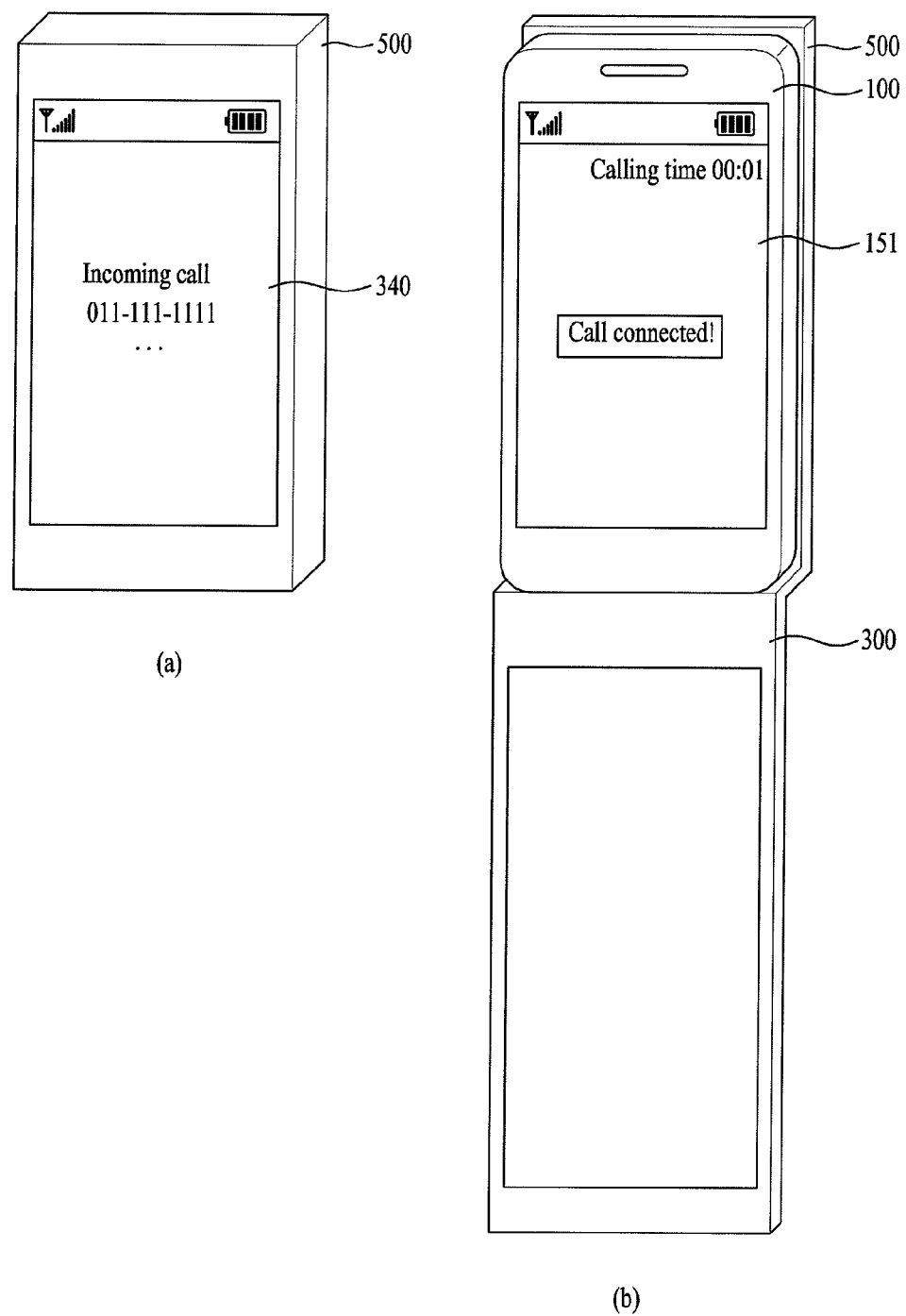

FIG. 11E is a diagram for connecting a received call in accordance with opening or closing of the external case.

Referring to FIG. 11E, in case of receiving a call in a closed configuration of the external case 500, the mobile terminal 100 displays call reception indication information via an e-paper 340 provided to an outer face of the external case 500 [(a)]. If the external case 500 switches to an open configuration, the mobile terminal 100 is able to communicate with a correspondent party terminal by connecting the received call [(b)].

Meanwhile, in case of receiving a message in a closed configuration of the external case 500, the mobile terminal 100 displays the message reception indication information on the e-paper 340. If the external case 500 switches to the open configuration, the mobile terminal 100 is able to display contents of the received message [not shown in the drawing].

Referring now to FIG. 6, in the controlling step S620, in case of detecting that one portion of the e-paper kit 300 (particularly, the e-paper 340) is folded or rolled up, the mobile terminal 100 is able to control a display operation of at least one of the e-paper 340 and the display unit 151. Of course, if the folded/rolled portion of the e-paper kit 300 is unfolded/straightened, the mobile terminal 100 is able to control a corresponding display operation to be executed.

Regarding this, the following description is made in detail with reference to the accompanying drawings.

FIGS. 12A to 12D are diagrams of screen configurations for controlling a display operation in case that an electronic paper is partially folded or rolled up according to the present invention.

Figure 12A:
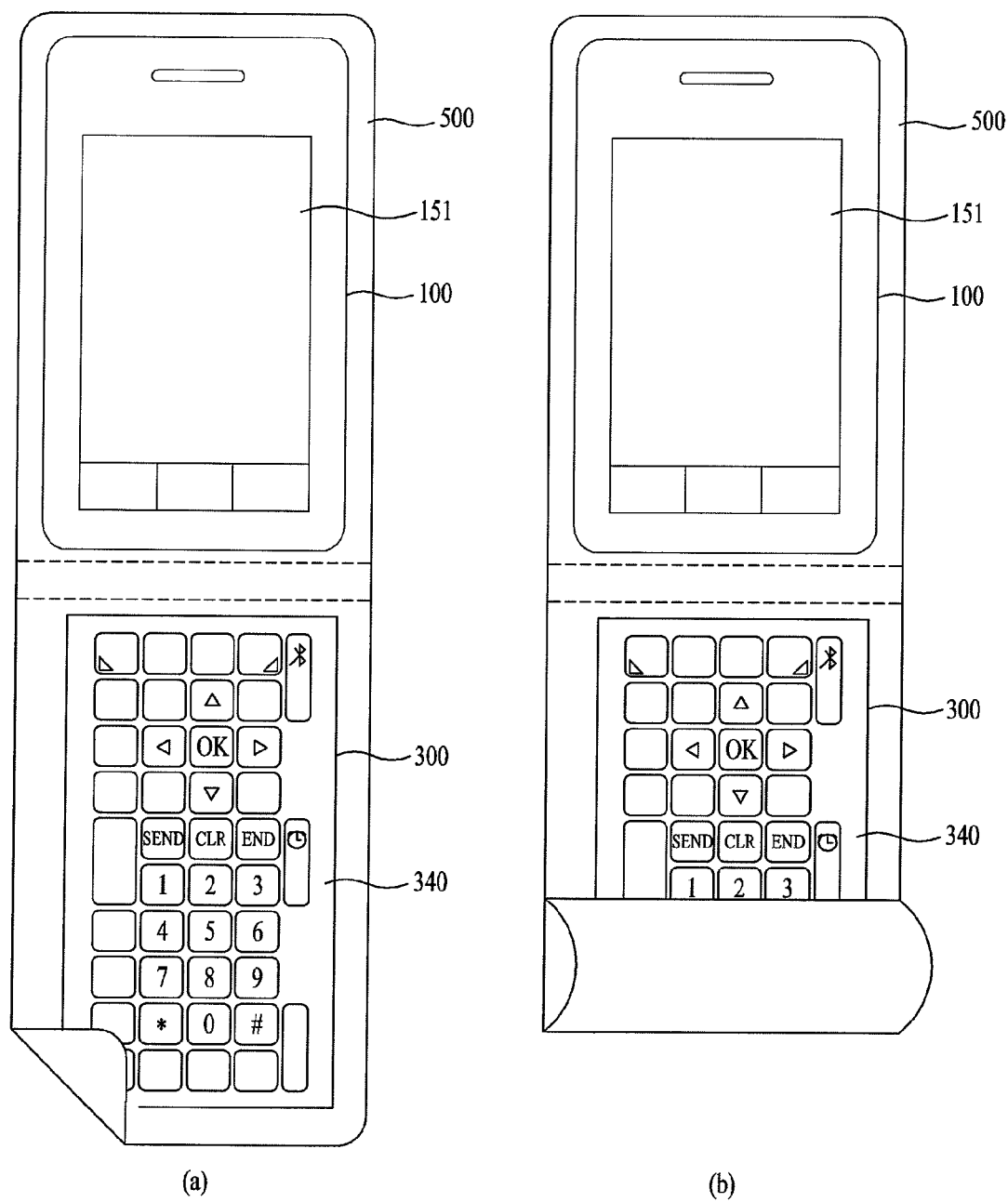
FIGS. 12A to 12D are diagrams of screen configurations for controlling a display operation in case that an electronic paper is partially folded or rolled up according to the present invention.

Referring to FIG. 12A, one portion of the e-paper 340 or the e-paper kit 300 can be folded or rolled up. In this case, the e-paper 340 or the e-paper kit 300 should be formed of a modifiable material.

Figure 12B:
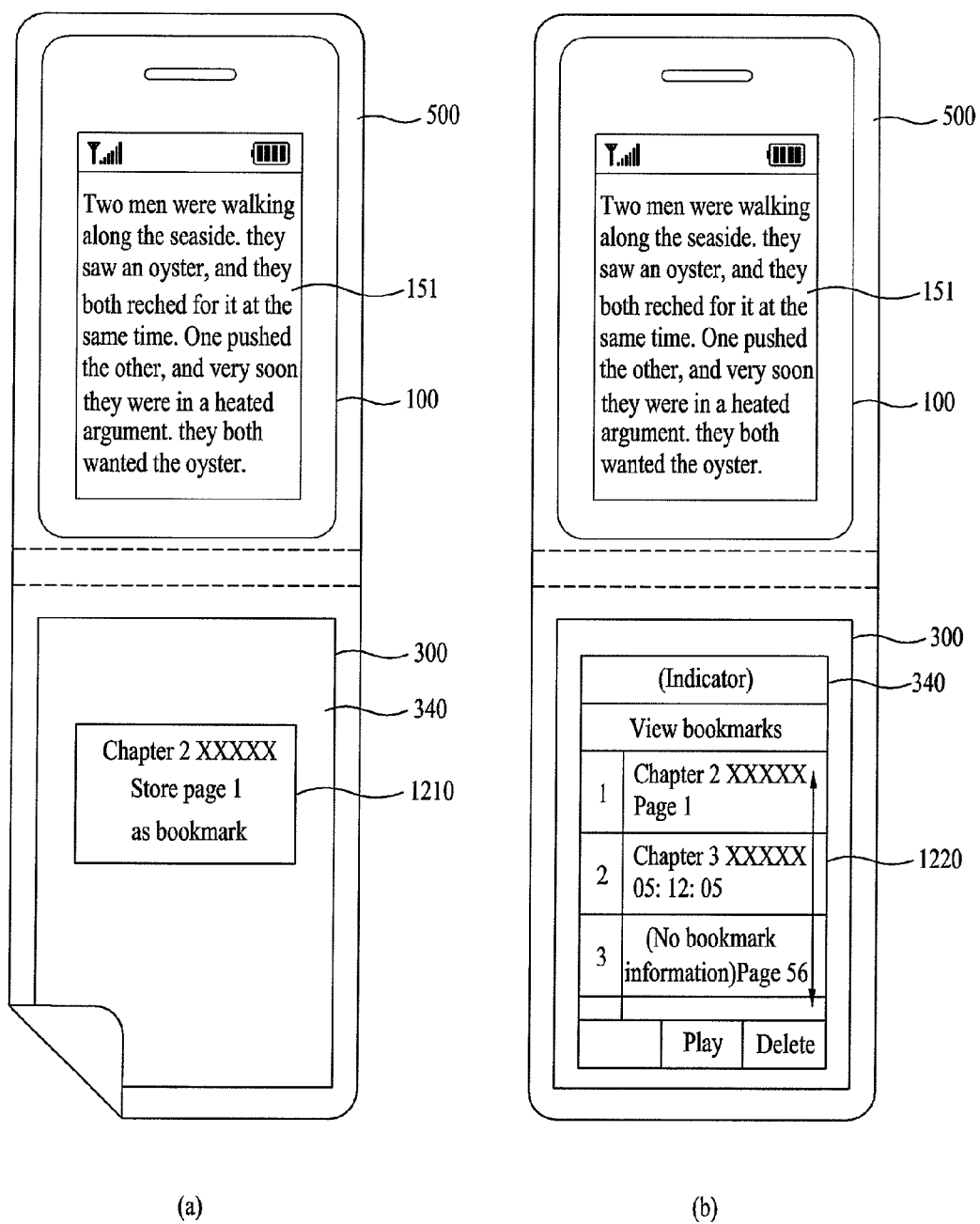

Referring to FIG. 12B, as an e-book function is executed, while a specific page is displayed via the display unit 151, if one portion of the e-paper 340 is folded, the mobile terminal 100 is able to store the specific page as a bookmark.

If the folded portion is unfolded, the mobile terminal 100 is able to display a bookmark list 1220 via the e-paper 340 [(b)]. In this case, the bookmark corresponding to the specific page in the bookmark list can be displayed in a manner of being identified.

Figure 12C:
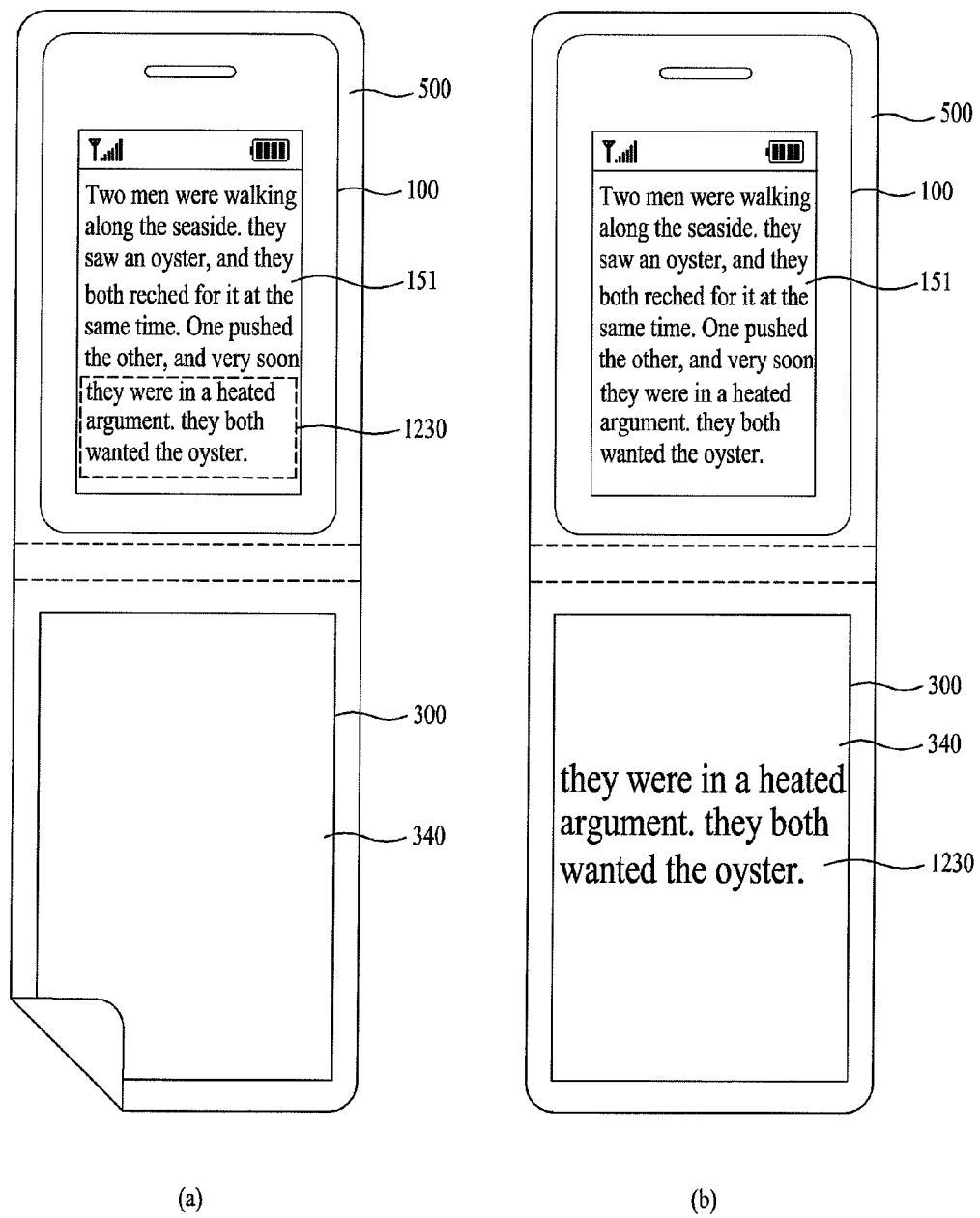

Referring to FIG. 12C, as an e-book function is executed, while a specific page is displayed via the display unit 151, if one portion of the e-paper 340 is folded or rolled up to block one portion 1230 of the display unit 151 [(a)], the mobile terminal 100 is able to display a content corresponding to the blocked portion 1230 via the e-paper 340 [(b)], store the specific page as a bookmark.

Figure 12D:
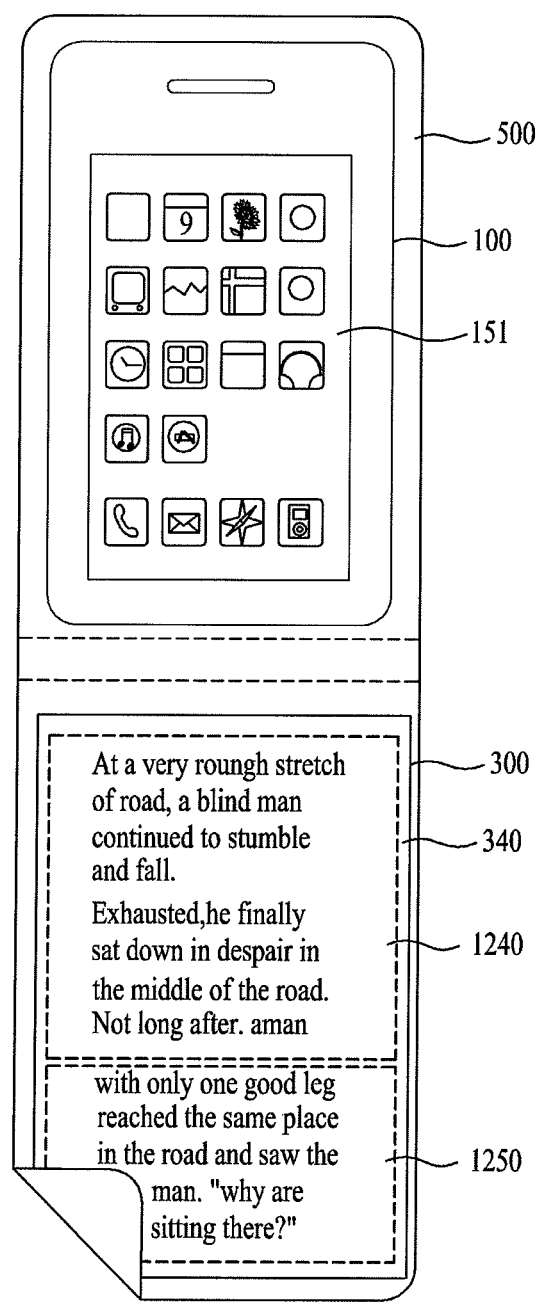

Referring to FIG. 12D, while information is displayed via the e-paper 340, if one portion of the e-paper 340 is folded or rolled up and then blocked, the mobile terminal 100 displays updated information via a non-blocked portion 1240 and displays no information on the blocked portion 1250 or keeps holding the information displayed before being blocked.

Figure 13A:
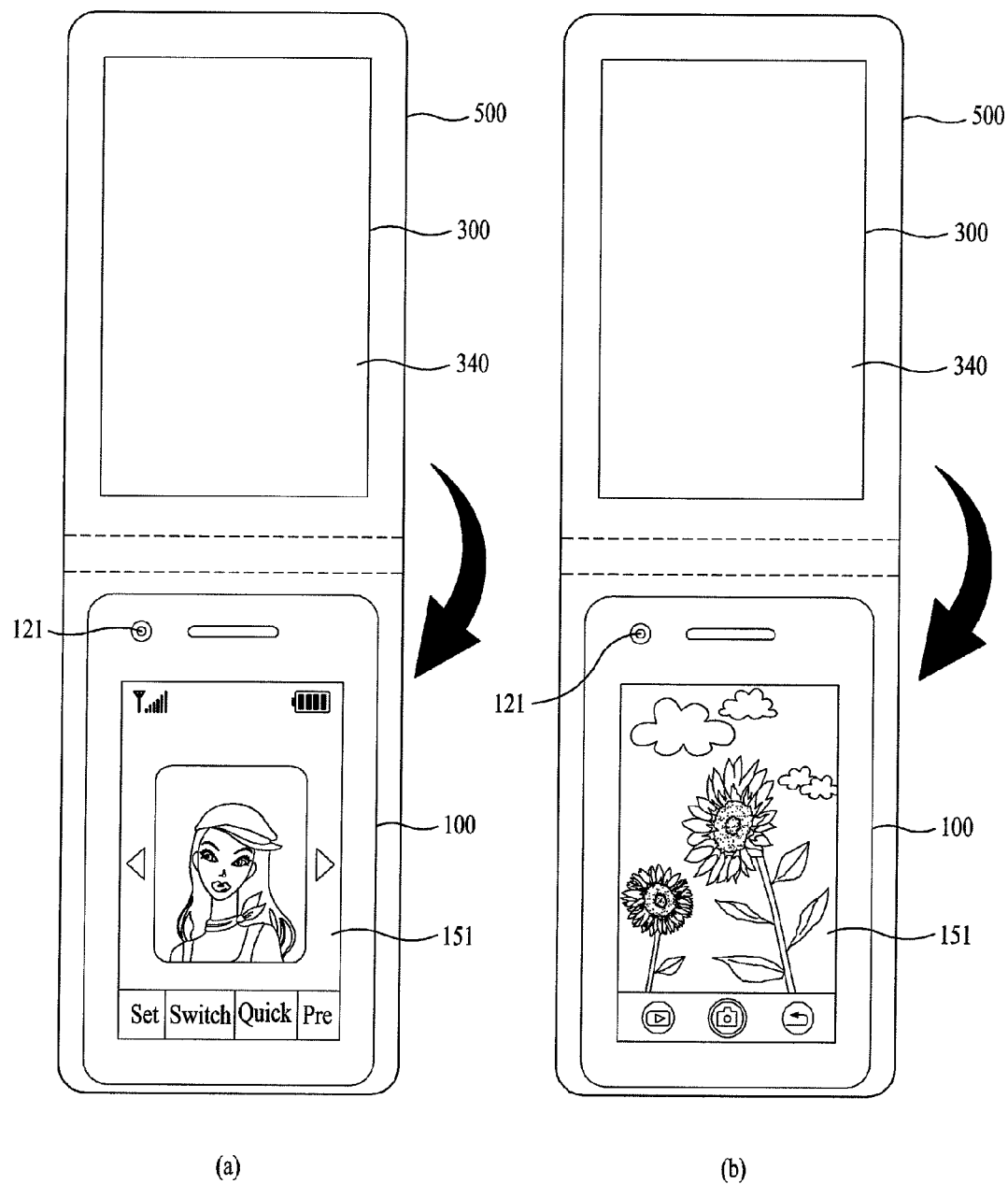
FIGS. 13A to 13C are diagrams of screen configurations for controlling a camera photographing action in case that an electronic paper is partially folded or rolled up toward a camera according to the present invention.
Figure 13B:
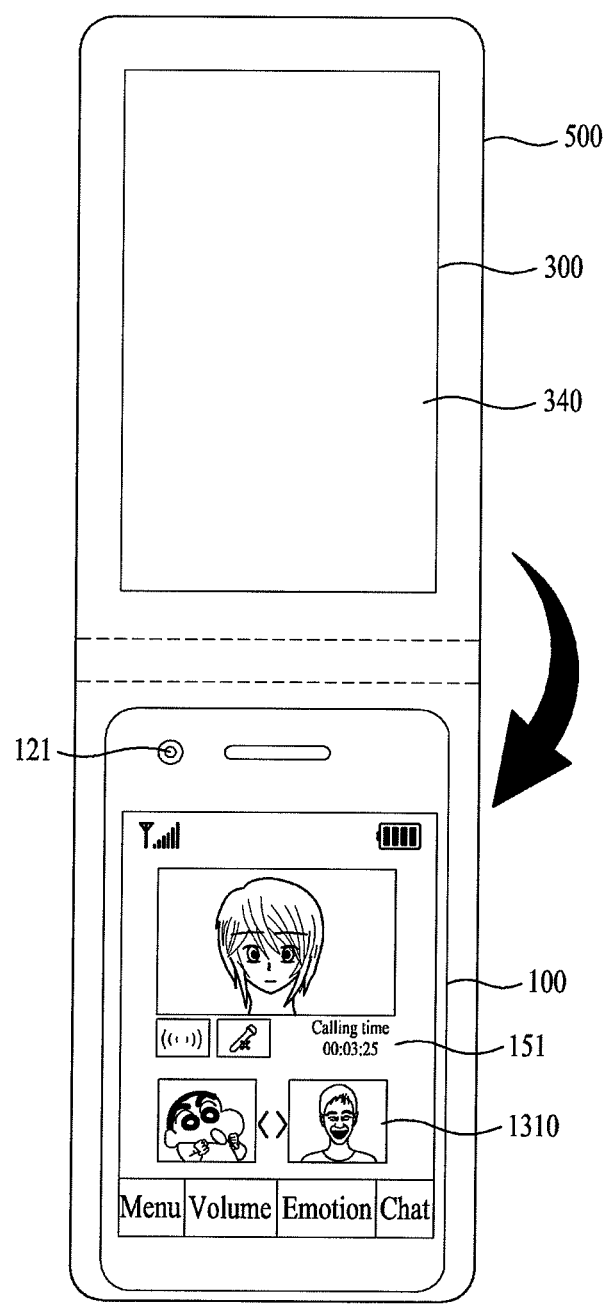
Figure 13C:
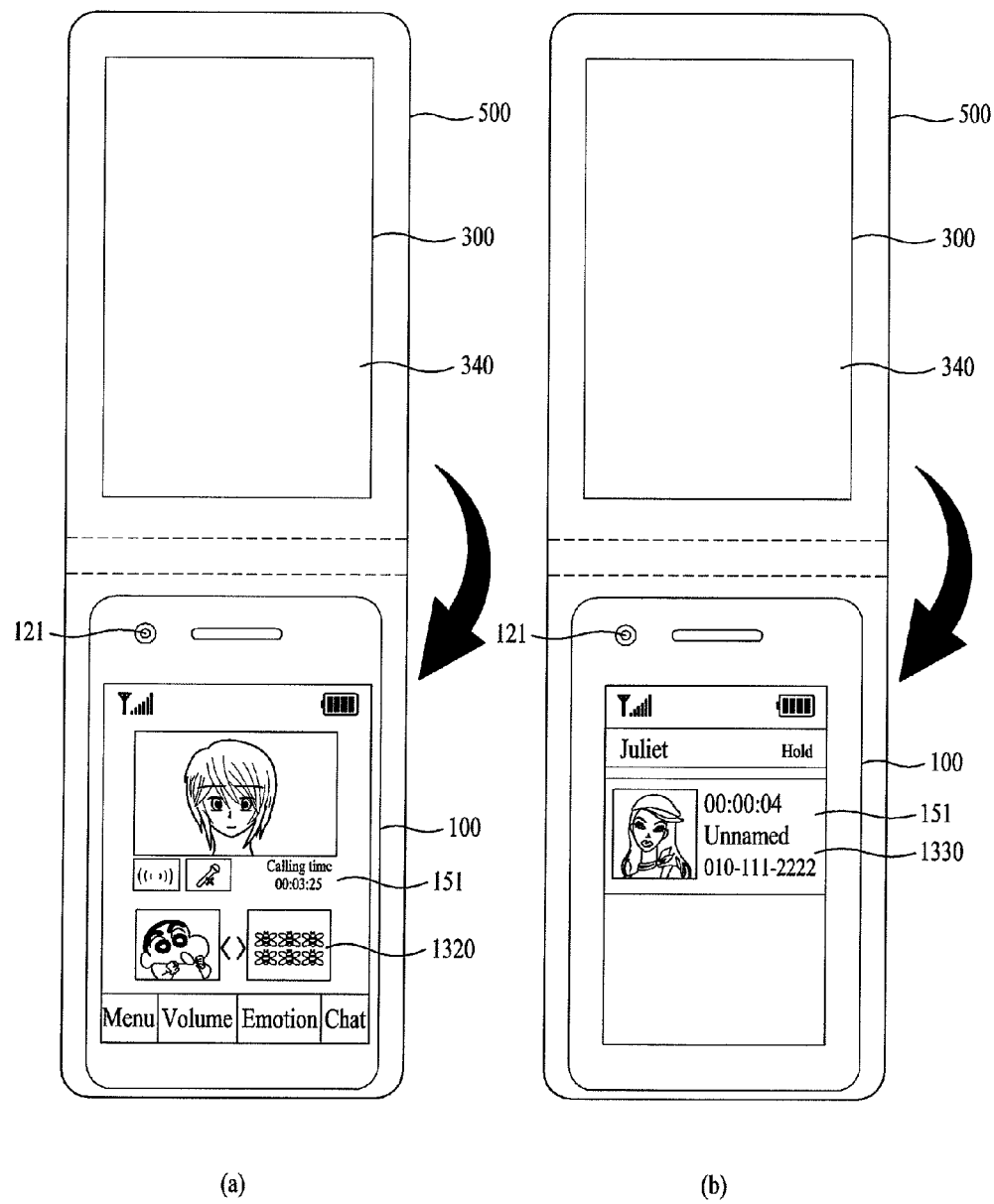

FIGS. 13A to 13C are diagrams of screen configurations for controlling a camera photographing action in case that an electronic paper is partially folded or rolled up toward a camera according to the present invention.

Referring to FIG. 13A, when a self-photographing is performed using the camera 121 provided to a front side of the mobile terminal 100, if one portion of the e-paper 340 is folded or rolled up to block a lens of the camera 121 [(a)], the mobile terminal 100 is able to set a normal camera photographing mode by activating another camera 121' provided to a backside of the mobile terminal 100 [(b)].

Referring to FIG. 13B and FIG. 13C, when a video call is performed using the camera 121 provided to a front side of the mobile terminal 100, if one portion of the e-paper 340 is folded or rolled up to block a lens of the camera 121 [(a)], the mobile terminal 100 automatically transmits an alternative video [FIG. 13C (a)] or performs a speech call with a correspondent party of the video call by switching to a voice call mode [FIG. 13C (b)].

Furthermore, according to the present invention, if the display function of the display unit 151 is deactivated in an open configuration of the external case 500, the mobile terminal 100 is able to display terminal relevant information via the e-paper 340.

Regarding this, the following description is made in detail with reference to the accompanying drawings.

Figure 14A:
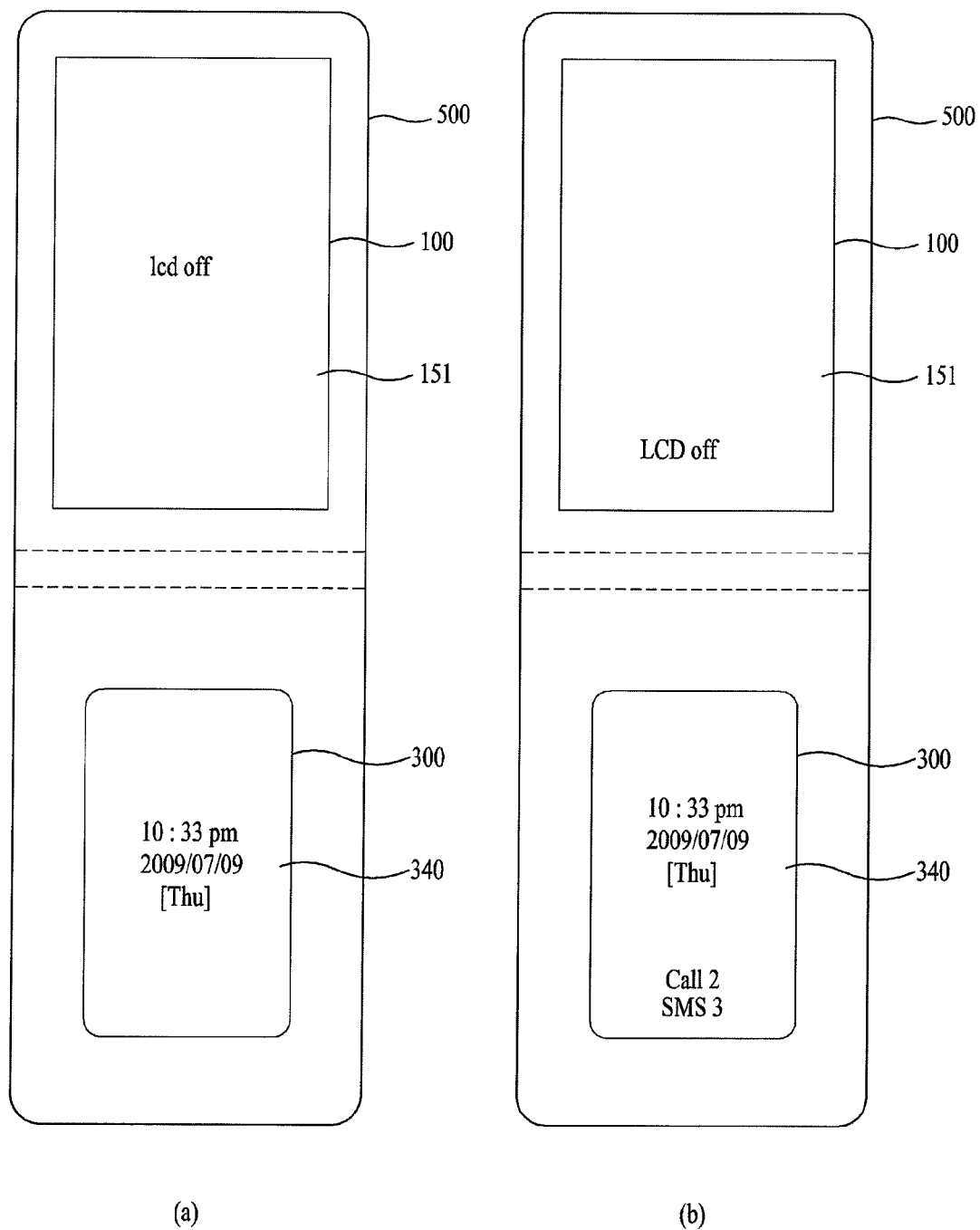
Figure 14B:
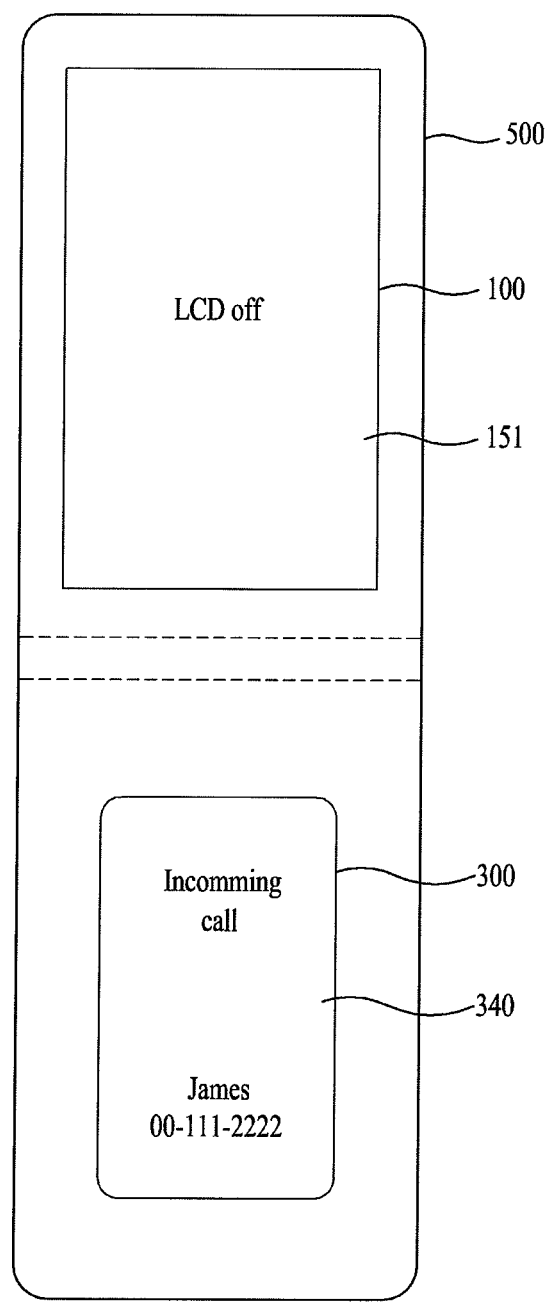

FIGS. 14A to 14C are diagrams of screen configurations for performing a display operation using an electronic paper in inactive mode of a display unit according to the present invention.

Referring to FIG. 14A, if the display unit 151 is deactivated, the mobile terminal 100 displays visual information via the e-paper 340 [(a)] or displays even occurrence information (e.g., a received call count, a received message count, etc.) [(b)].

Referring to FIG. 14B, in case of receiving a call in inactive mode of the display unit 151, the mobile terminal 100 is able to display incoming call indication information via the e-paper 340.

Referring to FIG. 14C, while a portion of the e-paper 340 is folded, when incoming call indication information is displayed via the e-paper 340 [(a)], if the folded portion is unfolded, the mobile terminal 100 is able to display the incoming call indication information via the display unit 151 by activating the display unit 151.

Moreover, according to the present invention, if the external case 500 having the mobile terminal 100 and the e-paper kit 300 attached thereto is rotated, the mobile terminal 100 is able to control the display operations according to a configuration of the rotation.

Regarding this, the following description is made in detail with reference to the accompanying drawings.

Figure 15A:
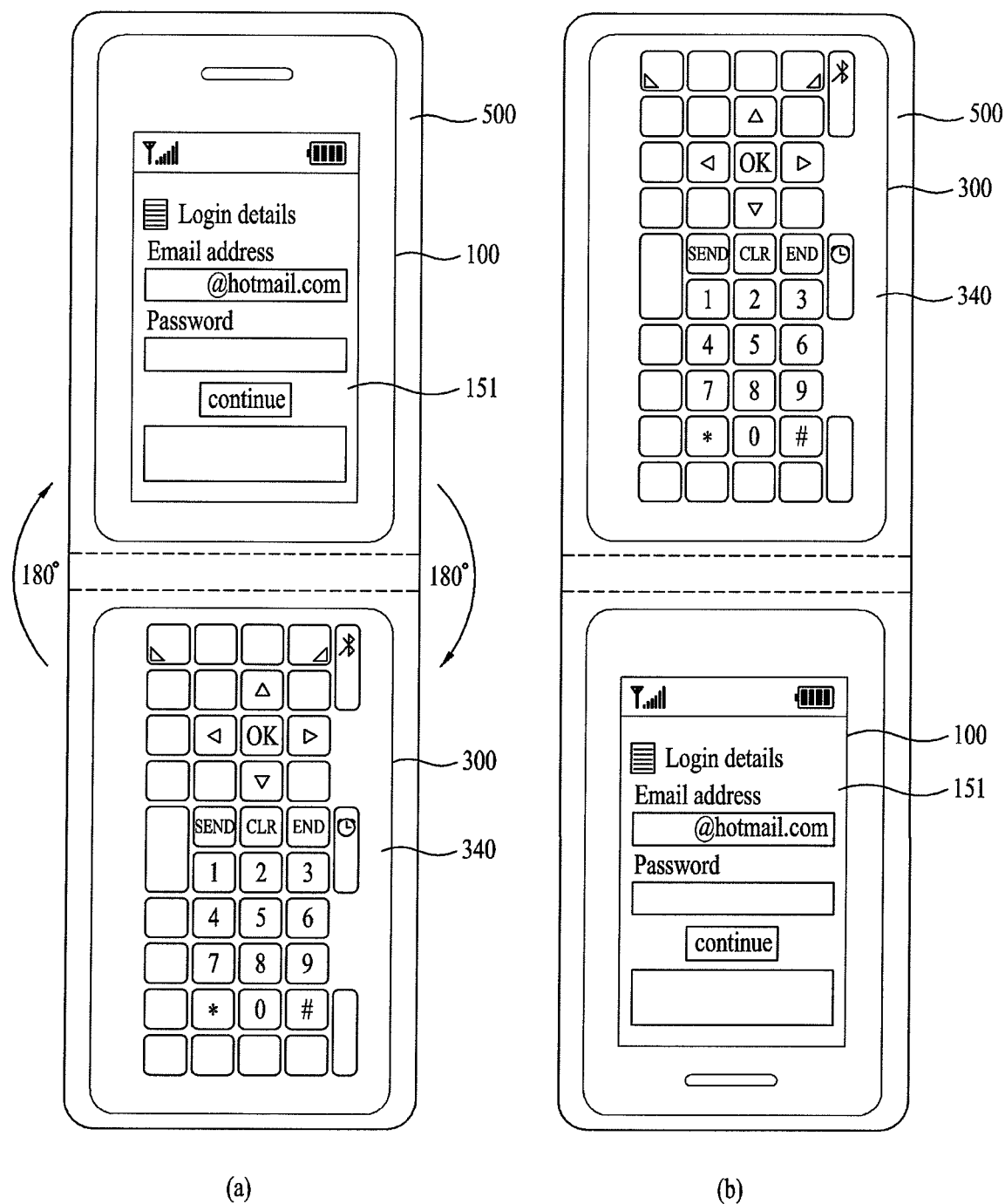
Figure 15B:
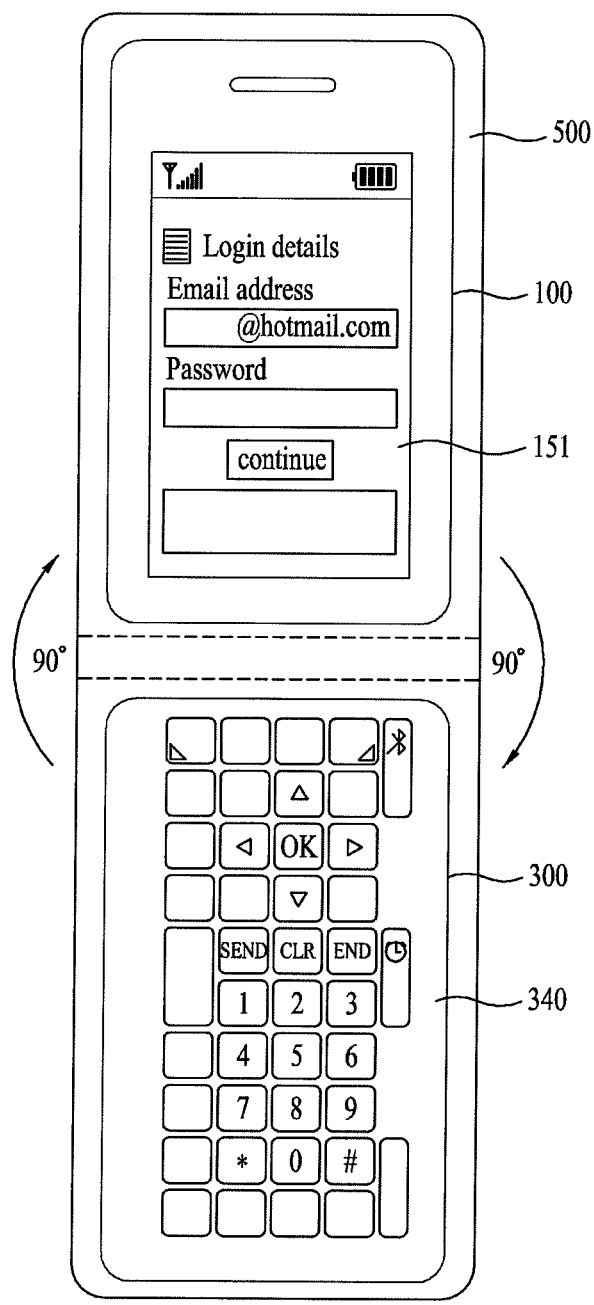

FIGS. 15A to 15C are diagrams of screen configurations for controlling a display operation in accordance with rotation of an external case provided with a mobile terminal and an electronic paper kit according to the present invention.

Referring to FIG. 15A, if the external case 500 is rotated by 180 degrees in an open configuration of the external case 500, the mobile terminal 100 is able to display pictures in a manner of rotating the pictures displayed on the display unit 151 and the e-paper 340 by 180 degrees, respectively.

Referring to FIG. 15A and FIG. 15C, if the external case 500 is rotated by 90 degrees counterclockwise in an open configuration of the external case 500 [FIG. 15B], the mobile terminal 100 is able to display pictures in a manner of rotating the pictures displayed on the display unit 151 and the e-paper 340 by 90 degrees clockwise, respectively [FIG. 15C].

This is to always provide a user with an upright picture despite the rotation of the external case 500.

Referring now to FIG. 6, in the controlling step S620, the mobile terminal 100 is able to control a display operation of at least one of the e-paper 340 and the display unit 151 in accordance with at least one of a presence or non-presence of a connection of the mobile terminal 100 to the external case 500 and a connected type of the mobile terminal 100 to the external case 500.

Meanwhile, if the e-paper kit 300 is disconnected from the mobile terminal 100, the controller 180 controls the display unit 151 to perform a display operation corresponding to the disconnected state. And, the control means 310 of the e-paper kit 300 is able to control the e-paper 340 to perform a display operation corresponding to the disconnected state.

Regarding this, the following description is made in detail with reference to the accompanying drawings.

FIGS. 16 to 21B are diagrams of screen configurations for controlling a display operation in accordance with a presence or non-presence of a connection of a mobile terminal to an external case or a connected/disconnected type of the mobile terminal according to the present invention.

Figure 16:
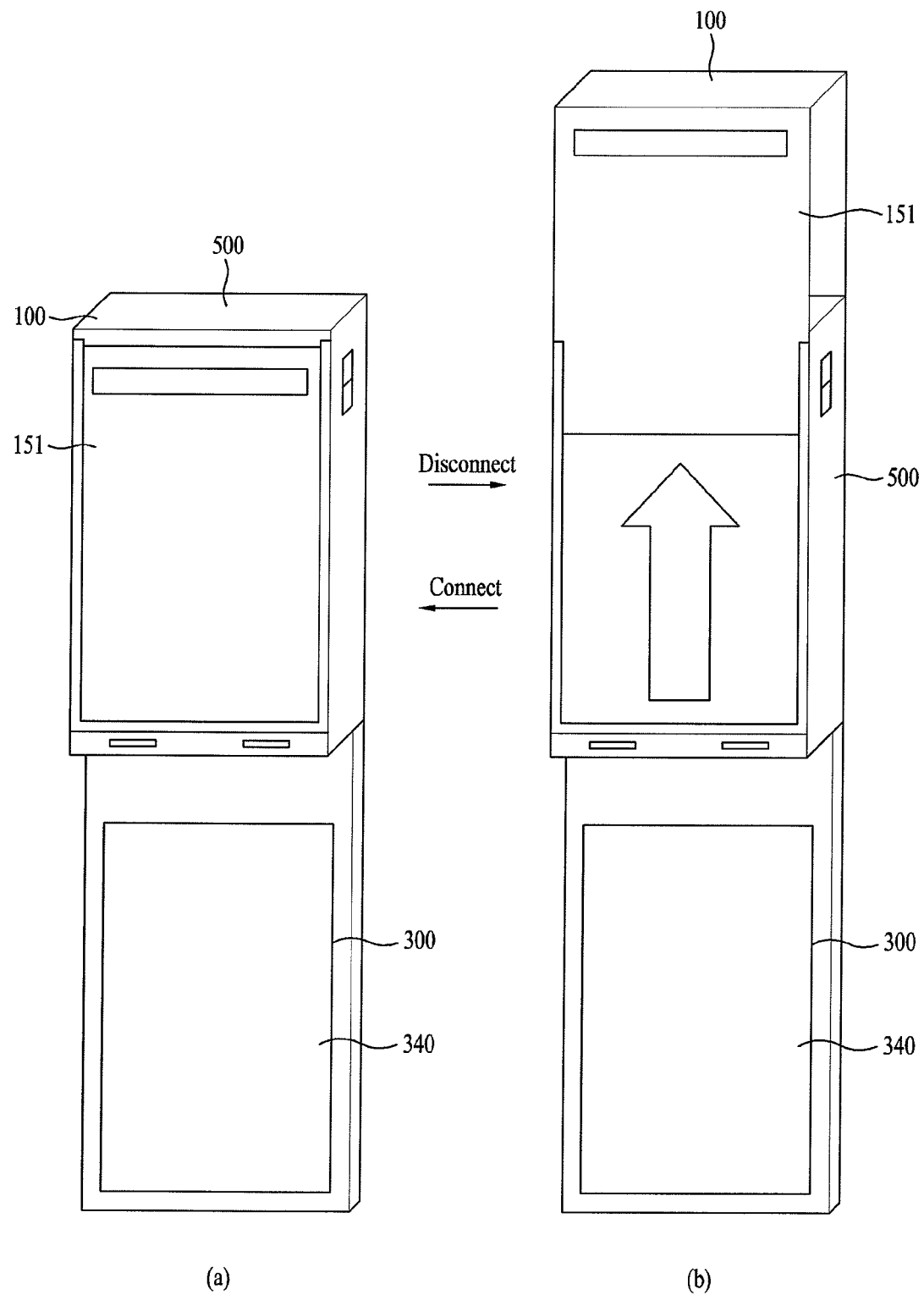
FIGS. 16 to 21B are diagrams of screen configurations for controlling a display operation in accordance with a presence or non-presence of a connection of a mobile terminal to an external case or a connected/disconnected type of the mobile terminal according to the present invention.

FIG. 16 shows a case (a) of connecting the mobile terminal 100 to the external case 500 and a case (b) of disconnecting the mobile terminal 100 from the external case 500. Moreover, if the mobile terminal 100 is connected to the external case 500, the mobile terminal 100 deactivates a display function of the display unit 151. If the mobile terminal 100 is disconnected from the external case 500, the mobile terminal 100 is able to activate the display function of the display unit 151.

Figure 17A:
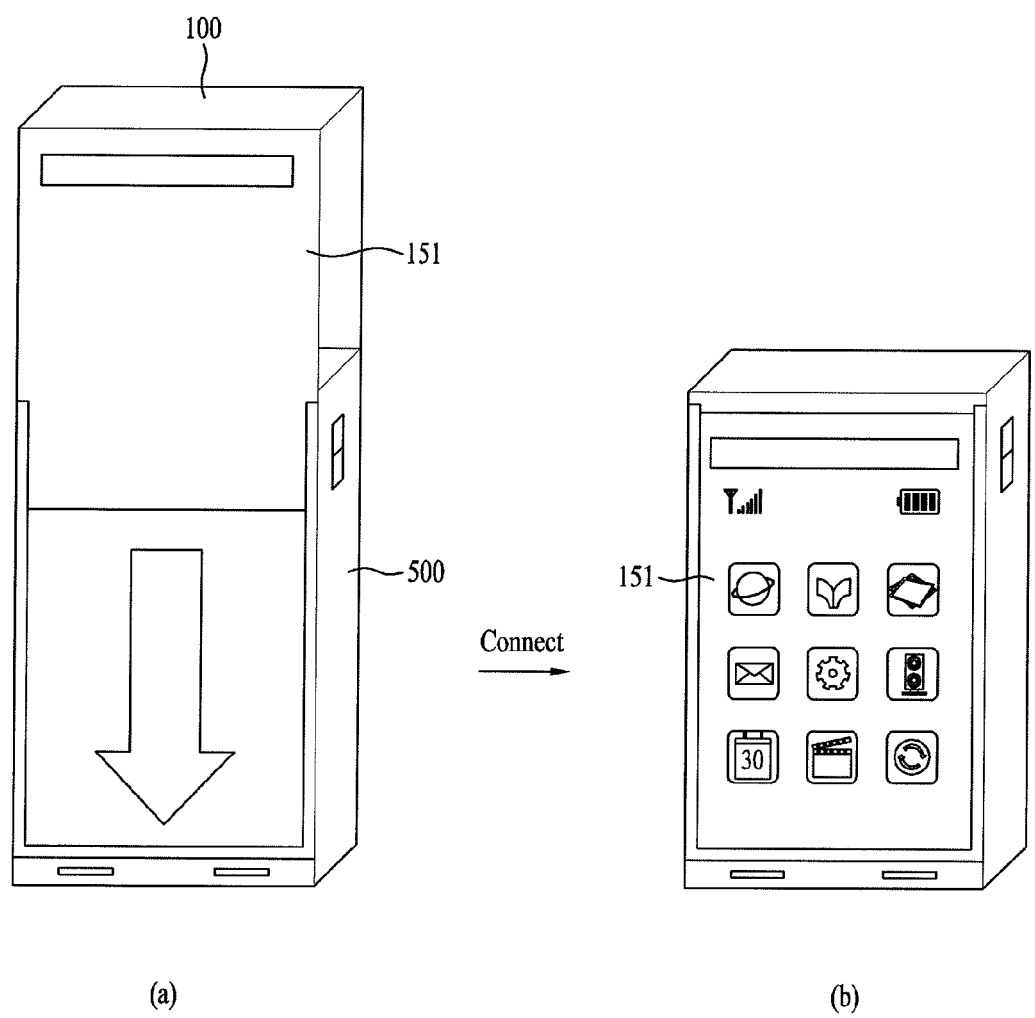
Figure 17B:
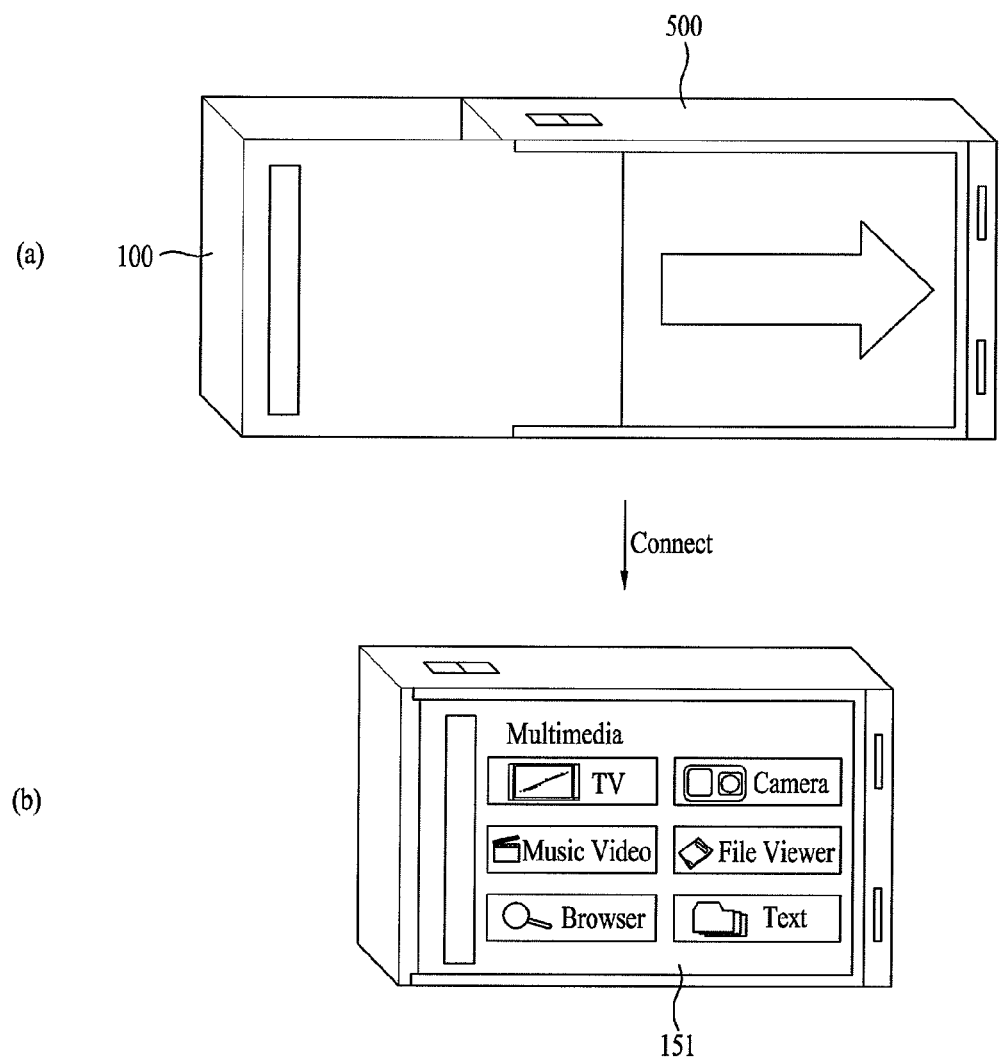

Referring to FIG. 17A and FIG. 17B, in case that the mobile terminal 100 is connected to the external case 500, the mobile terminal 100 displays a general menu picture via the display unit 151 [FIG. 17A]. In case that the mobile terminal 100 is disconnected from the external case 500, the mobile terminal 100 is able to display a multimedia menu picture via the display unit 151 [FIG. 17B].

Meanwhile, in case that the mobile terminal 100 is vertically connected to the external case 500, the mobile terminal 100 displays a general menu picture via the display unit 151 [not shown in the drawing]. In case that the mobile terminal 100 is horizontally connected to the external case 500, the mobile terminal 100 displays a multimedia menu picture via the display unit 151 [not shown in the drawing].

Figure 18A:
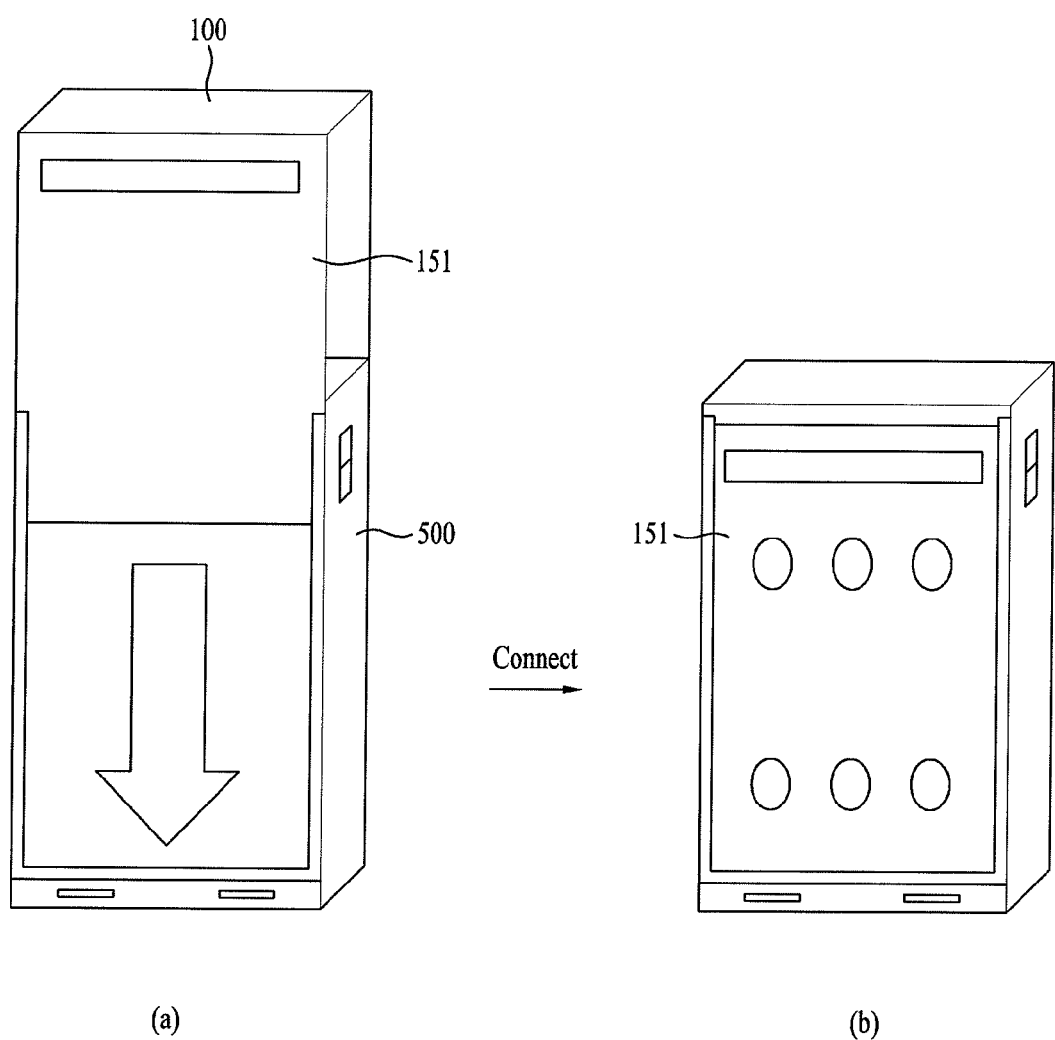
Figure 18B:
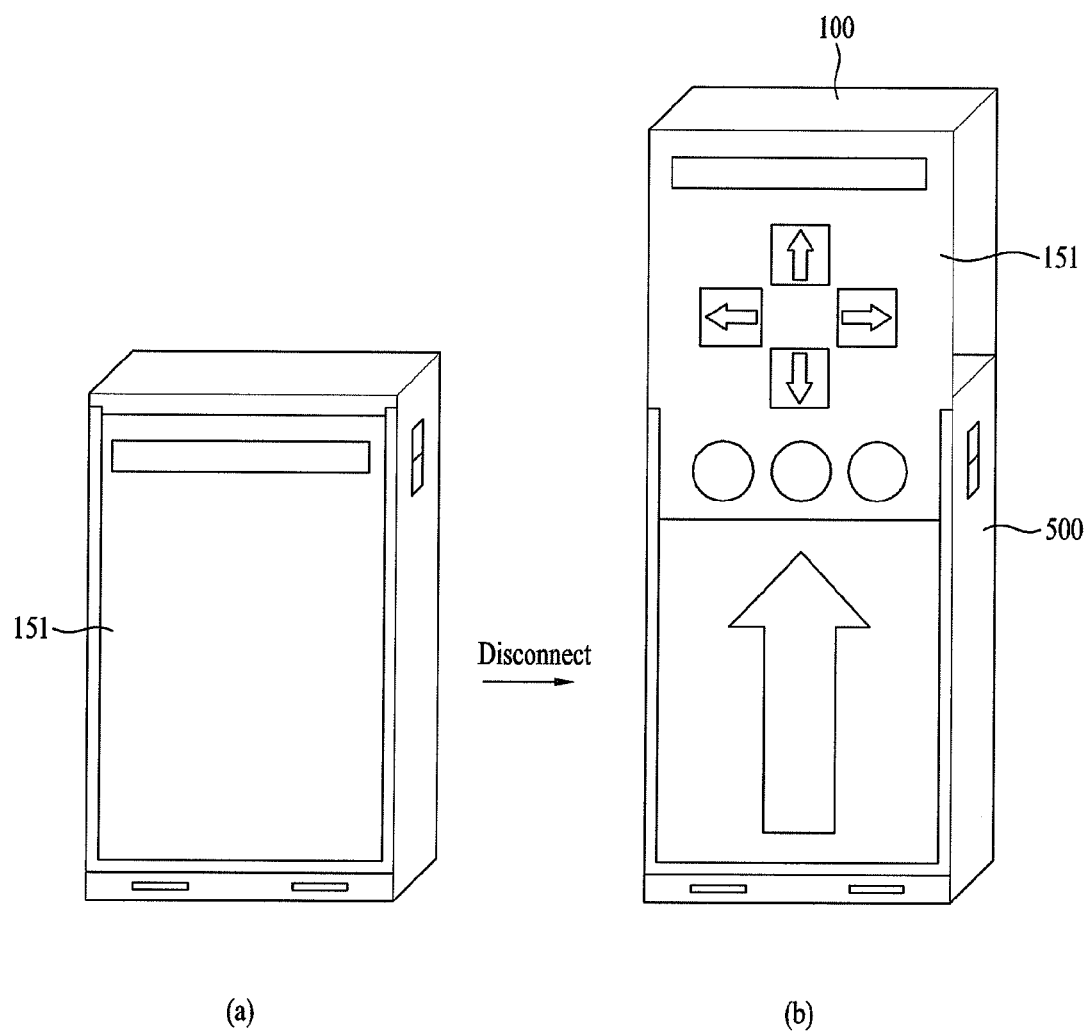

Referring to FIG. 18A and FIG. 18B, in case that the mobile terminal 100 is connected to the external case 500, the mobile terminal 100 displays a touchscreen menu picture via the display unit 151 [FIG. 18A]. In case that the mobile terminal 100 is disconnected from the external case 500, the mobile terminal 100 is able to display a keypad manipulation menu picture via the display unit 151 [FIG. 18B].

Meanwhile, in case that the mobile terminal 100 is vertically connected to the external case 500, the mobile terminal 100 displays a touchscreen menu picture via the display unit 151 [not shown in the drawing]. In case that the mobile terminal 100 is horizontally connected to the external case 500, the mobile terminal 100 displays a keypad manipulation menu picture via the display unit 151 [not shown in the drawing].

Figure 19A:
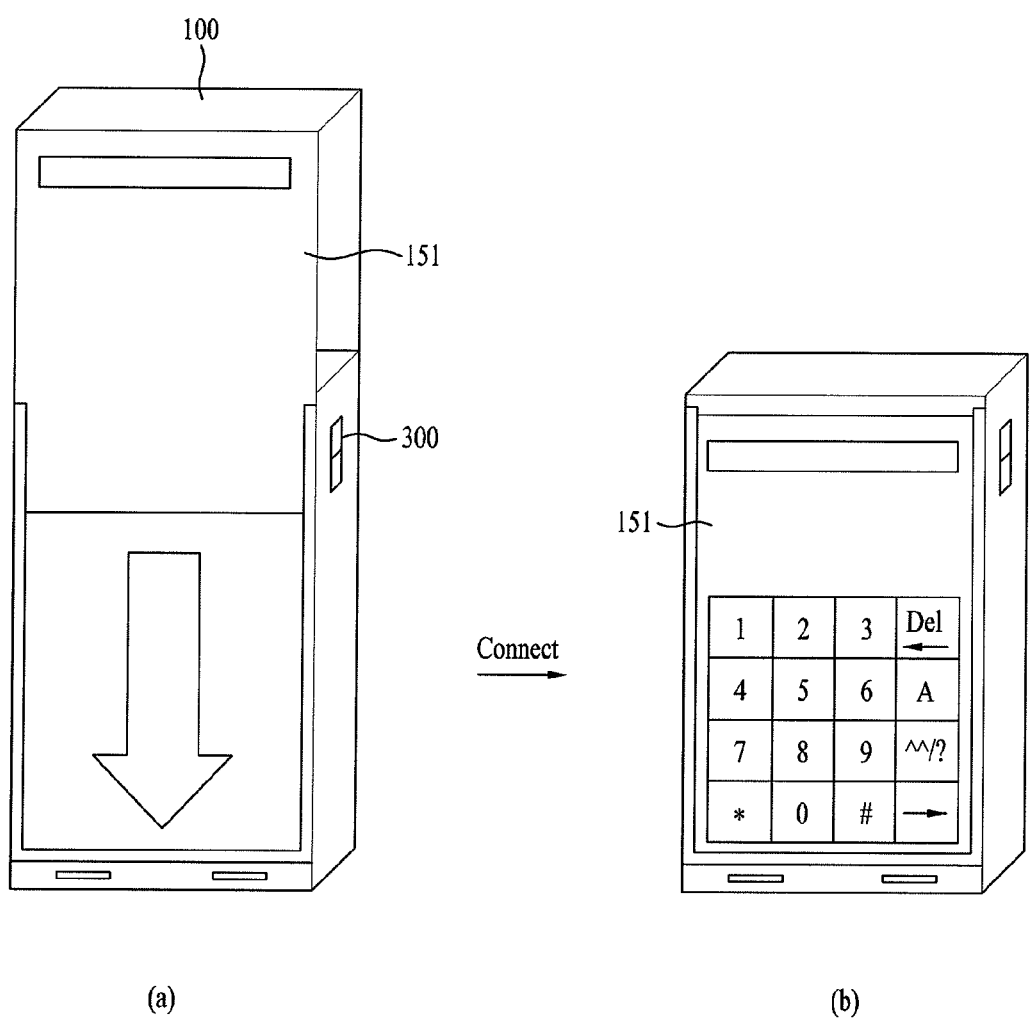
Figure 19B:
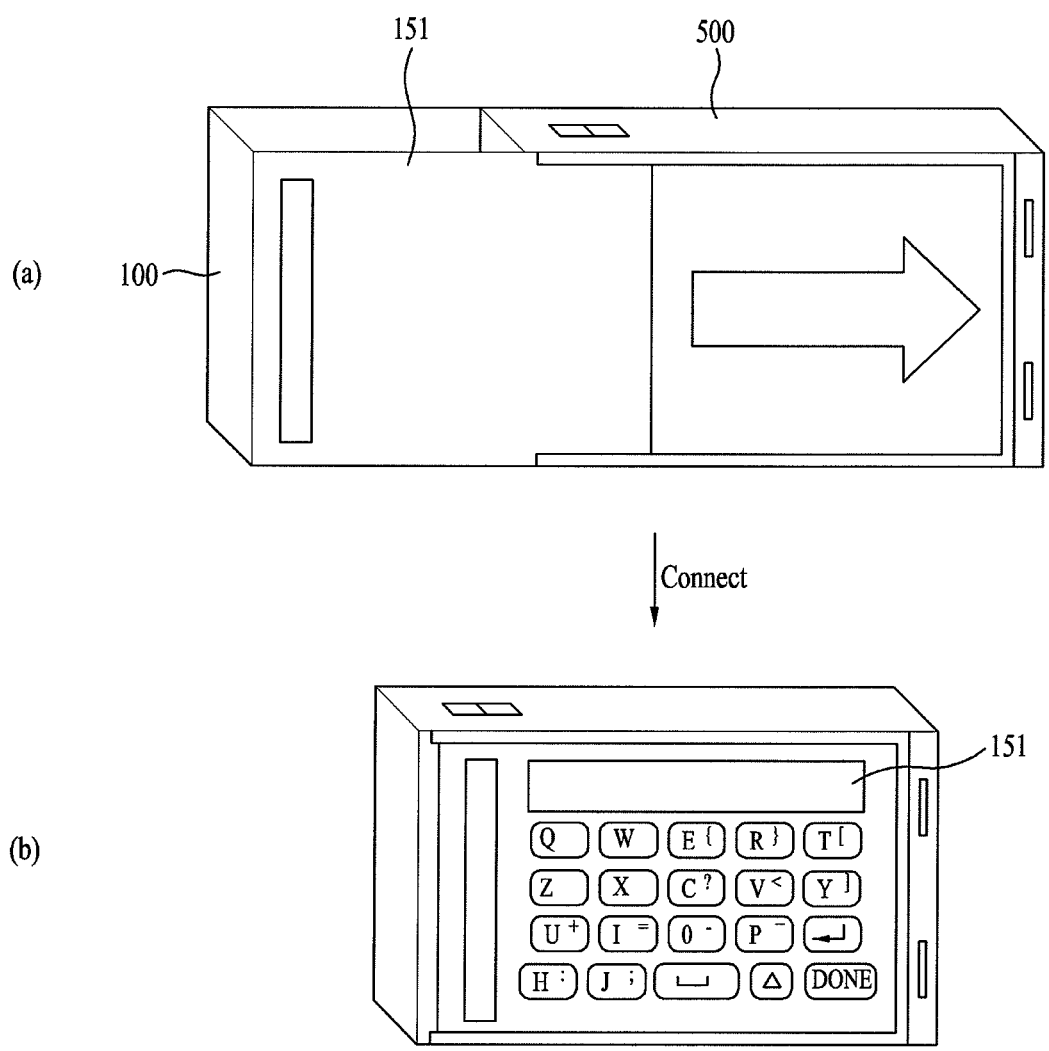

Referring to FIG. 19A and FIG. 19B, in case that the mobile terminal 100 is vertically connected to the external case 500, the mobile terminal 100 displays a virtual numeral keypad via the display unit 151 [FIG. 19A]. In case that the mobile terminal 100 is horizontally disconnected from the external case 500, the mobile terminal 100 is able to display a virtual QWERT keypad via the display unit 151 [FIG. 19B].

Figure 20A:
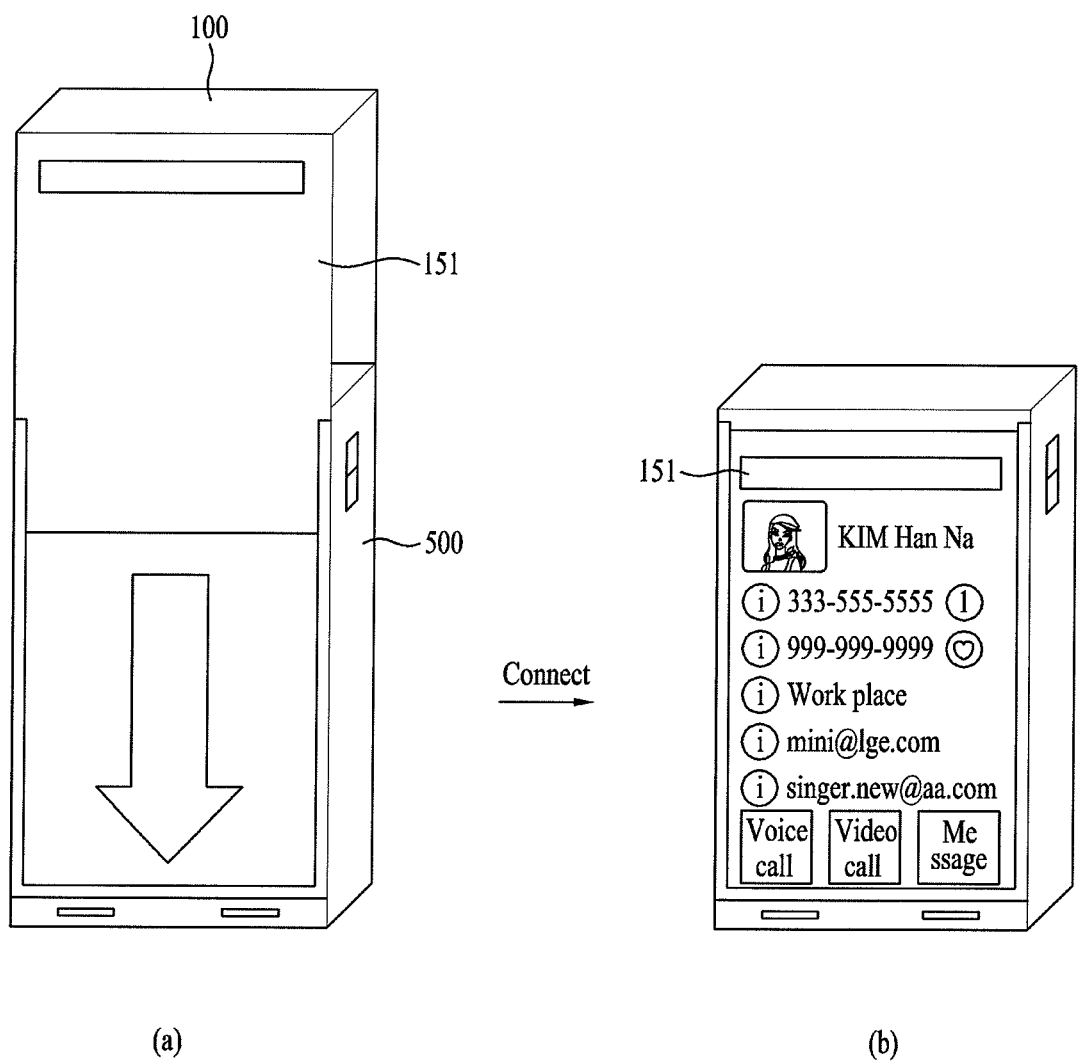
Figure 20B:
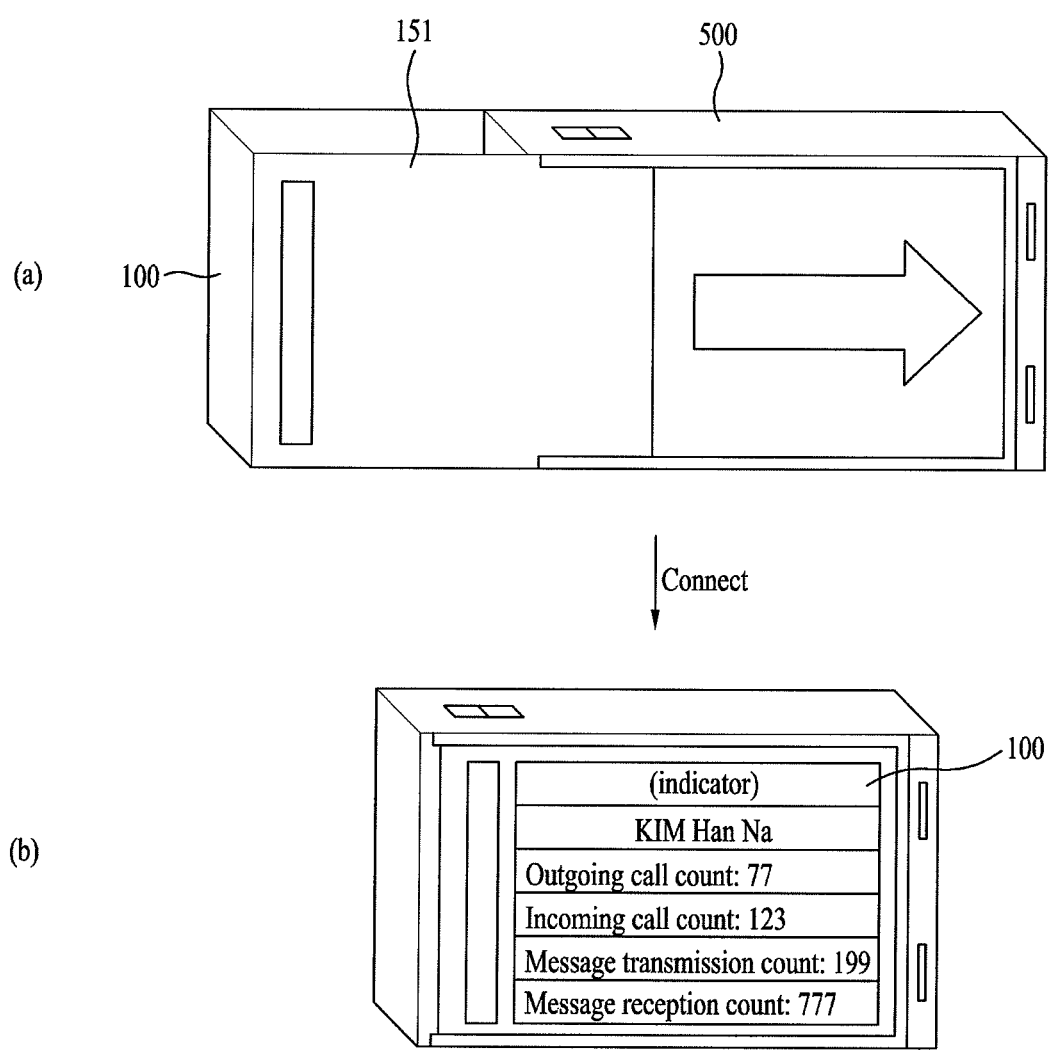

Referring to FIG. 20A and FIG. 20B, in case that the mobile terminal 100 is vertically connected to the external case 500, the mobile terminal 100 displays general information (e.g., name, phone number, photo, email address, etc.) of a phonebook item via the display unit 151 [FIG. 20A]. In case that the mobile terminal 100 is horizontally disconnected from the external case 500, the mobile terminal 100 is able to display side information (e.g., a cal count, a message reception/transmission count, etc.) of the phonebook item via the display unit 151 [FIG. 20B].

Figure 21A:
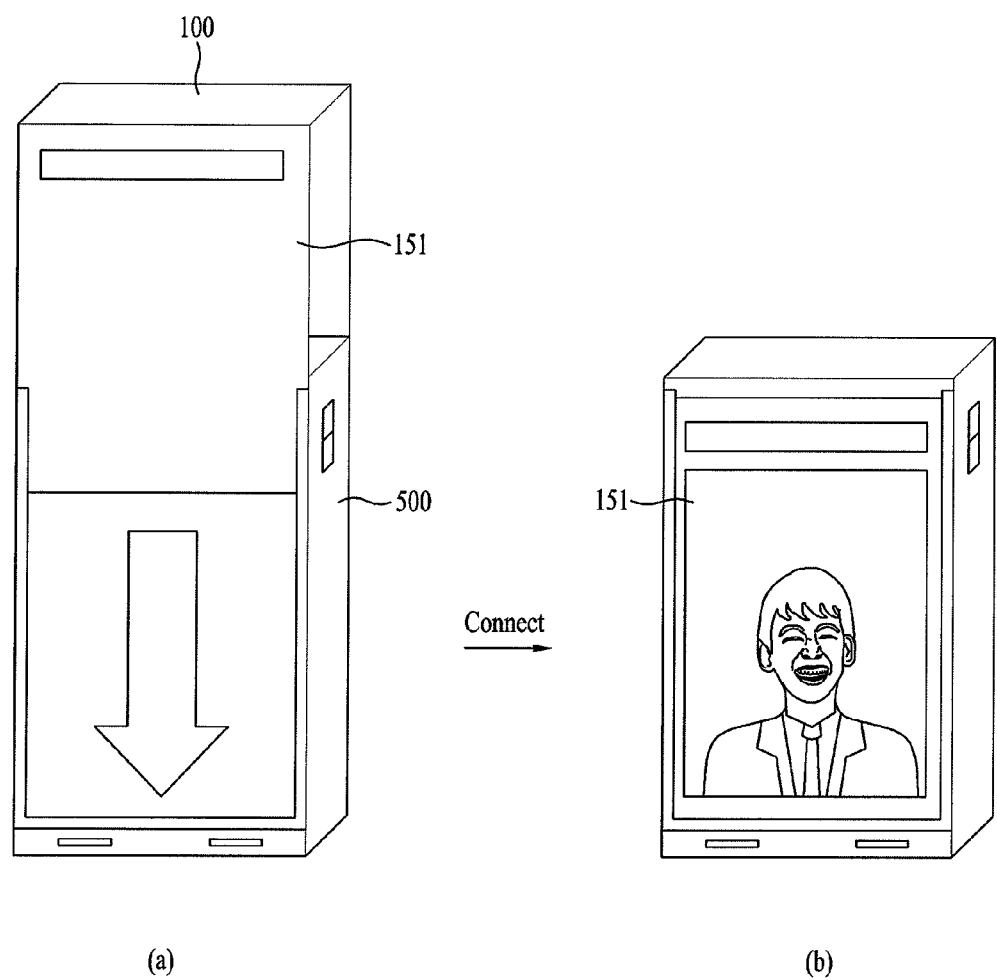
Figure 21B:
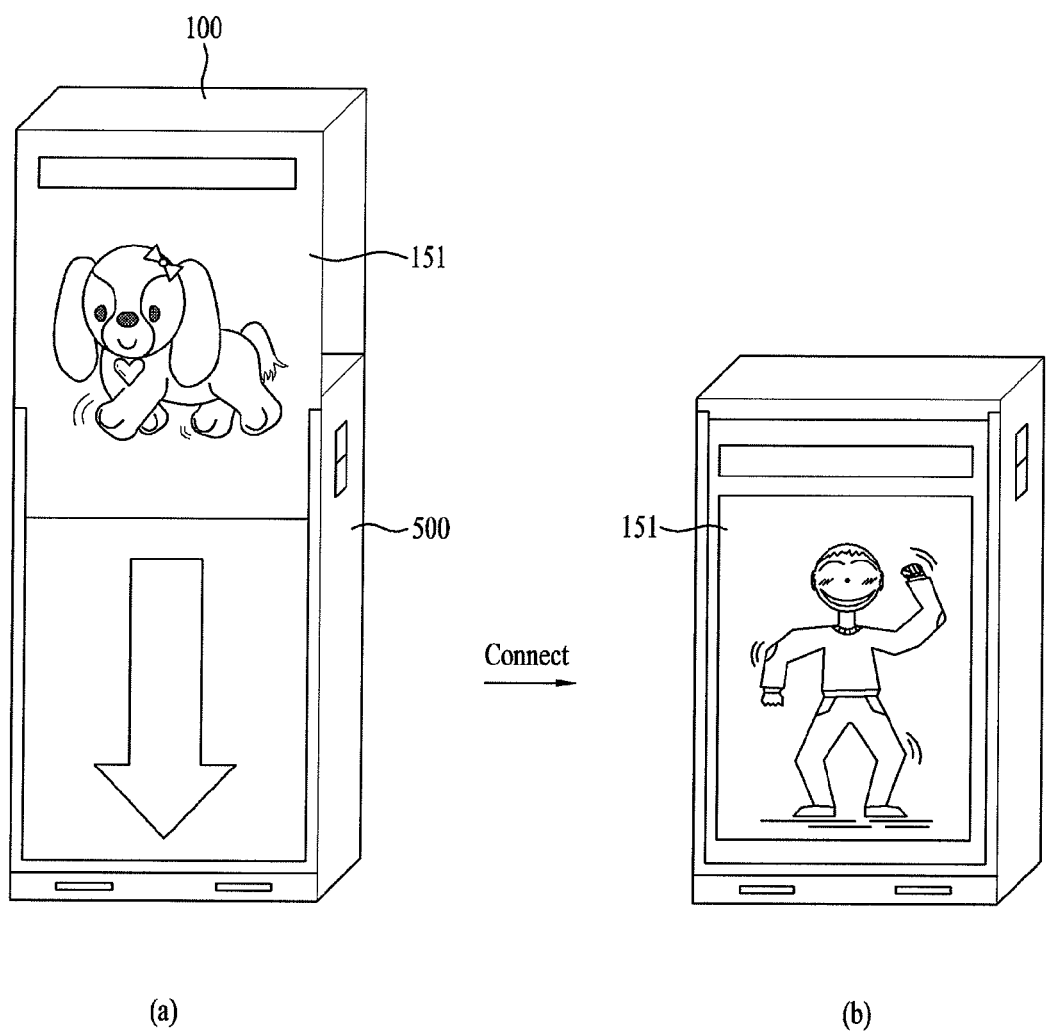

Referring to FIG. 21A and FIG. 21B, in case that the mobile terminal 100 is connected to the external case 500, the mobile terminal 100 is able to display a first background picture via the display unit 151 [FIG. 21A]. In case that the mobile terminal 100 is disconnected from the external case 500 in the configuration shown in FIG. 21A (b), the mobile terminal 100 is able to display a second background picture via the display unit 151 [FIG. 21B (a)]. If the mobile terminal 100 is re-connected to the external case 500, the mobile terminal 100 is able to display a third background picture via the display unit 151 [FIG. 21B (b)].

According to the present invention, the mobile terminal 100 is able to display status information of the second power source via the e-paper 340. In this case, the e-paper 340 is able to display the status information of the second power source under the control of the controller 180 or the control means 310.

For instance, a display operation of the status information of the second power source can be performed periodically or at a random timing point (e.g., a timing point of a remaining power level lower than a predetermined reference, a user selected timing point, etc.).

Regarding this, the following description is made with reference to the accompanying drawings.

Figure 22A:
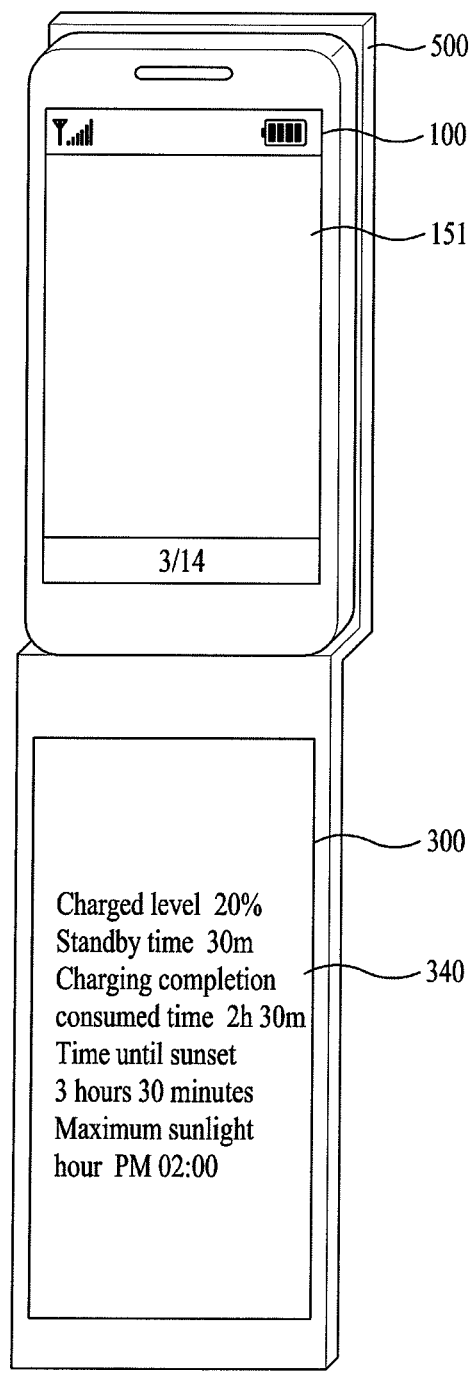
FIG. 22A and FIG. 22B are diagrams of screen configurations for displaying status information of a second power source on an electronic paper according to the present invention.
Figure 22B:
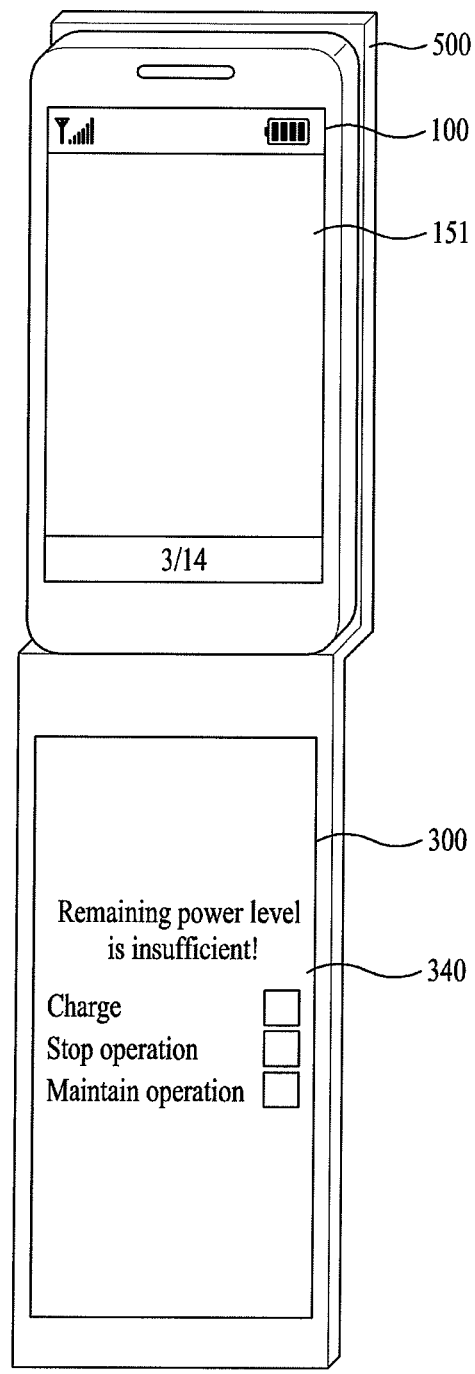

FIG. 22A and FIG. 22B are diagrams of screen configurations for displaying status information of a second power source on an electronic paper according to the present invention. For clarity and convenience of the following description, assume that the second power source includes a solar cell.

Referring to FIG. 22A, the e-paper 340 can display general charging status information (e.g., a charged level, a standby time, a buffering consumed time, a time until sunset, a maximum sunlight hour, etc.).

Referring to FIG. 22B, if a remaining power level of a solar cell is equal to or smaller than a predetermined reference, the e-paper 340 alarms the shortage of the remaining power level and is also able to output a text for enabling a user to select one of 'solar cell charging', 'stop e-paper kit operation', and 'maintain e-paper kit operation'. Of course, the 'solar cell charging' can be selected together with either the 'stop e-paper kit operation' or the 'maintain e-paper kit operation'.

For instance, if the 'solar cell charging' is selected, the control means 310 performs a charging operation using the solar cell 320. If the 'stop e-paper kit operation' is selected, the control means 310 stops the display function using the e-paper 340. If the 'maintain e-paper kit operation' is selected, the control means 310 can keep performing the display function using the e-paper 340.

FIG. 23 is a second flowchart for a method of controlling a display of a mobile terminal according to one embodiment of the present invention. In the following description, a first power source 191 can include a basic terminal battery and a second power source 320 can include a solar cell.

Referring to FIG. 23, the mobile terminal 100 charges the second power source 320 under the control of the controller 180 or the control means 310 [S2310].

For instance, if the second power source 320 includes a solar cell, the second power source 320 receives sunlight coming from the sun and is able to convert solar energy corresponding to the received sunlight to power. In doing so, the ⓔ controller (or control means) 310 is able to control a charging operation of the second power source 320.

Meanwhile, in case that the e-paper kit 300 is disconnected from the mobile terminal 100 or works separately, the e-paper kit 300 is able to perform the aforesaid charging step S2310 under the control of the control means 310.

Under the control of the controller 180, the mobile terminal 100 calculates an estimated charged power level of the second power source 320 and an estimated power consumption level of the e-paper kit 300 [S2320]. Alternatively, the calculating step s2320 can be performed by the ⓔ controller 310. In particular, if the e-paper kit 300 is disconnected from the mobile terminal 100 or works separately, the calculating step S2320 can be performed by the ⓔ controller 310.

In the calculating step S2320, the estimated charged power level and the estimated power consumption level for a predetermined period of time (e.g., 1 hour, 2 hours, 3 hours, etc.) can be calculated. Moreover, the estimated power consumption level of the e-paper kit 300 may mean a power level required for performing a display operation during a predetermined time using the e-paper 340.

In case that the second power source 320 includes the solar cell, a method of calculating an estimated charged power level by the solar cell is described as follows.

First of all, information for calculating the estimated charged power level by the solar cell can include intensity of illumination, illumination intensity distribution (or illumination uniformity), wavelength matching degree, time variant rate, parallel degree, incident angle, light-concentrating panel (e.g., cell) area, etc.

For instance, if solar energy attributed to sunlight is 200 W and a charging efficiency is 50%, the estimated charged power level can amount to 100 W. In this case, the charging efficiency may have a value fixed to the mobile terminal 100. And, an extent of the solar energy can vary according to sizes of the aforesaid informations.

Subsequently, under the control of the controller 180, the mobile terminal 100 compares the estimated charged power level and the estimated power consumption level, which are calculated in the calculating step S2320, to each other [S2330]. Alternatively, the comparing step S2330 can be performed by the ⓔ controller 310. In particular, if the e-paper kit 300 is disconnected from the mobile terminal 100 or works separately, the comparing step S2330 can be performed by the ⓔ controller 310.

According to the comparison result in the comparing step S2330, the mobile terminal 100 controls an operation of supplying power to the e-paper kit 300 [S2340]. In this case, the controlling step S2340 can be performed by the controller 180 or the ⓔ controller 310.

If the comparing step S2330 determines that the estimated power consumption level exceeds the estimated charged power level, the controller 180 or the ⓔ controller 310 calculates the excessive estimated power consumption level (hereinafter named an excessive power consumption level) and is then able to control the first power source 191 to supply the calculated excessive power consumption level to the e-paper kit 300. In particular, while the e-paper kit 300 and the mobile terminal 100 are disconnected from each other, if the comparing step S2330 determines that the estimated power consumption level exceeds the estimated charged power level, the ⓔ controller 310 sends a signal for supply request of the excessive power consumption level to the mobile terminal 100. As a result, the ⓔ controller 310 receives the excessive power consumption level from the mobile terminal 100 and then supplies the received power level to the e-paper kit 300.

For instance, if the estimated power consumption level is 100 W and the estimated charged power level is 50 W, the e-paper 340 can be supplied with the excessive power consumption level 50 W (=100 W−50 W) from the first power source 191.

Meanwhile, if the remaining power level of the second power source 320 is equal to or smaller than the predetermined reference, the controller 180 or the ⓔ controller 310 is able to control the first power source 191 to supply power to the e-paper kit 300. Particularly, while the e-paper kit 300 and the mobile terminal 100 are disconnected from each other, if it is determined that the remaining power level of the second power source 320 is equal to or smaller than the predetermined reference, the ⓔ controller 310 sends a power supply request signal to the mobile terminal 100 and is then supplied with the power from the mobile terminal 100. As a result, the ⓔ controller 310 is able to drive the e-paper kit 300. This is to secure the remaining power level of the second power source 191 up to a reference limit.

Moreover, the mobile terminal 100 outputs the comparison result in the comparing step S2330 and is then able to receive an input of a selection action for an operation of power supply to the e-paper kit 300. Therefore, the mobile terminal 100 is able to control the power supply operation to correspond to the inputted selection action. For instance, the selection action can include one of 'power supply from the first power source 191', 'end of the display operation of the e-paper 340', and 'end of the display operation of the e-paper 340 after exhaustion of the estimated charged power level'.

Under the control of the controller 180 or the control means 310, the mobile terminal 100 is able to display the status information of the second power source 320 (hereinafter named second power source status information) on the e-paper 340 [S2350].

The mobile terminal 100 is able to display the second power source status information periodically or at a random timing point. In this case, the display period or the display timing point is set by a user or can be arbitrarily set by the mobile terminal 100.

Besides, in case of receiving an input of a signal of a command for displaying the second power source status information from a user via the user input unit 130, the mobile terminal 100 is able to display the second power source status information.

Although the drawing shows that the displaying step S2350 is executed after the controlling step S2340, the displaying step S2350 can be performed at any step in the present flowchart.

In the following description, the displaying step S2350 is explained in detail with reference to the accompanying drawings. FIGS. 24A to 24D are diagrams for screen configurations for displaying power status information of a solar cell in progress of a battery charging on an electronic paper according to the present invention. For clarity and convenience of the following description, assume that the second power source 320 includes a solar cell.

Referring to FIGS. 24A to 24C, an e-paper 340 is able to inform a user of an extent of a charged power level using first to third indication means 2410 to 2430 according to a charged power level of a solar cell.

For instance, the first indication means 2410 includes a light emitting device. The first indication means 2410 emits green light if a charged power level is 30%. And, the first indication means 2410 emits blue light if a charged power level is 50% [FIG. 24A]. The second indication means 2420 includes an icon having a solar shape. The second indication means 2420 shows four solar branches 2421 if a charged power level is 50%. And, the second indication means 2420 shows eight branches 2422 if a charged power level is 100% [FIG. 24B]. The third indication means 2430 includes a bar type indicator. If a charged power level is 50%, the third indication means 2430 represents 50% of the bar type indicator as black. If a charged power level is 80%, the third indication means 2430 represents 80% of the bar type indicator as black [FIG. 24C].

Meanwhile, the e-paper 340 is able to display status information of the first power source 191 (hereinafter named first power source status information) as well [not shown in the drawing]. In this case, it is able to display an identifier to identify each power source status information on a specific power source (first or second power source).

Referring to FIG. 24D, the e-paper 340 is able to display second power source status information including sunlight intensity (40%), current charged status (65%), buffering remaining time (2 hours 13 minutes) and the like [(a)]. Moreover, the e-paper 340 is able to further display a remaining time until sunset, an estimated power consumption level, an estimated charged power level, an excessive power consumption level and the like.

If the (e) controller 310 determines that a charging efficiency of the solar cell is equal or smaller than a predetermined reference, the e-paper 340 is able to display user options while indicating that the charging efficiency of the solar cell is low.

For instance, if the option 'terminate e-paper operation' is selected by a user, the (e) controller 310 or the controller 180 is able to terminate the operation of the e-paper. If the option 'change power source' is selected by a user, the (e) controller 310 or the controller 180 is able to change a power supply source of the e-paper 340 from the second power source 320 to the first power source 191.

Referring now to FIG. 23, if the operation of the terminal is terminated (i.e., if a power of the terminal is turned off), the mobile terminal 100 determines whether an operation termination type is a normal termination or an abnormal termination [S2360].

In this case, the normal termination may mean a case that the operation is terminated according to an operation termination (or power-off) selection made by a user. And, the abnormal termination may mean a case that the operation is forced to be terminated irrespective of user's intention. For instance, the abnormal termination can include one of a termination by forcing the first power source 191 to be removed from the mobile terminal 100, a termination due to exhaustion of a remaining power level of the first power source 191 and the like.

The determining step S2360 can be performed by the (e) controller 310. This is because the controller 180 is not operable due to the terminal operation termination.

If the determining step S2360 determines that the mobile terminal 100 is normally terminated, the e-paper 340 displays prescribed information extracted from the memory 160 of the mobile terminal 100 under the control of the (e) controller 310 [S2370].

For instance, in case of the normal terminal in the course of a call with a specific correspondent party, the e-paper 340 is able to display a phone number of the specific correspondent party extracted from the memory 160. In case of the normal termination in the course of a broadcast viewing, the e-paper 340 is able to display broadcast program/channel identification information (title, number, etc.) extracted from the memory 160.

If the determining step S2360 determines that the mobile terminal 100 is abnormally terminated, the e-paper 340 continues to display the information displayed at the termination timing point under the control of the (e) controller 310 [S2380].

Since the e-paper kit 300 can be supplied with the power by the second power source 320 apart from the first power source 191, the e-paper kit 300 is able to perform the determining step S2360 and the displaying step S2380 despite that the mobile terminal 100 is terminated.

In the following description, a displaying method using the e-paper 340 provided to the e-paper kit 300 is explained in detail with reference to the accompanying drawings. For clarity and convenience of the following description, assume that the second power source 320 includes a solar cell.

Figure 25A:
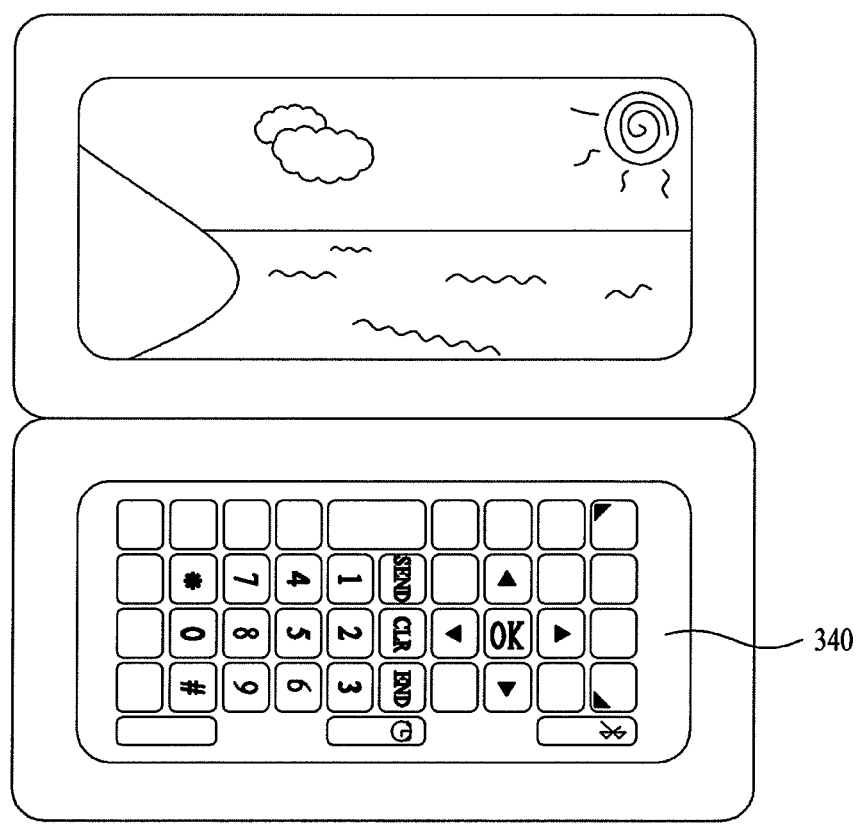
FIG. 25A and FIG. 25B are diagrams of screen configurations for controlling to display an electronic paper in accordance of a charged level of a solar cell charging according to the present invention.
Figure 25B:
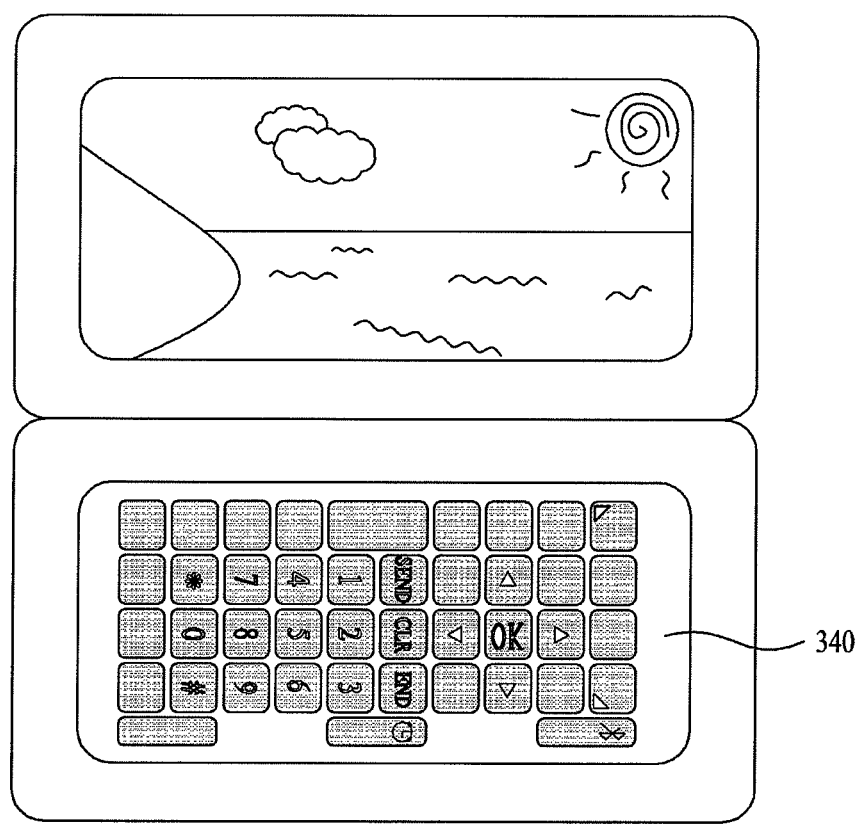

FIG. 25A and FIG. 25B are diagrams of screen configurations for controlling to display an electronic paper in accordance of a charged level of a solar cell charging according to the present invention.

Referring to FIG. 25A and FIG. 25B, in case of displaying a virtual keypad, the e-paper 340 is able to adjust character colors and background colors of keys constructing the virtual keypad according to an extent of a charged level by a solar cell.

For instance, if the charged level extent is equal or greater than a predetermined reference, the e-paper 340 adjusts a background color of each of the keys into white and also adjusts a character color of each of the keys into black [FIG. 25A]. If the charged level extent is smaller than the predetermined reference, the e-paper 340 adjusts a character color of each of the keys into white and also adjusts a background color of each of the keys into black [FIG. 25B].

Therefore, a user is able to recognize the charged level extent by observing the character and background colors of the keys constructing the virtual keypad.

Figure 26A:
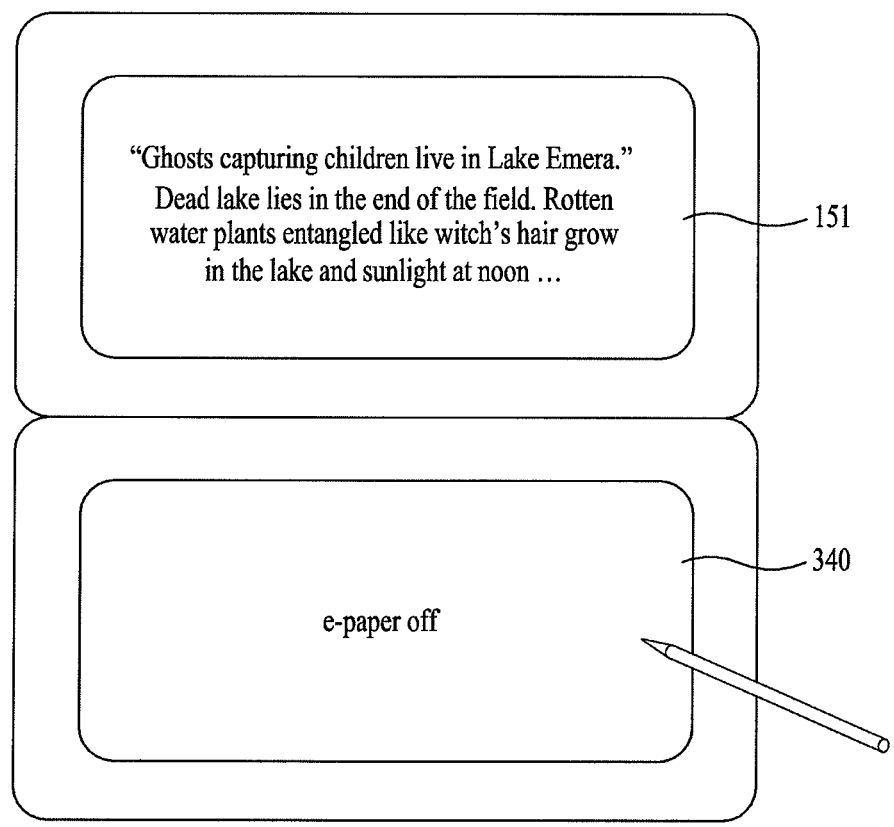
FIG. 26A and FIG. 26B are diagrams of screen configurations for controlling to display an electronic paper in accordance of intensity of illumination for a solar cell charging according to the present invention.
Figure 26B:
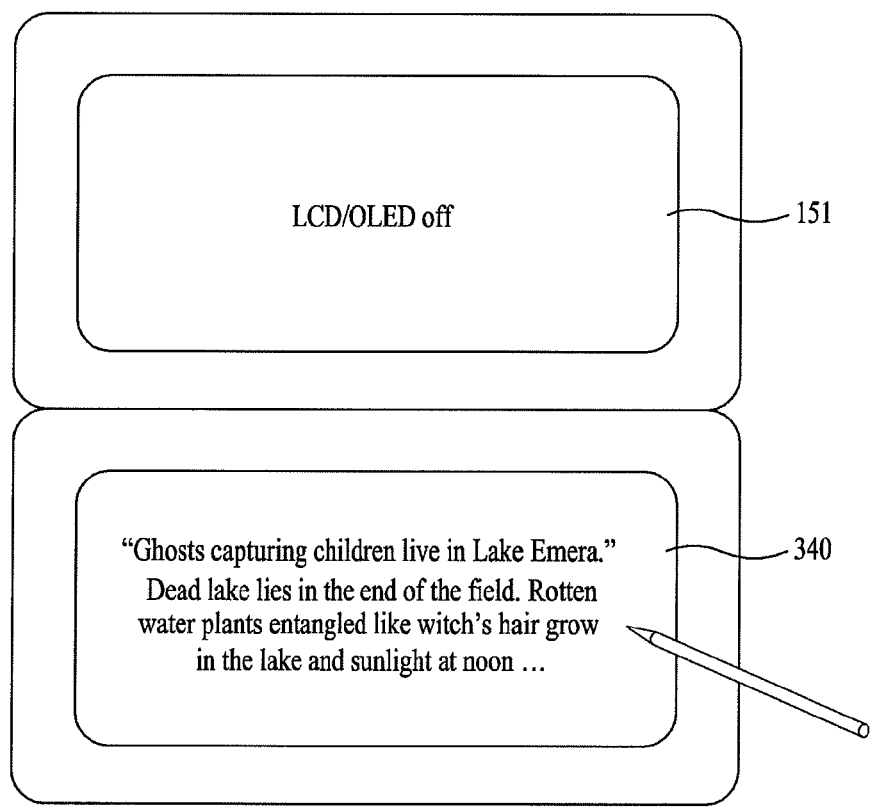

FIG. 26A and FIG. 26B are diagrams of screen configurations for controlling to display an electronic paper in accordance of intensity of illumination in case of a solar cell charging according to the present invention.

Referring to FIG. 26A and FIG. 26B, if a value of illumination intensity is smaller than a predetermined reference (or if a charged level by a solar cell is smaller than a predetermined reference), the mobile terminal 100 displays information via the display unit 151. If a value of illumination intensity is equal to or greater than the predetermined reference (or if a charged level by a solar cell is greater than the predetermined reference), the mobile terminal 100 is able to display the information on the e-paper 340.

If the illumination intensity value is equal to or greater than the predetermined reference, readability of the display unit 151 is lowered. As the information is displayed on the e-paper 340 in consideration of such a property of the display unit 151, the readability of the information is secured and the power consumption of the display unit 151 can be reduced.

FIGS. 27A to 27D are diagrams of screen configurations for inputting a power control command in case that a remaining power level of a solar cell is equal to or smaller than a predetermined reference according to the present invention.

Figure 27A:
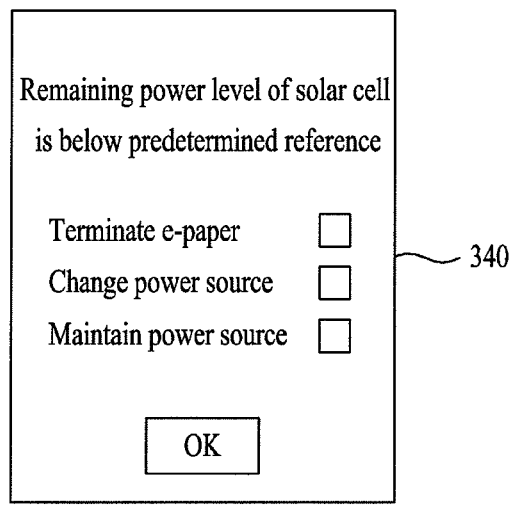
FIGS. 27A to 27D are diagrams of screen configurations for inputting a power control command in case that a remaining power level of a solar cell is equal to or smaller than a predetermined reference according to the present invention.

First of all, if a remaining power level of a solar cell is equal to or smaller than a predetermined level, the e-paper 340 is able to display a text indicating that the remaining power level of the solar cell is equal to or smaller than the predetermined level and user options [FIG. 27A].

For instance, the user options can include 'terminate e-paper', 'change power source', and 'maintain power source'.

Figure 27B:
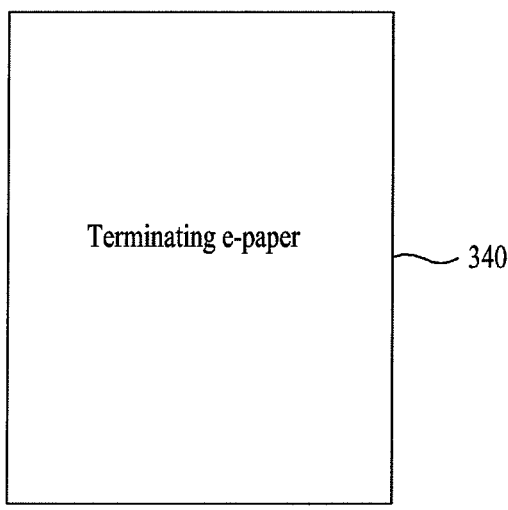

If the 'terminate e-paper' is selected in FIG. 27A, the controller 180 or the (e) controller 310 is able to terminate an operation of the e-paper 340 [FIG. 27B].

Figure 27C:
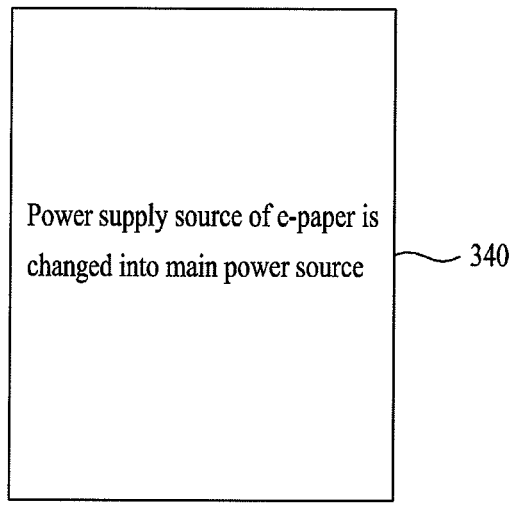

If the 'change power source' is selected in FIG. 27A, the controller 180 or the (e) controller 310 is able to change the power supply source of the e-paper kit 300 from the solar cell into the first power source 191 (or the main power source) [FIG. 27C].

Figure 27D:
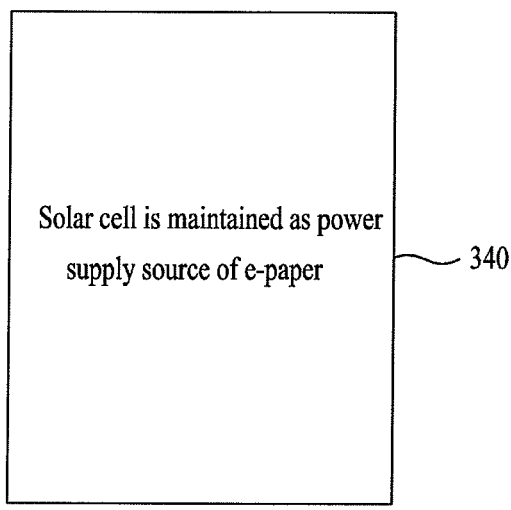

If the 'maintain power source' is selected in FIG. 27A, the controller 180 or the (e) controller 310 is able to keep using the solar cell as the power supply source of the e-paper kit 300 [FIG. 27D].

Figure 28A:
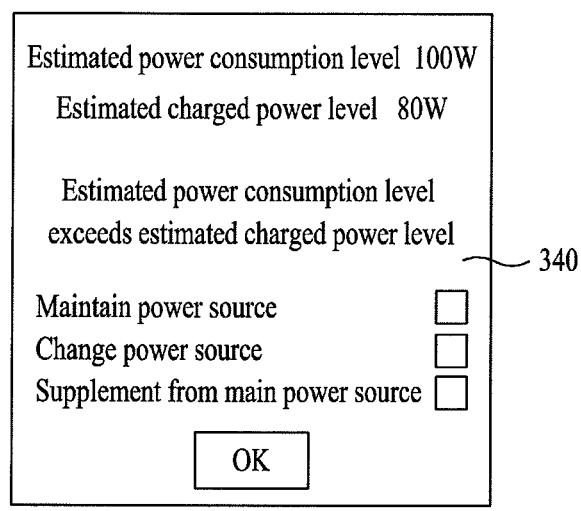
FIG. 28A and FIG. 28B are diagrams of screen configurations for inputting a power control command in case that an estimated power consumption level of an electronic paper exceeds an estimated charged power level t of a solar cell according to the present invention.
Figure 28B:
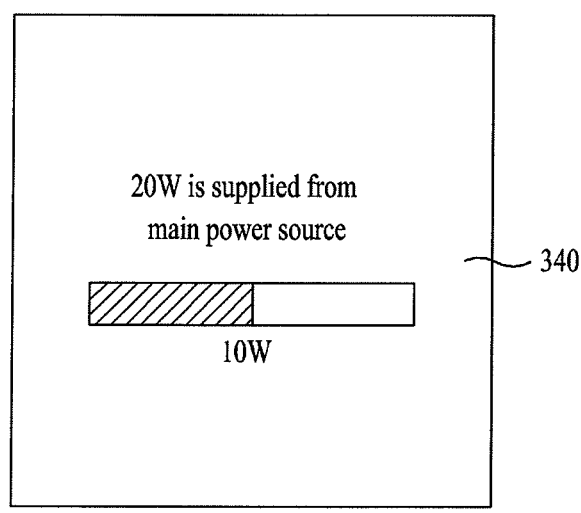

FIG. 28A and FIG. 28B are diagrams of screen configurations for inputting a power control command in case that an estimated power consumption level of an electronic paper exceeds an estimated charged power level of a solar cell according to the present invention.

First of all, if an estimated power consumption level exceeds an estimated charged power level, the e-paper 340 is able to display user options by announcing that the estimated power consumption level exceeds the estimated charged power level [FIG. 28A].

For instance, the user options can include 'maintain power source', 'change power source', and 'supplement from main power source'.

If the 'maintain power source'/'change power source' is selected in FIG. 28A, the same picture shown in FIG. 27D/FIG. 27C can be displayed.

If the 'supplement from main power source' is selected in FIG. 28A, the controller 180 or the (e) controller 310 is able to control an excessive power consumption level to be supplied from the first power source 191 (or the main power source) [FIG. 28B]. In particular, FIG. 28B shows that a supply status indicator indicating supply status information (e.g., supply level, supply speed, etc.) of the excessive power consumption level.

Figure 29A:
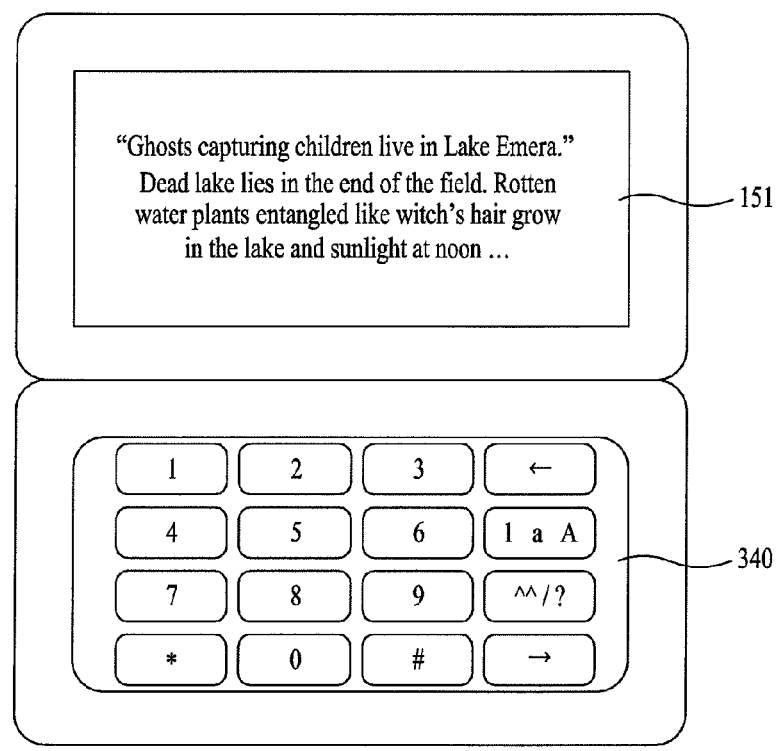
FIG. 29A and FIG. 29B are diagrams of screen configurations for varying a keypad type displayed on an electronic paper in accordance with an execution application according to the present invention.
Figure 29B:
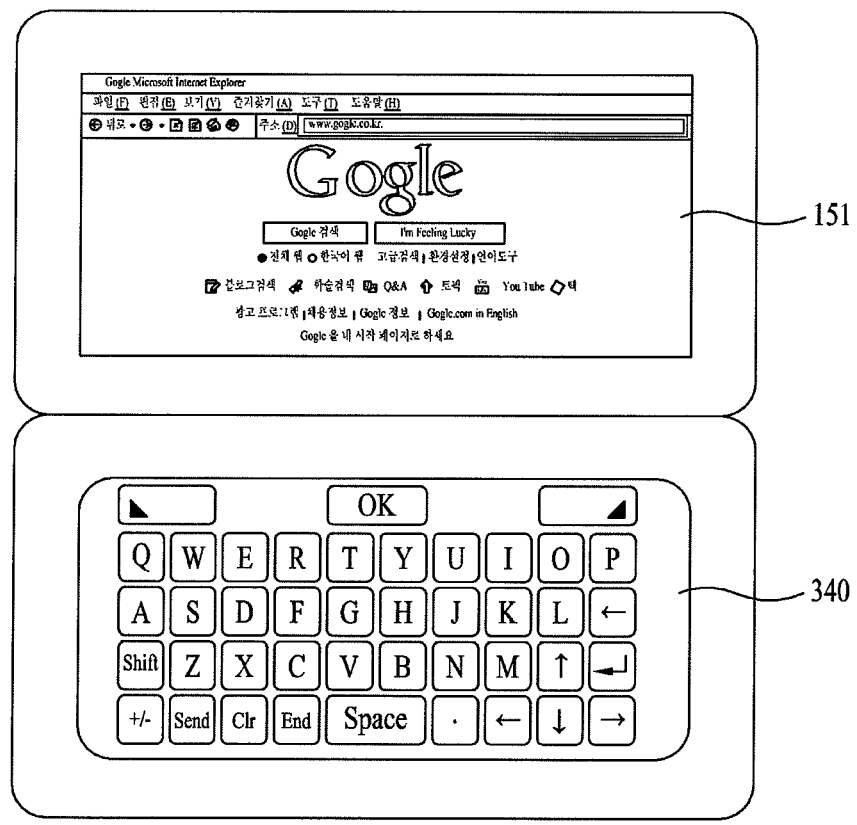

FIG. 29A and FIG. 29B are diagrams of screen configurations for varying a keypad type displayed on an electronic paper in accordance with an execution application according to the present invention.

First of all, if an e-book function is executed in the mobile terminal 100, the e-paper 340 displays a numeral keypad [FIG. 29A]. If a web browser function is executed in the mobile terminal 100, the e-paper 340 is able to display a QWERTY keypad [FIG. 29B].

Figure 30A:
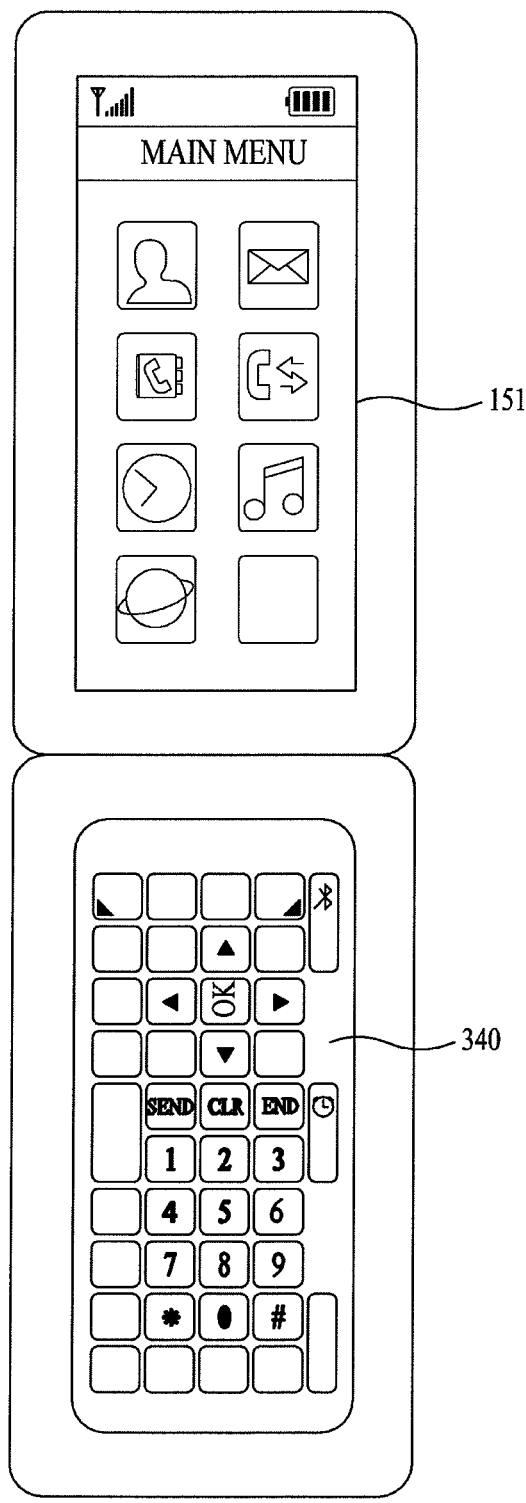
FIG. 30A and FIG. 30B are diagrams of screen configurations for varying a configuration of a keypad arrangement displayed on an electronic paper in accordance with a posture of a terminal according to the present invention.
Figure 30B:
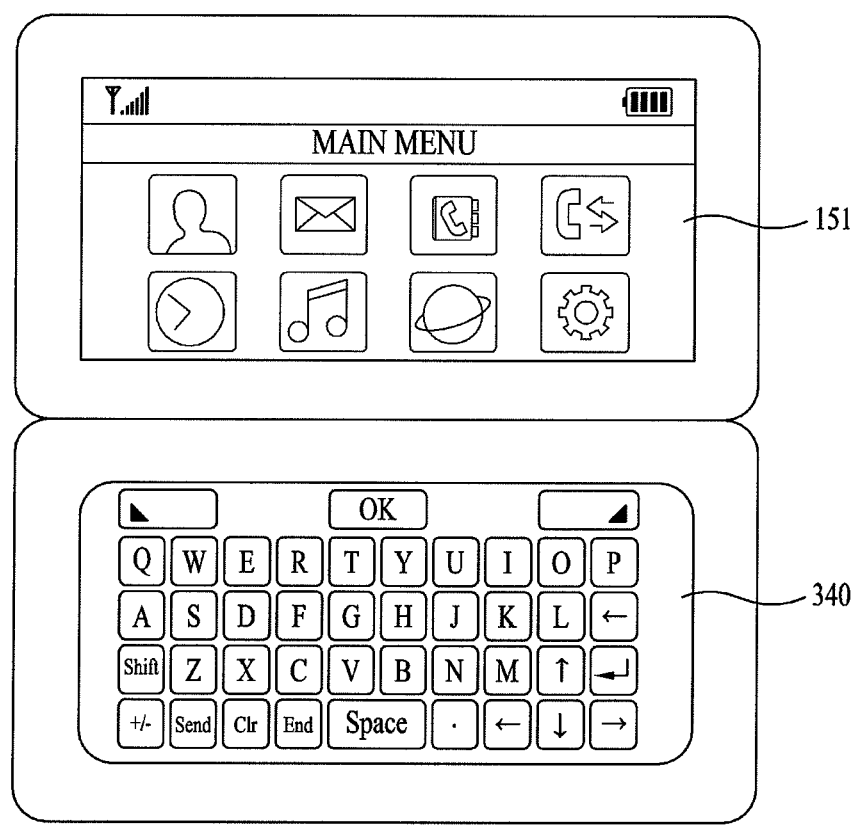

FIG. 30A and FIG. 30B are diagrams of screen configurations for varying a configuration of a keypad arrangement displayed on an electronic paper in accordance with a posture of a terminal according to the present invention.

First of all, if the mobile terminal 100 is vertically placed, the e-paper 340 displays a keypad having keys arranged in vertical direction [FIG. 30A]. If the mobile terminal 100 is horizontally placed, the e-paper 340 displays a keypad having keys arranged in horizontal direction [FIG. 30B].

If a position of the mobile terminal 100 is shifted from length to width, the key arrangement direction of the keypad displayed on the e-paper 340 can be correspondingly changed from length to width.

Figure 31A:
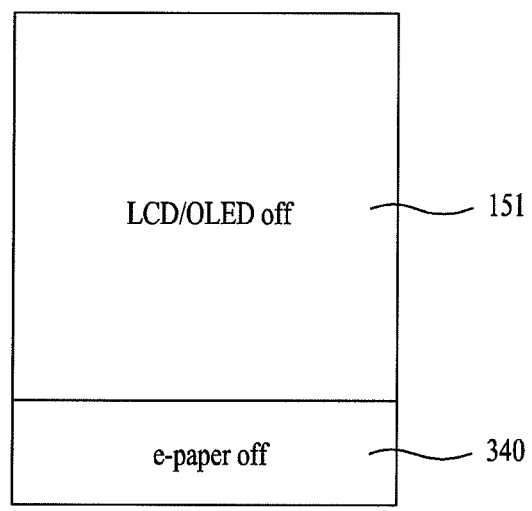

FIG. 31A and FIG. 31B are diagrams of screen configurations for determining whether to activate an electronic paper in accordance with intensity of illumination according to the present invention.

First of all, the mobile terminal 100 is able to detect an event occurrence in a standby mode (or sleep mode) [i.e., state that the display unit 151 and the e-paper 340 are inactive]. For instance, the vent can include one of a voice/video call reception, a message reception, a schedule announcement, an alarm and the like. In the following description, assume that the event includes a voice call reception or a message reception.

When a value of illumination intensity is equal to or greater than a predetermined reference, if a voice call reception is detected by the mobile terminal 100, the e-paper 340 is able to display speech call reception indication information [FIG. 31A]. If a message reception is detected by the mobile terminal 100, the e-paper 340 is able to display message reception indication information [FIG. 31B].

Moreover, if a value of illumination intensity is equal to or greater than a predetermined reference, the e-paper kit 300 configures the picture shown in FIG. 31A or FIG. 31B and also activates the light emitting means 350 to enhance the readability of the e-paper 340.

Figure 32A:
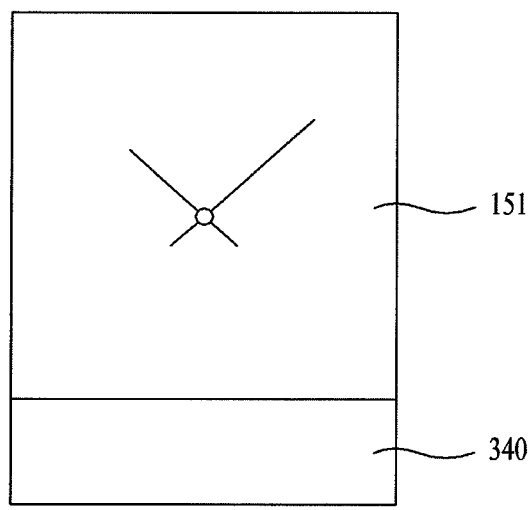
FIG. 32A and FIG. 32B are diagrams of screen configurations for displaying time information on an electronic paper in inactive mode of a display unit of a terminal according to the present invention.
Figure 32B:
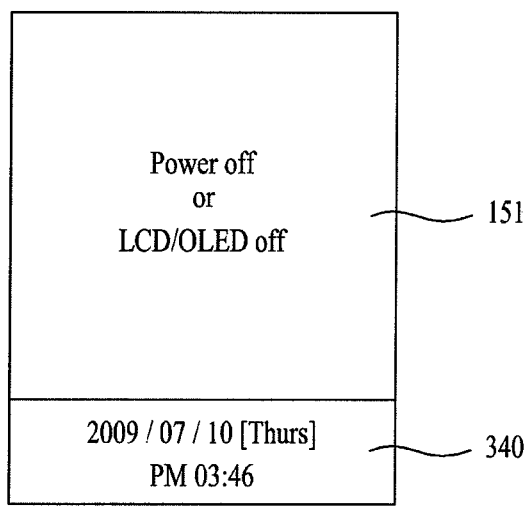

FIG. 32A and FIG. 32B are diagrams of screen configurations for displaying time information on an electronic paper in inactive mode of a display unit of a terminal according to the present invention.

First of all, the mobile terminal 100 displays time information via the display unit 151 in an active mode of the display unit 151 [FIG. 32A]. The mobile terminal 100 is able to display time information via the e-paper 340 in an inactive mode of the display unit 151 [FIG. 32B].

Figure 33A:
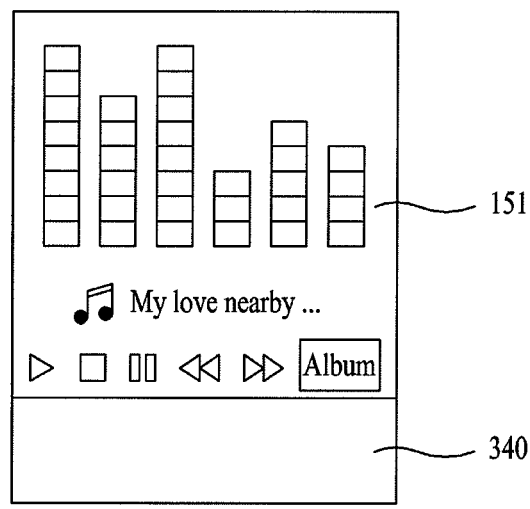
FIG. 33A and FIG. 33B are diagrams of screen configurations for displaying application driven information on an electronic paper in inactive mode of a display unit of a terminal according to the present invention.
Figure 33B:
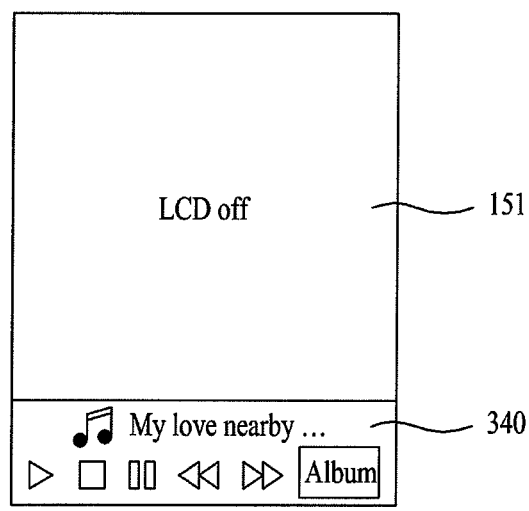

FIG. 33A and FIG. 33B are diagrams of screen configurations for displaying application driven information on an electronic paper in inactive mode of a display unit of a terminal according to the present invention. For clarity and convenience of the following description, an application is limited to MP3 only.

First of all, if the display unit 151 is activated in the course of driving the MP3, the mobile terminal 100 displays MP3 driven information via the display unit 151 [FIG. 33A]. If the display unit 151 is deactivated in the course of driving the MP3, the mobile terminal 100 is able to display the MP3 driven information via the e-paper 340 [FIG. 33B].

Figure 34A:
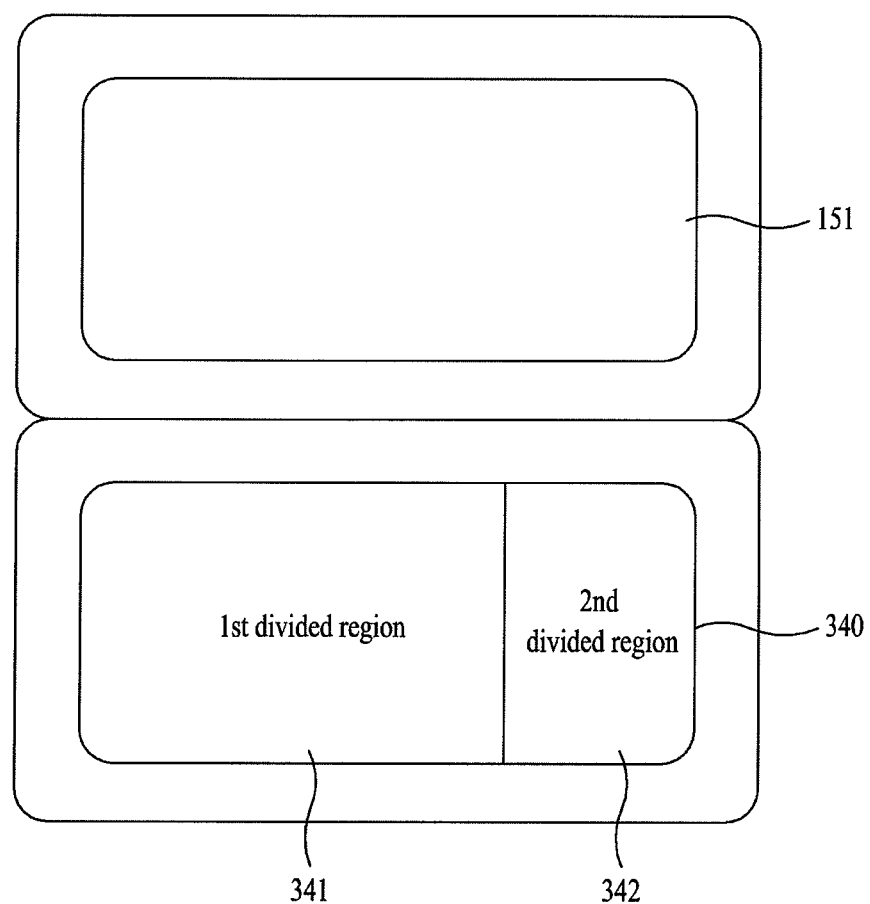
FIG. 34A and FIG. 34B are diagrams of screen configurations for assigning an information display region and a charging region to a plurality of regions on an electronic paper according to the present invention.
Figure 34B:
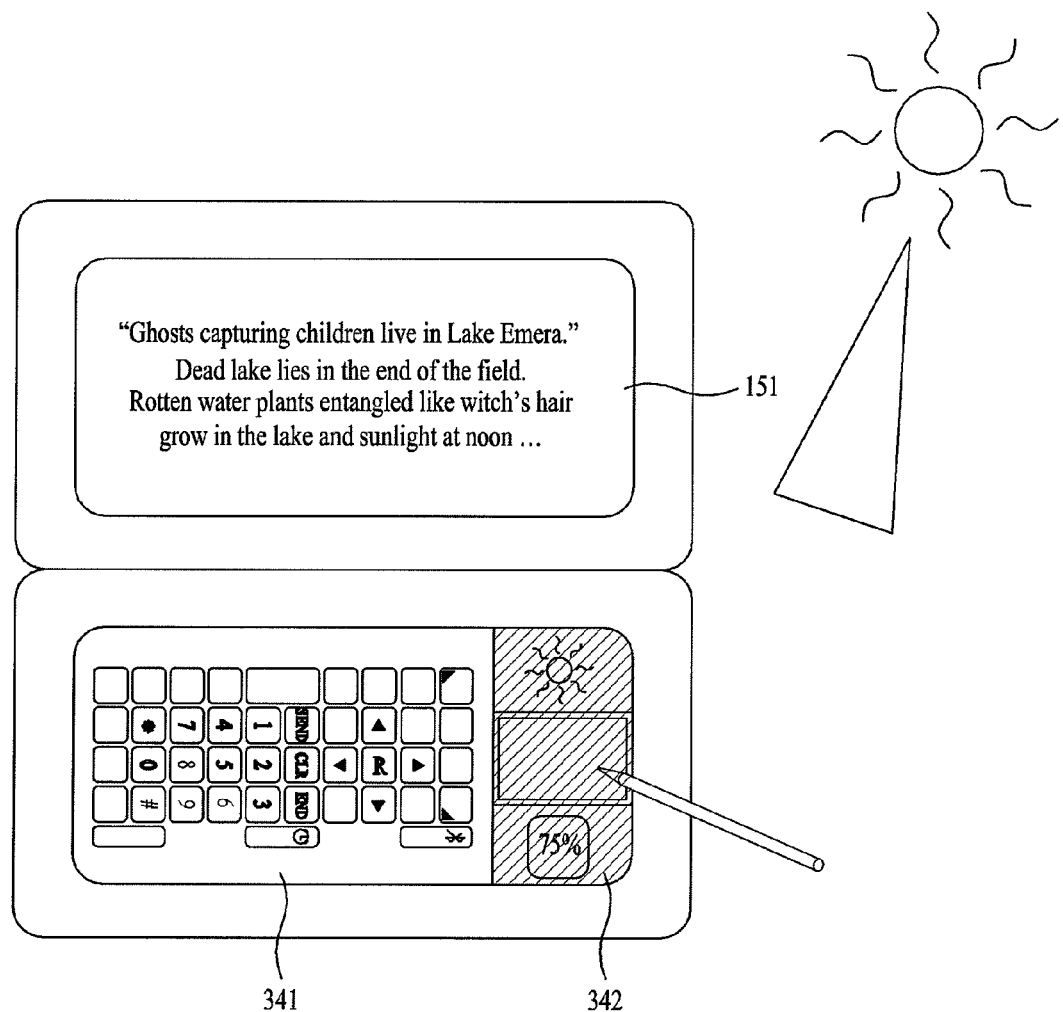

FIG. 34A and FIG. 34B are diagrams of screen configurations for assigning an information display region and a charging region to a plurality of regions on an electronic paper according to the present invention.

First of all, the e-paper 340 is divided into a plurality of regions according to illumination intensity distribution. The region having an illumination intensity value set smaller than a predetermined reference among a plurality of the regions is assigned to a display region 341. And, the region having an illumination intensity value set equal to or greater than the predetermined reference among a plurality of the regions can be assigned to a charging region 342.

Figure 35A:
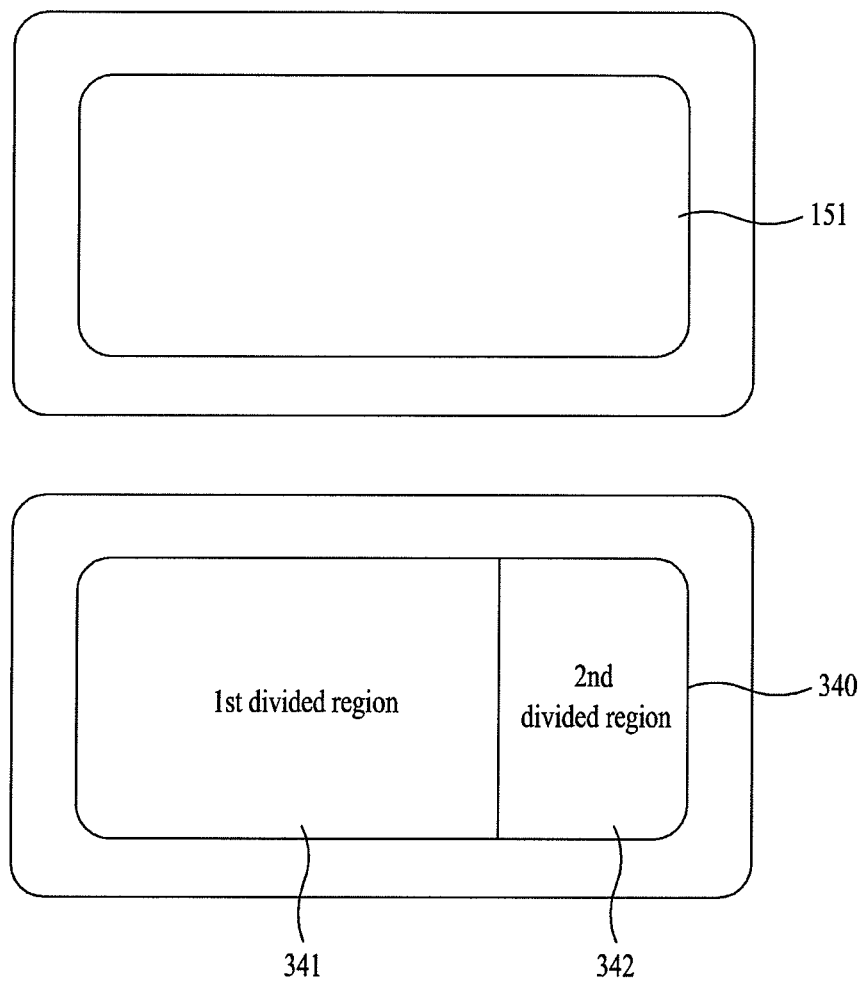
FIG. 35A and FIG. 35B are diagrams of screen configurations for displaying event relevant information on an electronic paper while a terminal and an electronic paper kit are disconnected from each other according to the present invention.
Figure 35B:
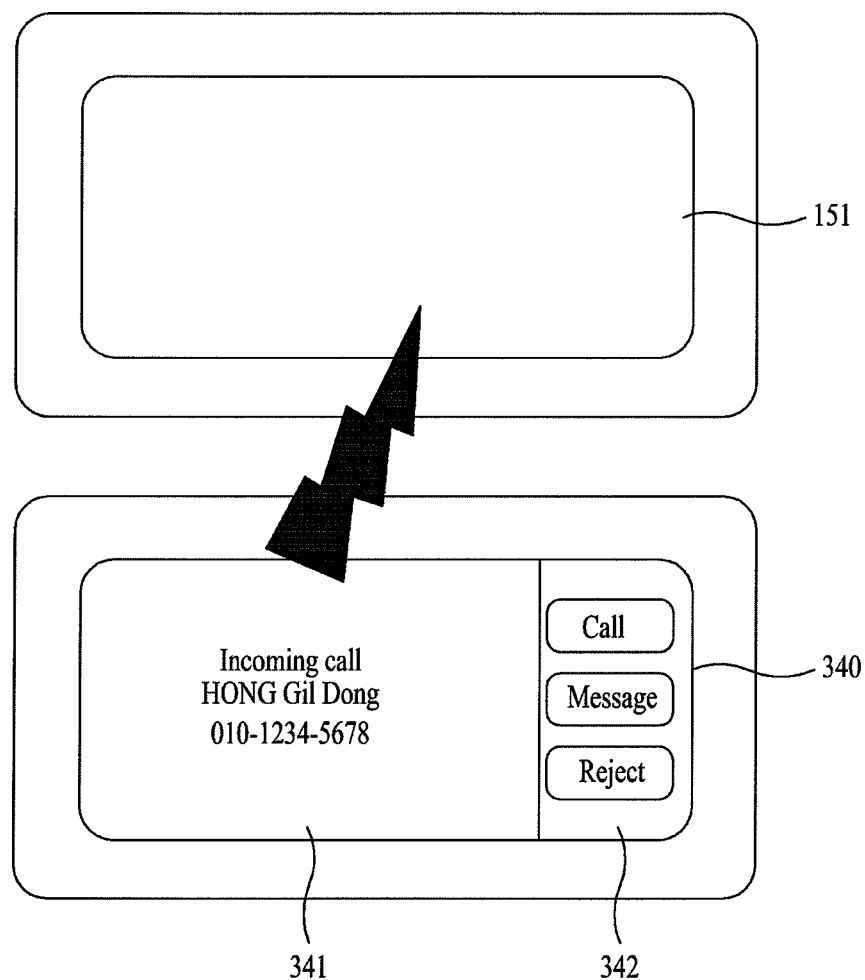

FIG. 35A and FIG. 35B are diagrams of screen configurations for displaying event relevant information on an electronic paper while a terminal and an electronic paper kit are disconnected from each other according to the present invention.

Referring to FIG. 35A and FIG. 35B, while the e-paper kit 300 is disconnected from the mobile terminal 100, if event occurrence information (e.g., call reception information) is received from the mobile terminal 100, the e-paper 340 is divided into a plurality of regions 341 and 342. Therefore, information (e.g., originator information) indicating an event occurrence is displayed on the first region 341. And, an event control key (e.g., a send key, a message key, a call reject key, etc.) can be displayed on the second region 342.

If a user's manipulation of the event control key is detected, the e-paper lit 300 sends a control signal (e.g., a call connection command signal) corresponding to the manipulated event control key (e.g., the send key) to the mobile terminal 100 to control the occurring event (i.e., a received call connection).

In doing so, signals or information can be transceived between the e-paper 340 (or the e-paper kit) and the mobile terminal 100 using USB, short-range wireless communication, mobile communication and/or the like.

Figure 36A:
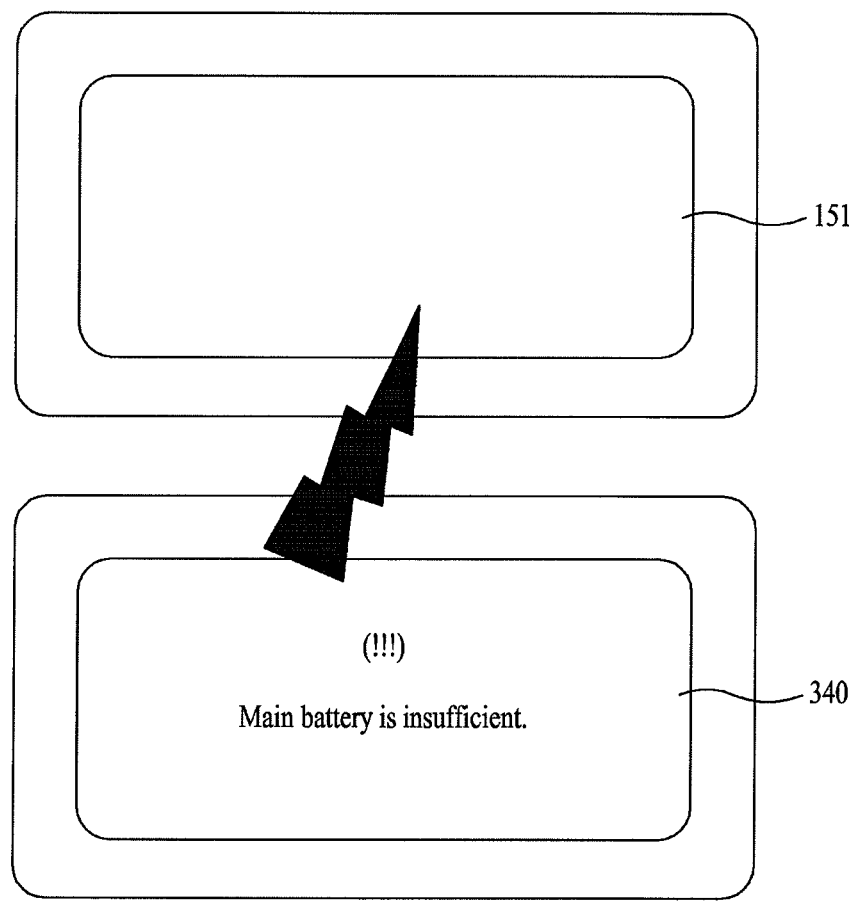
FIGS. 36A to 36C are diagrams of screen configurations for describing a state that power is supplied from a solar cell in case of power shortage of a basic terminal battery according to the present invention.
Figure 36B:
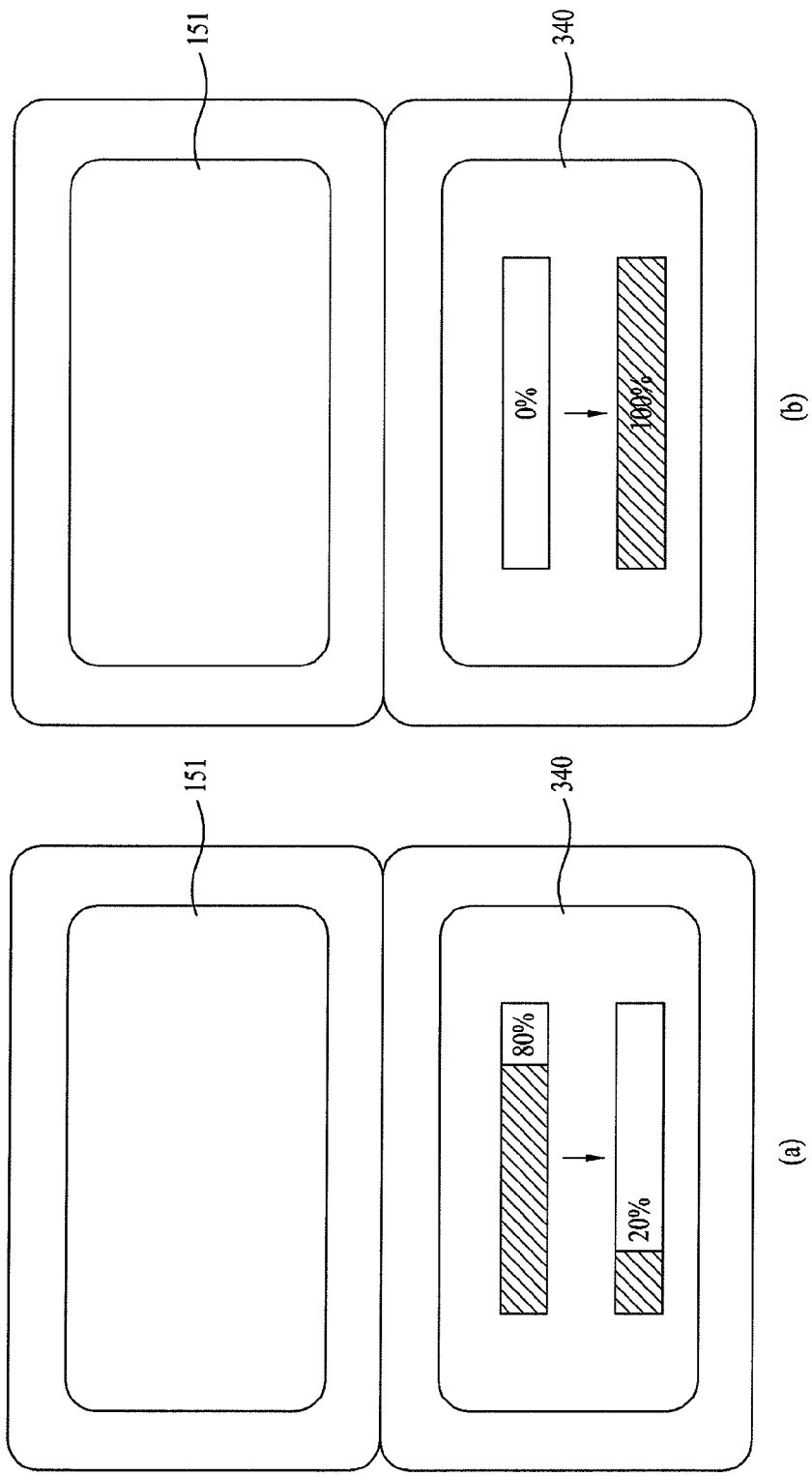
Figure 36C:
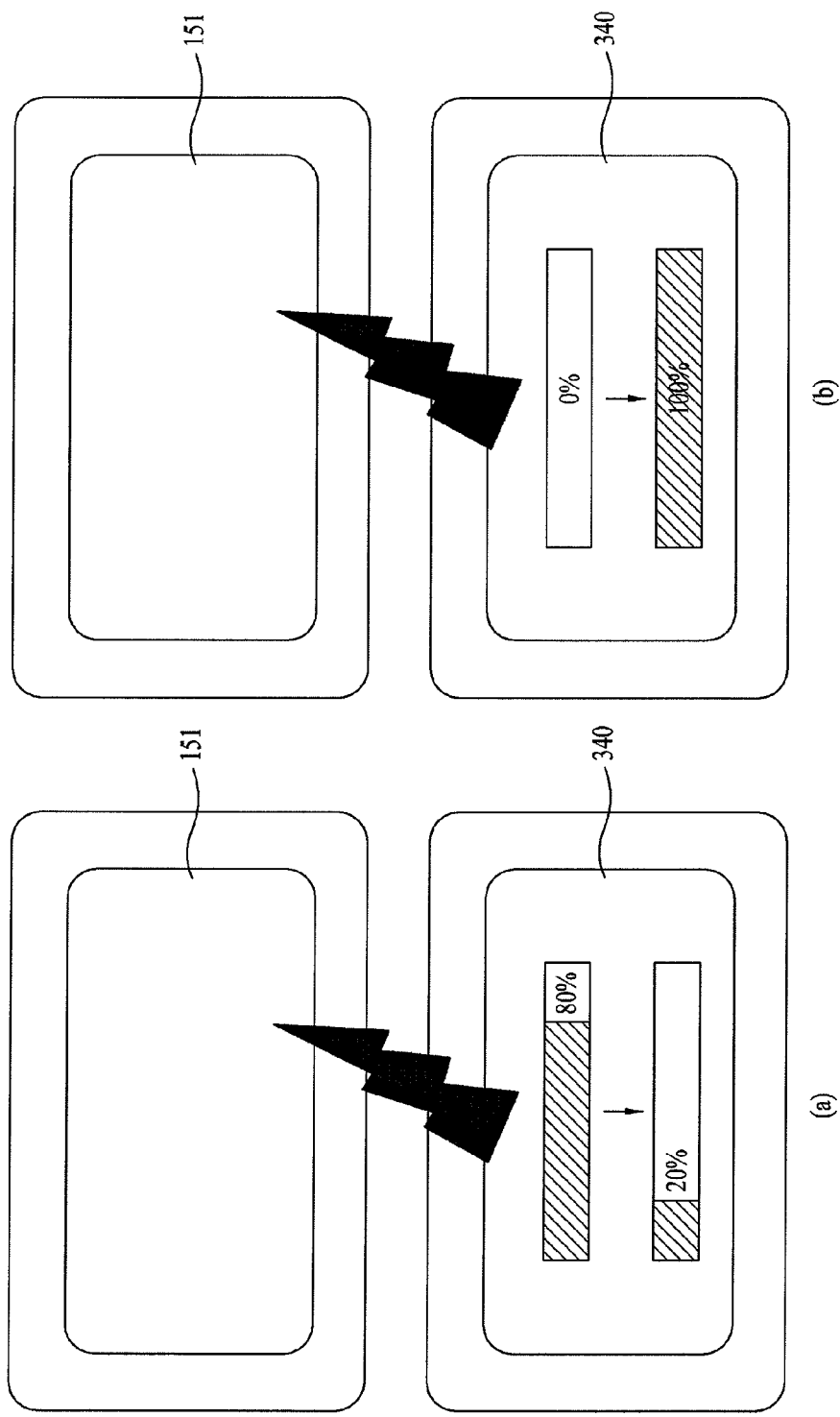

FIGS. 36A to 36C are diagrams of screen configurations for describing a state that power is supplied from a solar cell in case of power shortage of a basic terminal battery according to the present invention.

First of all, while the mobile terminal 100 is disconnected from the e-paper kit 300, in case of determining that a remaining power level of the first power source 191 (or the main power source) is equal to or smaller than a predetermined reference, the mobile terminal 100 is able to send a signal indicating a shortage of the remaining power level of the first power source 191 to the e-paper kit 300.

The e-paper kit 300 receives the remaining power level shortage indication signal and is then able to output a text (vibration, lamp, bell sound and/or the like) for indicating that the remaining power level of the first power source 191 is insufficient via the e-paper 340 [FIG. 36A].

Subsequently, the e-paper kit 300 is able to deliver a remaining power level of the second power source 320 to the first power source 191 automatically or according to user selection.

FIG. 36B shows that the e-paper kit 300 is connected to the mobile terminal 100 and then delivers a remaining power level of the second power source 320 to the first power source 191. FIG. 36C shows that the e-paper kit 300 is disconnected from the mobile terminal 100 and then delivers a remaining power level of the second power source 320 to the first power source 191 by wireless.

Referring to FIG. 36B and FIG. 36C, the e-paper 340 is able to display status information on the power delivery from the second power source 320 to the first power source 191.

FIGS. 37A to 38B are diagrams of screen configurations for controlling to display information via a display unit of a terminal in accordance with a user input signal inputted via an electronic paper according to the present invention.

Figure 37A:
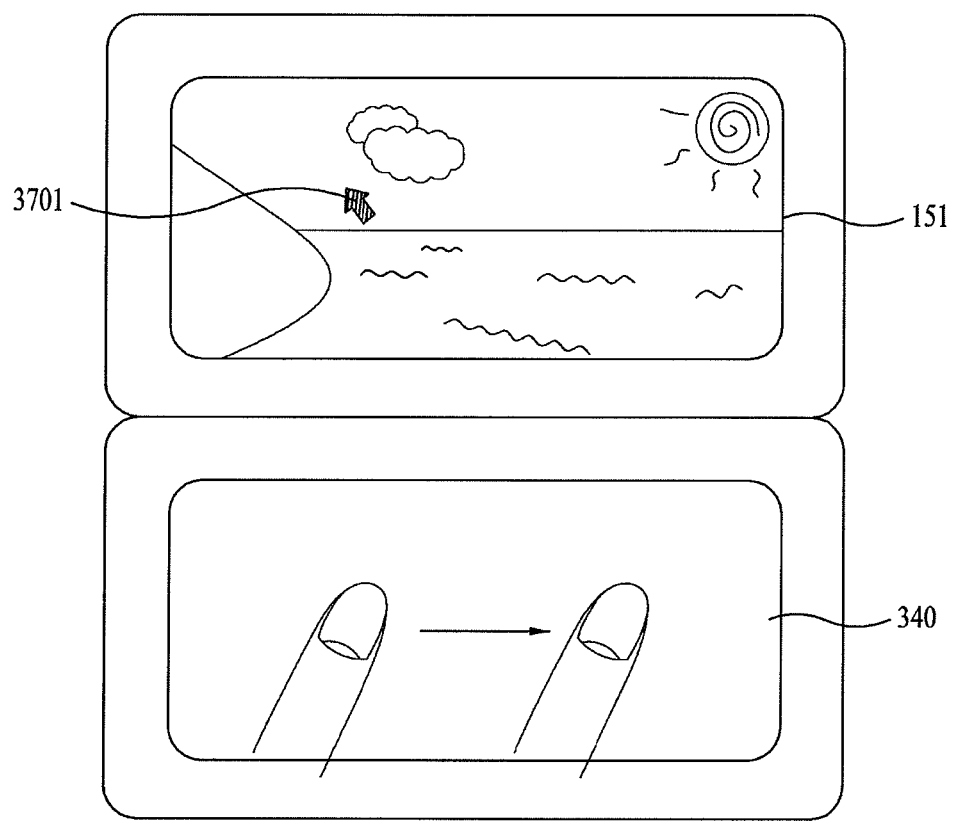
FIGS. 37A to 38B are diagrams of screen configurations for controlling to display information via a display unit of a terminal in accordance with a user input signal inputted via an electronic paper according to the present invention.
Figure 37B:
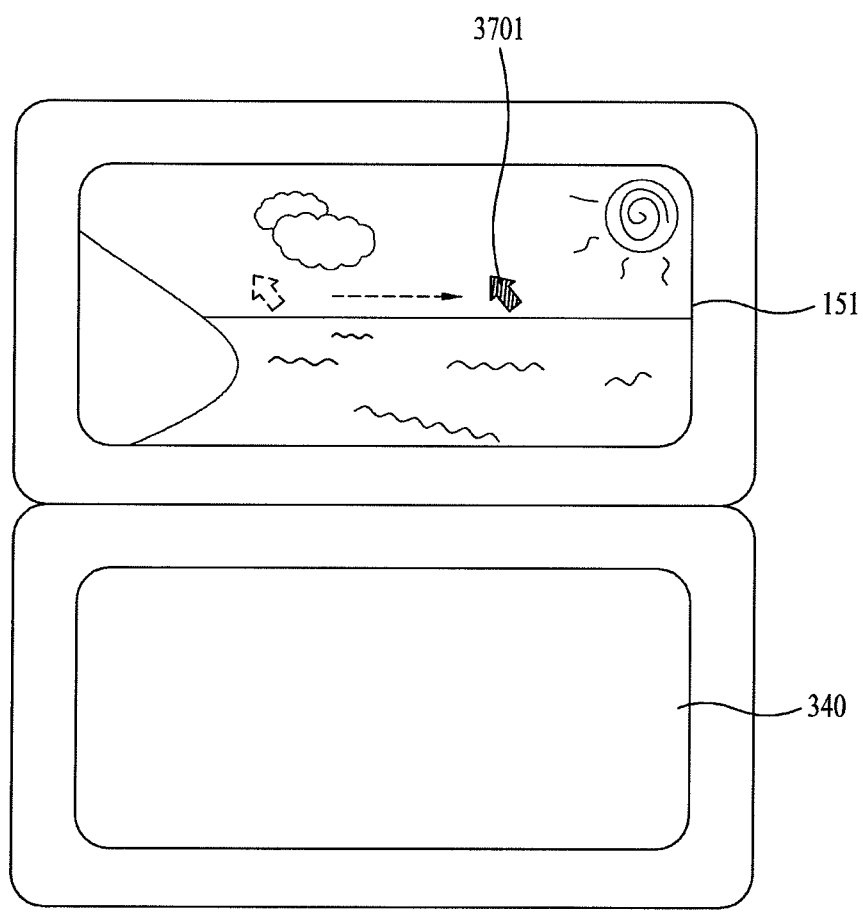

First of all, in case of receiving an input of a touch & drag action performed on the e-paper 340 in right direction [FIG. 37A], the display unit 151 is able to shift a position of a cursor 3701 in right direction to correspond to the inputted touch & drag action [FIG. 37B].

Figure 38A:
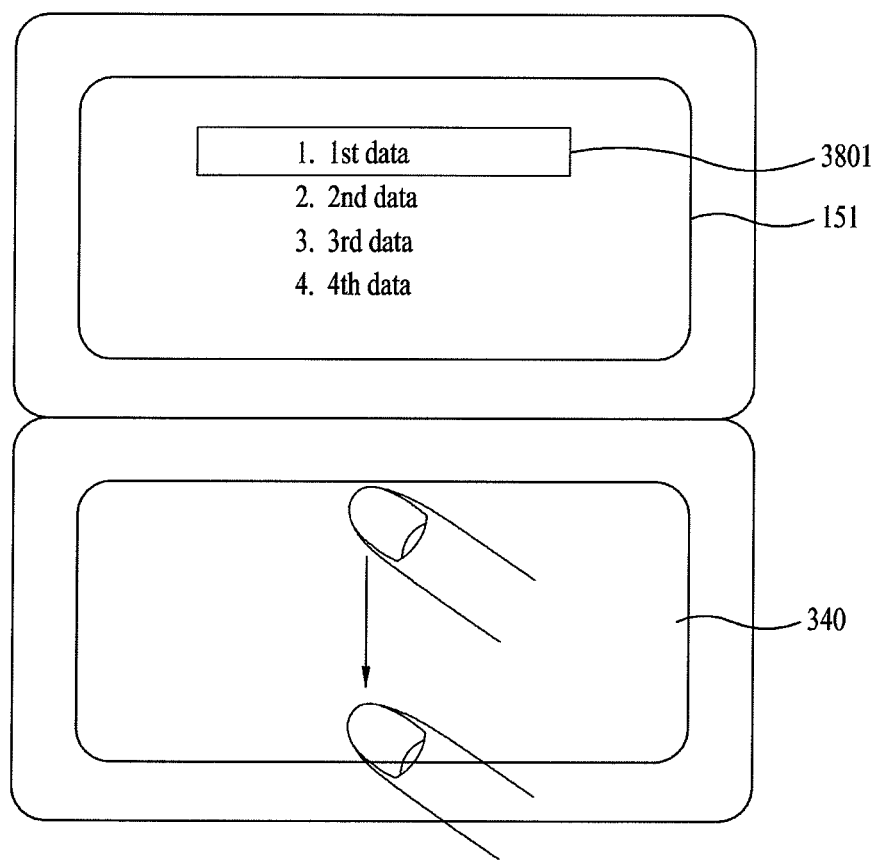
Figure 38B:
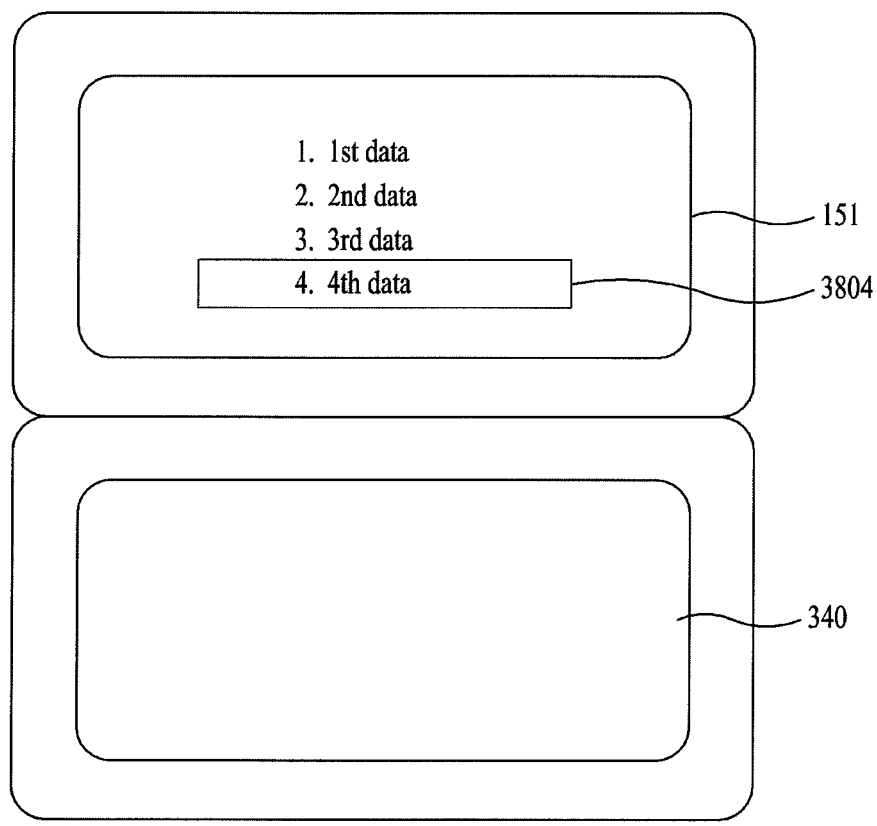

In case of receiving an input of a touch & drag action performed on the e-paper 340 in bottom direction [FIG. 38A], the display unit 151 is able to select one of first to fourth data 3801 to 3804 in a data list to correspond to the inputted touch & drag action [FIG. 38B].

In FIGS. 37A to 38B, it is able to detect the touch & drag action performed on the e-paper 340 using the (e) touchpad 330.

Besides, the embodiments shown in FIGS. 37A to 38B are applicable while the mobile terminal 100 and the e-paper kit 300 are disconnected from each other [not shown in the drawings].

The respective configurations disclosed in the aforesaid embodiments of the present invention can be used by those skilled in the art in a manner of being selectively combined with one another. Therefore, the present invention is non-limited by the embodiments disclosed herein but intends to give a broadest scope matching the principles and new features disclosed herein.

According to one embodiment of the present invention, the above-described display controlling methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

Accordingly, the present invention provides the following effects and/or advantages regarding at least one of embodiments of the present invention.

First of all, an e-paper kit is configured to be detachably connected to a mobile terminal. If the e-paper kit is connected to the mobile terminal, an e-paper s usable as a display means of the mobile terminal or an independent display means.

Secondly, when a mobile terminal is loaded in an external case including an e-paper kit, the present invention is able to effectively control a display operation of the mobile terminal or the e-paper kit using the external case.

Thirdly, since a power supply source of an e-paper kit is separately specified among a plurality of power sources, the present invention is able to normally operate the e-paper kit in low-power status.

Fourthly, if an estimated power consumption level of an e-paper kit exceeds an estimated charged power level by a power supply source of the e-paper kit, the present invention enables another power source to supply a power to the e-paper kit, thereby normally operating an e-paper in low-power status.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a detachable e-paper kit including e-paper, a transparent type solar cell, and a member of the detachable e-paper kit, the e-paper arranged between the transparent type solar cell and the member of the detachable e-paper kit; and
an external case including:
a wireless communication unit;
a display unit;
a power source;
a first control unit configured to control the display unit to display first information using the power source and to control the wireless communication unit to receive at least one incoming call;
a second control unit configured to control the e-paper to display second information using the solar cell; and
an attaching mechanism configured to receive the detachable e-paper kit,
wherein, when the detachable e-paper kit is attached, the first control unit is configured to control the display unit to display an incoming call indication while the wireless communication unit receives an incoming call, and to control the e-paper to display another call indication if the display unit is deactivated, and
wherein the another call indication includes a number of incoming calls when the display unit is deactivated.

2. The mobile terminal of claim 1, wherein the e-paper kit further includes at least one of a touchpad configured to receive an input of a touch action to the e-paper and a light emitting device configured to illuminate light to the e-paper.

3. The mobile terminal of claim 1, wherein the solar cell includes:
a transparent light concentrating unit configured to concentrate received solar energy, and a storage unit configured to convert the solar energy received by the light concentrating unit into electric energy and to store the electric energy.

4. The mobile terminal of claim 1, wherein the first control unit is further configured to display a dynamic picture on the display unit and to operate in conjunction with the second control unit in the e-paper kit to display a static picture on the e-paper.

5. The mobile terminal of claim 1, wherein the second control unit is further configured to display the second information on the e-paper independently from the first control unit of the mobile terminal.

6. The mobile terminal of claim 1, further comprising:
an external case forming an exterior of the mobile terminal,
wherein the e-paper kit is further configured to be detachably attached to one portion of the external case and thereby be connected to the mobile terminal.

7. The mobile terminal of claim 6, wherein the first control unit is further configured to display the first information on the display unit and the second control unit is further configured to display the second information on the e-paper based on one of 1) whether the mobile terminal is opened or closed, 2) whether or not the mobile terminal is connected to the external case, and 3) a type of loading the mobile terminal in the external case.

8. The mobile terminal of claim 1, wherein the second control unit is further configured to control operations of the e-paper kit when the e-paper kit is folded or rolled-up.

9. The mobile terminal of claim 1, wherein the second control unit is further configured to display status information of the solar cell on the e-paper.

10. The mobile terminal of claim 1, wherein the second control unit is further configured to maintain displaying the second information on the e-paper kit when the mobile terminal has been abnormally terminated.

11. The mobile terminal of claim 10, wherein the second control unit is further configured to display prescribed information extracted from a memory of the mobile terminal when the mobile terminal is normally terminated.

12. The mobile terminal of claim 1, wherein the wireless communication unit is further configured to receive at least one incoming message,
wherein the first control unit is further configured to control the wireless communication unit to display a received message indication if an incoming message is received, and
wherein the received message indication includes a number of received messages.

13. The mobile terminal of claim 1, wherein, if the external case is switched from a close state to an open state, the first control unit is further configured to automatically release a touch function locked state of the first display unit and to automatically set the touch function locked state of the e-paper, and
wherein, if the external case is switched from the open state to the close state, the first control unit is further configured to automatically set the touch function locked state of the first display unit and to automatically release the touch function locked state of the e-paper.

14. A method of controlling a mobile terminal, the method comprising:
supplying power to the mobile terminal using a power source;
controlling operations of the mobile terminal by a first control unit;
receiving an attaching signal of a detachable e-paper kit including e-paper, a transparent type solar cell, and a member of the e-paper kit, the e-paper arranged between the transparent type solar cell and the member of the e-paper kit;
controlling, by the first control unit, a display unit of the mobile terminal to display first information using the power source and to control a wireless communication unit to receive at least one incoming call;
controlling, by a second control unit, the detachable e-paper kit to display second information on the e-paper using the solar cell; and
controlling, by the first control unit, the power source to apply the power to the detachable e-paper kit when a power applied by the solar cell is below a predetermined threshold,
wherein, when the detachable e-paper kit is attached, the first control unit is configured to control the display unit to display an incoming call indication while the wireless communication unit receives an incoming call, and to control the e-paper to display another call indication if the display unit is deactivated,
wherein the another call indication includes a number of incoming calls when the display unit is deactivated, and
wherein the display unit, the power source, the first control unit, the second control unit, and the wireless communication unit are included in an external case.

15. The method of claim 14, wherein the solar cell includes:
a transparent light concentrating unit configured to concentrate received solar energy, and a storage unit configured to convert the solar energy received by the light concentrating unit into electric energy and to store the electric energy.

16. The method of claim 14, further comprising:
displaying, by the first control unit, a dynamic picture on the display unit; and
displaying, by the first control unit operating in conjunction with the second control unit in the e-paper kit, a static picture on the e-paper.

17. The method of claim 14, further comprising:
displaying, by the second control unit, the second information on the e-paper independently from the first control unit of the mobile terminal.

18. The method of claim 14, further comprising:
displaying, by the first control unit, the first information on the display unit and displaying, by the second control unit, the second information on the e-paper based on one of 1) whether the mobile terminal is opened or closed, 2) whether or not the mobile terminal is connected to the external case, and 3) a type of loading the mobile terminal in the external case.

19. The method of claim 14, further comprising:
controlling, by the second control unit, operations of the e-paper kit when the e-paper kit is folded or a rolled-up.

20. The method of claim 14, further comprising:
maintaining, by the second control unit, the displaying of the second information on the e-paper kit when the mobile terminal has been abnormally terminated.

* * * * *